(12) United States Patent
Zohar et al.

(10) Patent No.: US 12,176,740 B2
(45) Date of Patent: Dec. 24, 2024

(54) METHOD AND APPARATUS FOR ELECTRICAL SWITCHING

(71) Applicant: Solaredge Technologies Ltd., Herzeliya (IL)

(72) Inventors: Alon Zohar, Netanya (IL); Liron Har-Shai, Tel Mond (IL); Yoav Galin, Raanana (IL); Meir Adest, Modiin (IL); Natan Schecter, Jerusalem (IL); Aryeh Zafranski, Jerusalem (IL); Vladimir Volovik, Givatayim (IL); Ofir Digmi, Holon (IL)

(73) Assignee: Solaredge Technologies Ltd., Herzeliya (IL)

( * ) Notice: Subject to any disclaimer, the term of this patent is extended or adjusted under 35 U.S.C. 154(b) by 407 days.

(21) Appl. No.: 17/584,632

(22) Filed: Jan. 26, 2022

(65) Prior Publication Data

US 2022/0239115 A1    Jul. 28, 2022

Related U.S. Application Data

(60) Provisional application No. 63/195,893, filed on Jun. 2, 2021, provisional application No. 63/142,673, filed on Jan. 28, 2021.

(51) Int. Cl.
*H02J 7/00* (2006.01)
*H02J 9/06* (2006.01)

(52) U.S. Cl.
CPC ........... *H02J 7/0024* (2013.01); *H02J 9/062* (2013.01)

(58) Field of Classification Search
CPC .............................. H02J 7/0024; H02J 9/062
USPC ........................................................ 320/117
See application file for complete search history.

(56) References Cited

U.S. PATENT DOCUMENTS

| | | | | |
|---|---|---|---|---|
| 4,723,187 A | * | 2/1988 | Howell | H01H 9/542 361/57 |
| 5,374,792 A | * | 12/1994 | Ghezzo | B29C 59/16 200/279 |
| 5,633,540 A | * | 5/1997 | Moan | H02P 7/295 361/13 |
| 5,790,354 A | * | 8/1998 | Altiti | H01H 9/542 361/13 |
| 2008/0137238 A1 | * | 6/2008 | Wright | H01H 9/541 361/87 |
| 2008/0225457 A1 | * | 9/2008 | Korrek | H03M 1/207 361/100 |
| 2014/0091808 A1 | * | 4/2014 | Henke | H01H 33/121 324/511 |

(Continued)

FOREIGN PATENT DOCUMENTS

| | | |
|---|---|---|
| DE | 102015226475 A1 | 11/2016 |
| EP | 3651175 A1 | 5/2020 |

(Continued)

OTHER PUBLICATIONS

Jun. 21, 2022—European Search Report—EP App. No. 22153683.2.

*Primary Examiner* — Jack Chiang
*Assistant Examiner* — Suchin Parihar
(74) *Attorney, Agent, or Firm* — Banner & Witcoff, Ltd.

(57) ABSTRACT

Systems, apparatuses, and methods are described for electrical switching. In some examples, electrical switching is performed by a plurality of switching arrangements. The plurality of switching arrangements may be connected in parallel to one another.

20 Claims, 29 Drawing Sheets

(56) References Cited

U.S. PATENT DOCUMENTS

| | | | | |
|---|---|---|---|---|
| 2015/0349671 A1* | 12/2015 | Kuhla | ................... | H01H 9/542 |
| | | | | 318/400.26 |
| 2017/0365999 A1* | 12/2017 | Cao | ........................ | H02S 40/30 |
| 2022/0006291 A1* | 1/2022 | Schaper | .................. | H02H 7/26 |

FOREIGN PATENT DOCUMENTS

| | | | |
|---|---|---|---|
| EP | 3664117 A1 | 6/2020 | |
| WO | 9750163 A1 | 12/1997 | |

\* cited by examiner

METHOD AND APPARATUS FOR ELECTRICAL SWITCHING

CROSS REFERENCE TO RELATED APPLICATIONS

The present application claims priority to U.S. App. No. 63/195,893, filed Jun. 2, 2021, and U.S. App. No. 63/142,673, filed Jan. 28, 2021, the disclosures of which are incorporated herein by reference in their entirety.

BACKGROUND

Electrical circuits may include a plurality of electrical components. These electrical components may be, for example, one or more: batteries, resistors, inductors, capacitors, switches, transistors, etc. The different electrical components of the circuit may be connected to one another using conducting paths. A switch is an electrical component that may establish a conducting path between at least two other electrical components to connect those at least two other electrical components via the established conducting path. The switch may also break the conducting path between the at least two other electrical components to disconnect those other electrical components from one another. Some switches are electromechanical devices including one or more sets of electrical contacts connected to the other electrical components of the circuit. One or more actuator may be used to put one or more sets of electrical contacts into contact with one another. When a pair of the electrical contacts are in contact with one another, then an electrical current may be able to pass between them, closing the conducting path. When the pair of electrical contacts are not in contact with one another, then an electrical current might not be able to pass between them, opening the conducting path. Meaning, when the switch is in an "ON" state, then electrical current may flow via the conducting path. When the switch is in an "OFF" state, then electrical current might not flow via the conducting path.

SUMMARY

The following summary presents a simplified summary of certain features. The summary is not an extensive overview and is not intended to identify key or critical elements.

Systems, apparatuses, and methods are described for electrical switching.

In some examples, electrical switching is performed by a switching system with a plurality of switching arrangements. The switching arrangements may be in parallel to one another. The switching arrangements may include one or more electromechanical switches, such as, relay switches. One or more of the switching arrangements may include a switching unit. The switching unit may include non-mechanical switches, such as transistors. An electromechanical switch (e.g., an electromechanical relay) may provide advantages such as galvanic isolation and less power losses compared to a non-mechanical switch such as a transistor. A non-mechanical switch (e.g., a transistor) may be a switch that is relatively easier or relatively safer to switch than an electromechanical switch since it might not require the galvanic isolation (e.g., physical separation) of a pair of electrical contacts of the switch (e.g., the movement of one or more of the electrical contacts away from another one or more of the electrical contacts), may be less expensive than an electromechanical switch, and may be switched many more times than a relay before switching capabilities are degraded. Non-mechanical electrical switches may include one or more solid-state relays (SSRs). A non-mechanical electrical switch will also be referred to herein as a "solid state switch".

In some examples, the electrical switching may circumvent one or more relay switches using one or more transistors connected in series with one or more different relay switches, forming a switching leg connected in parallel to the one or more relay switches.

In some examples, the relay switches may be alternating current (AC) relay switches, and the switching unit may be a bi-directional switch. Operated in tandem, an AC relay switch and the switching unit may effectively achieve functionality similar to that of a direct current (DC) relay switch, at a lower cost than an off-the-shelf DC relay. For example, the switching unit may effectively connect and disconnect DC currents, while the series-connected AC relay may provide galvanic isolation when in the OFF state.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1A:
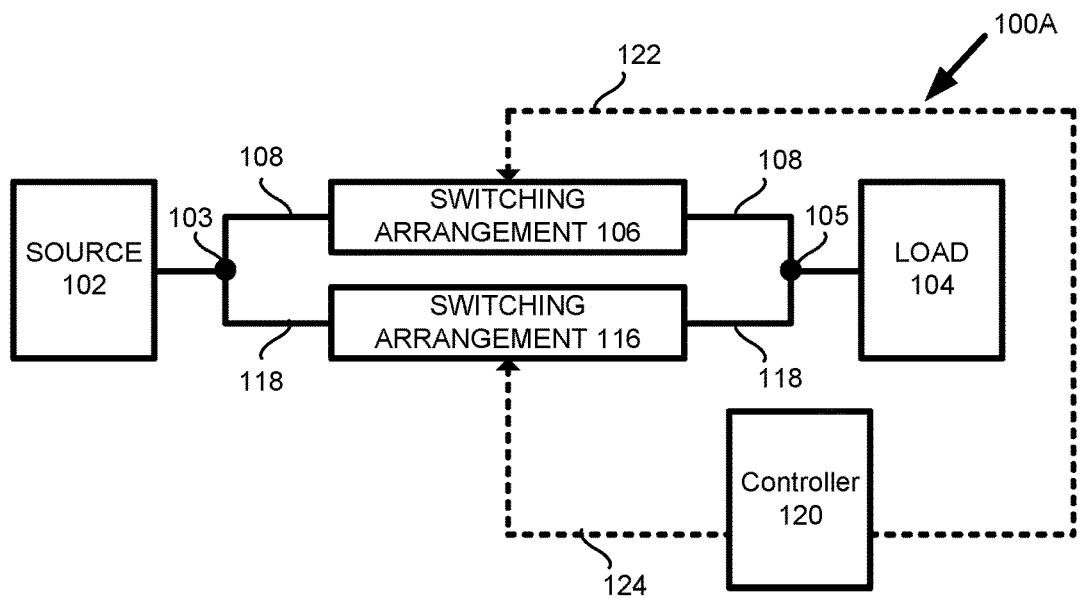
FIG. 1A shows a switching system, in accordance with certain examples of the presently disclosed subject matter.

For ease of understanding, the following terms will be referred to herein and understood to have the following meanings:

The term "switching arrangement" may refer to electrical circuitry that includes one or more switches. The term "switching arrangement" may be used interchangeably herein with the term "switching circuit".

The term "switch" used herein may refer to any appropriate reversible switching element that may be switched in a non-permanent fashion.

The term "switching unit" may refer to electrical circuitry that includes one or more non-mechanical switches, and that does not include an electromechanical switch.

The term "electromechanical switch" may refer to a switch that includes one or more moving mechanical part that is moved as a result of the presence or absence of current flowing through the switch. Examples of electromechanical switches are: relays, AC relays, throw switches, etc. The switch may be single throw, double throw, etc.

The term "non-mechanical switch" may refer to a switch that does not include one or more moving mechanical part that is moved as a result of the presence or absence of current flowing through the switch. Examples of non-mechanical switches are: a transistor, a field effect transistor (FET), a metal oxide semiconductor field-effect transistor (MOSFET), a bipolar junction transistor (BJT), an insulated-gate bipolar transistor (IGBT), a Silicon Carbide (SiC) switch, a Gallium Nitride (GaN) switch, a thyristor, a semiconductor controlled rectifier (SCR), a solid state relay (SSR), etc.

Systems, apparatuses, and methods are described herein for electrical switching. In some examples, the switching is performed by a switching system. The switching system may include a plurality of switching arrangements. At least one switching arrangement of the plurality of switching arrangements may include a switching unit with one or more non-mechanical switches. The switching system may also include one or more switching arrangements that do not have a switching unit with one or more non-mechanical switches. The switching arrangements, with a switching unit or without a switching unit, may include one or more electromechanical switches.

The switching unit including one or more non-mechanical switches which may be arranged to make the switching relatively safe, relatively cost-efficient, and relatively easy. For example, unlike electromechanical switches, the switching unit might not require galvanic isolation. Also, the switching unit may feature relatively fast switching (i.e., short turn-on and turn-off times) compared to other relay switches. Providing a switching unit in addition to a mechanical relay may also provide cost savings, as a solid-state switch (e.g., a transistor) and a mechanical switch designed for operation only in alternating current (AC) circuits may be operated to provide a function equivalent to that of a direct current (DC) mechanical switch, and at a lower combined cost than the cost of a DC mechanical switch. For example, the switching unit may help ensure that there is substantially no current flowing through one or more other electromechanical switches prior to switching the one or more other electromechanical switches. Having substantially no current flowing the through one or more other electromechanical switches during the switching of the one or more other electromechanical switches may make switching the one or more other electromechanical switches safer and easier since there may be less of a risk of inrush current through the electromechanical switch when switching ON the one or more electromechanical switches, and since it may be less difficult to separate the contacts of the electromechanical switch when switching OFF the one or more electromechanical switches.

Using a switching arrangement with a switching unit having one or more non-mechanical switches connected in parallel to a switching arrangement without a switching unit that has one or more electromechanical switches, may prevent an inrush of current when switching ON the switching system. The switching arrangement with a switching unit may provide a parallel path for current that can be used to circumvent the one or more electromechanical switches of the switching arrangement without the switching unit. The one or more electromechanical switches of the switching arrangement without the switching unit may only be turned ON or OFF after the switching unit has first been turned ON.

The switching unit may also be connected in series with one or more other electromechanical switches. Connecting the switching unit in series with the one or more other electromechanical switches, may also make it easier or safer to switch ON and OFF the one or more other electromechanical switches, for example, by terminating a current flowing through the one or more other electromechanical switches prior to switching the one or more other electromechanical switches. The one or more other electromechanical switches may, in some cases, only be turned OFF after the switching unit has first been turned OFF.

The accompanying drawings, which form a part hereof, show examples of the disclosure. It is to be understood that the examples shown in the drawings and/or discussed herein are non-exclusive and that there are other examples of how the disclosure may be practiced.

It is noted that the teachings of the presently disclosed subject matter are not bound by the systems and apparatuses described with reference to the figures. Equivalent and/or modified functionality may be consolidated or divided in another manner and may be implemented in any appropriate combination. For example, controller 120 and switching arrangement 116, which are shown as separate units (shown, for example, in FIG. 1A), may have their functionalities and/or components combined into a single unit.

It is also noted that the teachings of the presently disclosed subject matter are not bound by the flow charts shown in the figures, and the shown operations may occur out of the shown order. For example, operations that are shown in succession may be executed substantially concurrently or in reverse order. It is also noted that while the flow charts are described with reference to elements shown herein, this is by no means binding, and the operations may be performed by elements other than those described herein.

It is also noted that like references in the various figures refer to like elements throughout the application. Similar reference numbers may also connote similarities between elements. For example, it is to be understood that transistor Q1 shown in FIG. 1B may be similar to or the same as other transistors described and shown herein, and vice versa. Throughout the application certain general references may be used to refer to any of the specific related elements. For example, power system 100 may refer to any of the various power systems.

It is also noted that all numerical values given in the examples of the description are provided for illustrative purposes only and are by no means binding.

The term, "threshold", used herein include variations that are equivalent for an intended purpose or function (e.g., within a permissible variation range).

The term "controller" used herein may include a computer and/or other appropriate processing circuitry and memory. The terms "computer" or "processor" or variations thereof should be expansively construed to cover any kind of hardware-based electronic device with data processing capabilities including, by way of non-limiting example, a digital processing device (e.g., digital signal processor (DSP), microcontroller, field programmable circuit, application-specific integrated circuit (ASIC), etc.), a device which comprises or is operatively connected to one or more processing devices, and/or an analog circuit implementing control logic. The terms "memory" or "data storage device" used herein should be expansively construed to cover any volatile or non-volatile computer memory suitable to the presently disclosed subject matter. The above may include, by way of non-limiting example, the one or more controllers 120 disclosed in the present application.

FIG. 1A shows a switching system 100A according to examples of the present subject matter. Switching system 100A may include one or more power sources 102 and one or more loads 104. The one or more power sources 102 are also referred to herein as "power sources 102," and a respective power source of the one or more power sources 102 is also referred to herein as "power source 102". The one or more loads 104 are also referred to herein as "loads 104," and a respective load of the one or more loads 104 is also referred to herein as "load 104."

As an example, the power sources 102 may include photovoltaic (PV) generators. For example, each power source 102 may include one or more photovoltaic cells, one or more strings of serially connected photovoltaic cells, a photovoltaic panel, one or more photovoltaic panels, etc. Although power sources 102 are described herein in the context of PV generators, it should be appreciated that the term power source may include other types of appropriate power sources, including: wind turbines, hydro-turbines, fuel cells, batteries, etc., to name a few non-limiting examples.

Although, for the sake of simplicity, only a single power source 102 is shown, it should be appreciated that the one or more power sources may include a plurality of power sources 102 connected to each other in series or parallel connections. For example, the one or more power sources 102 may include a plurality of strings of power sources 102, where each string of power sources 102 includes a plurality of power sources 102 connected to each other in series. Each of the strings of power sources 102 may be connected to the other strings of power sources 102 in parallel.

Each power source 102 may include one or more terminals 103 configured to connect power source 102 to one or more electrical components or electrical devices (not shown). The one or more terminals 103 may be output terminals arranged to output an output current from power source 102. Alternatively, the one or more terminals 103 may be input terminals arranged to input current to power source 102.

The one or more electrical devices may include one or more power devices, such as: DC to DC converters (e.g., buck converters, boost converters, buck/boost converters, buck+boost converters), DC to AC inverters, micro-inverters, etc., to name a few non-limiting examples.

Loads 104 may include one or more of: electrical grids, energy storage devices (e.g., batteries or other devices used to store energy, such as, electrical energy), resistive devices (e.g., resistors), devices (e.g., motors), uninterruptible power supplies (UPSs), power converters, inverters, etc. to name some non-limiting examples. In particular, the UPS may provide emergency power, for example, when the power from the power source 102 is unavailable. The UPS may also include one more energy storage devices arranged to receive power and charge the UPS so that it may then later provide power.

Each load 104 may include one or more terminals 105 configured for connecting the load 104 to one or more electrical components or electrical devices. The one or more terminals 105 may be output terminals arranged to output an output current from load 104. Alternatively, the one or more terminals 103 may be input terminals arranged to input an input current to load 104.

The switching system 100A may also include first switching arrangement 106 and second switching arrangement 116, which are switchably connected between the power source 102 and the load 104. Additionally, first and second switching arrangements 106, 116, may be connected between one or more terminals 103 of the power source 102 and one or more terminals 105 of the load 104. Further, switching arrangements 106, 116 may be configured to connect the power source 102 to the load 104 or disconnect the power source 102 from the load 104 via a respective electrical connection path—e.g., first electrical path 108 corresponding to switching arrangement 106 and second electrical path 118 corresponding to switching arrangement 116. The first switching arrangement 106 may be configured to establish the first electrical path 108 between the power source 102 and the load 104, or disconnect the first electrical path 108 between the power source 102 and the load 104. The second switching arrangement 116 may be configured to establish the second electrical path 118 between the power source 102 and the load 104, or disconnect the second electrical path 118 between the power source 102 and the load 104. Additionally, as shown in FIG. 1A, the plurality of switching arrangements 106, 116, may be connected in parallel to one another in some instances. In these instances, the first switching arrangement 106 and the first electrical path 108 may be arranged in parallel to the second switching arrangement 116 and the second electrical path 118.

In some examples, the first switching arrangement 106 may be configured to establish or disconnect the first electrical path 108 (i.e., switch ON or OFF) only after the second switching arrangement 116 has established the second electrical path 118. If the switching system 100A is configured so that the switching arrangement 106 only turns ON or OFF after the parallel switching arrangement 116 is already ON, then this may make the switching ON and OFF of switching arrangement 106 relatively easy and relatively safe. For example, the first switching arrangement 106 may be a switch that is relatively difficult or dangerous to switch under other circumstances. As an example, switching arrangement 106 may have electrical contacts that may be difficult to separate and that may be susceptible to arcing even if they are separated (e.g., a pair of electrical contacts that may be difficult to galvanically isolate). However, by configuring a switching system 100 with an alternative parallel electrical path 118 established by the parallel switching arrangement 116 that remains ON when switching arrangement 106 is being turned OFF may alleviate the difficulty and risk involved with the switching of switching arrangement 106 OFF, because there is an alternative path for the current to flow through between the power source 102 and the load 104 during that time. The other switching arrangement 116 may also include a switching unit with one or more other switching elements so that the switching OFF of switching arrangement 116 and disconnecting the electrical path 118 between the power source 102 and the load 104 is relatively easy and relatively safe, even after the first switching arrangement 106 has already been turned OFF.

One or more of the switching arrangements may include one or more electromechanical switches but not a switching unit. One or more of the other switching arrangements may include one or more switching units. A switching arrangement without a switching unit may in some cases be referred to as a "hard switching arrangement", since the absence of a switching unit may force an electromechanical switch to switch under current. A switching arrangement with a switching unit may be referred to as a "soft switching arrangement", since it may allow an electromechanical switch to only switch under no-current conditions, also known as a type of "soft switching".

Switching system 100A may include one or more controllers 120. If switching system 100A includes a plurality of controllers 120, then one or more of those controllers may be designated as a master controller. The master controller may be configured to transmit and receive one or more signals to or from one or more other controllers, and/or one or more other elements of the switching system 100A. The one or more signals may include one or more instructions related to switching ON or OFF one or more switching element of one or more switching arrangement. As an example, the functionality of the master controller may be included in one or more controllers included as part of one or more of the switching arrangements. For example, switching arrangement 106 and switching arrangement 116 may each have a controller, and one of those controllers may be designated as the master controller. Meaning, each switching arrangement may have its own controller(s) without an external central controller, and one or more of those internal controllers may be designated as the master controller.

For simplicity, FIG. 1A shows controller 120 as a central controller external to switching arrangement 106 and switching arrangement 116. The one or more controllers 120 may be communicatively and/or operably connected to the switching arrangements 106 and/or 116 via one or more connections 124 and/or 122. These connections 124 and 122 are shown in FIG. 1A as dashed lines. For example, the one or more controllers 120 may control one or more switches (electromechanical or non-mechanical) of the switching arrangements 106, 116 via connections 124, 126. For simplicity, the connections between the one or more controllers 120 and the various elements of other switching systems 100 are not shown in other figures.

In some examples, if the one or more controllers 120 are not mentioned in the descriptions associated with one or more of the figures it does not mean that the one or more controllers 120 are not active in those examples. Omission of mention of the one or more controllers 120 in a given example may be done for the sake of simplicity and/or brevity, but the one or more controllers 120 may be active and contribute to that example even if they are not mentioned explicitly.

Although the same reference number may be used throughout to reference the one or more controllers 120, in different examples the hardware of the one or more controllers 120 may be the same as other examples, but there may be different sets of computer instructions (computer programs) stored on the non-transient computer-readable storage of the given one or more controllers 120 for each of the different examples. The different computer programs may be configured to operate the switches according to the figures associated with the different examples.

The one or more controllers 120 may include processing circuits and/or memory. The one or more controllers 120 may be configured to access data and make determinations (e.g., by executing computer program code).

Figure 1B:
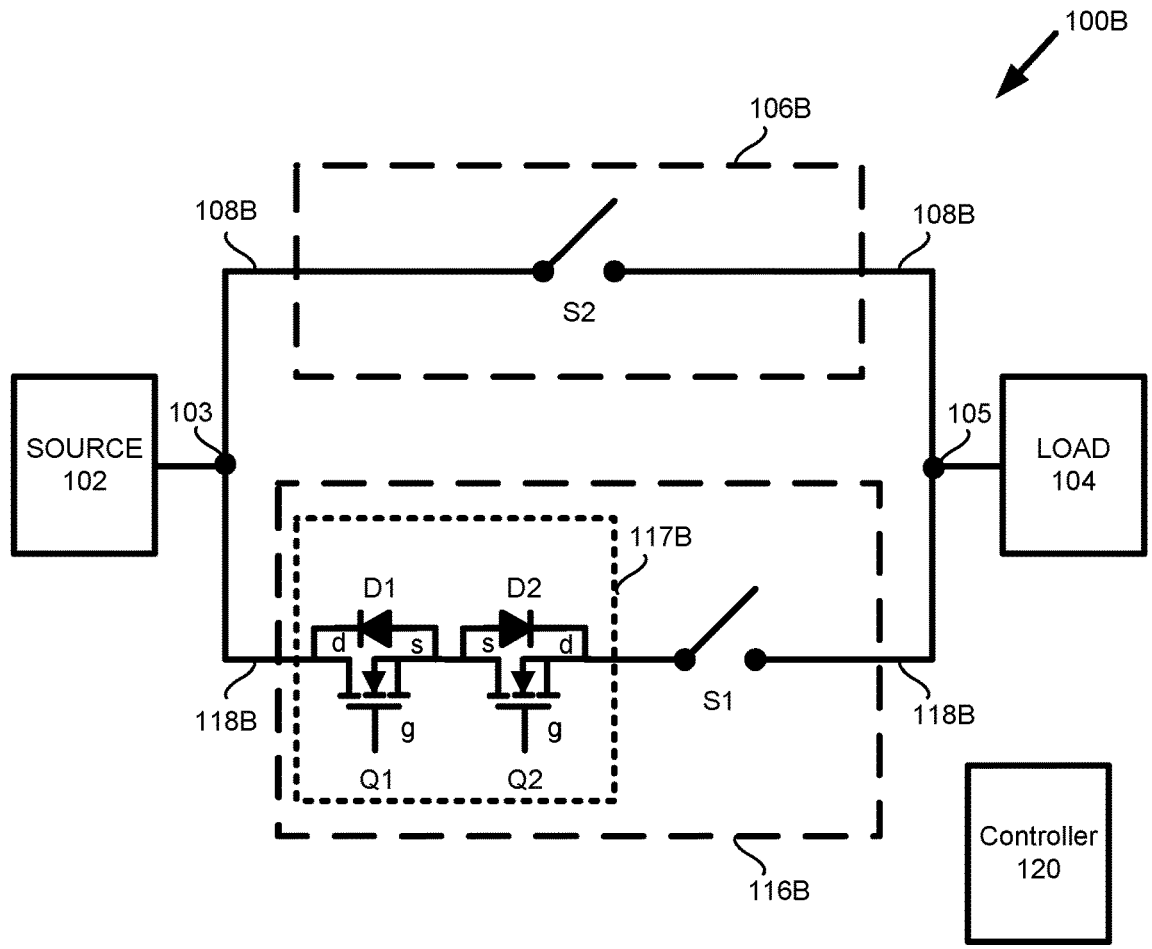
FIG. 1B shows a switching system, in accordance with certain examples of the presently disclosed subject matter.

FIG. 1B shows a switching system 100B according to examples of the present subject matter. Switching system 100B may be similar to other switching systems 100 shown herein. Switching system 100B shows some examples of switching arrangements 106, 116. Switching arrangement 106B may include a switch S2 connected between power source 102 and load 104. One terminal of the switch S2 may be connected to a terminal 103 of the power source 102 and one terminal of the switch S2 may be connected to a terminal 105 of the load 104. When switch S2 is ON (e.g., in the closed position) then power source 102 is connected to load 104 via the electrical path 108B. Switch S2 may be an electromechanical switch. Switching arrangement 106B does not include a switching unit.

Switching arrangement 116B includes a switching unit 117B. Switching unit 117B includes one or more switching elements. In the example of FIG. 1B, switching unit 117B includes a plurality of transistors Q1 and Q2. Switching arrangement 116B also includes a switch S1. Switch S1 may be an electromechanical switch. The plurality of transistors Q1 and Q2 and switch S1 may be switchably connected between power source 102 and load 104. The plurality of transistors Q1 and Q2 may be arranged back-to-back (e.g., a source terminal of one transistor Q1 may be connected to a source terminal of the other transistor Q2, or a drain terminal of one transistor Q1 may be connected to a drain terminal 103 of the other transistor Q2). A terminal of one transistor Q1 may be connected to power source 102, and a terminal of one transistor Q2 may be connected to a terminal of the switch S1. Another terminal of the switch S1 may be connected to a terminal 105 of the load 104. The gates of transistors Q1 and Q2, and/or switches S1 and S2 may be connected to one or more controllers 120. The one or more controllers 120 may be configured to control the transistors Q1 and/or Q2, and/or switches S1 and/or S2. In some examples the placement of transistors Q1 and Q2 and switch S1 on electrical path 118B may be reversed. For example, switch S1 may be arranged between terminal 103 of the power source 102 and the transistors Q1 and Q2, and the transistors Q1 and Q2 may be arranged between switch S1 and a terminal 105 of the load 104. In some examples the switch S1 may be arranged between the transistors Q1 and Q2.

The switching arrangement 116B may be configured as a bi-directional switching arrangement. Similarly, switching unit 117B may be configured as a bi-directional switching unit. For example, when transistor Q1 is ON current may flow through transistor Q1 and diode D2 in the direction of the power source 102 to the load 104. Diode D2 may be a body diode of transistor Q2, or may be a separate diode connected in parallel to transistor Q2. When transistor Q2 is ON current may flow through transistor Q2 and diode D1 in the direction of the load 104 to the power source 102. Diode D1 may be a body diode of transistor Q1, or may be a separate diode connected in parallel to transistor Q1. In some cases, both Q1 and Q2 may be ON and current may flow through transistors Q1 and Q2.

Figure 1C:
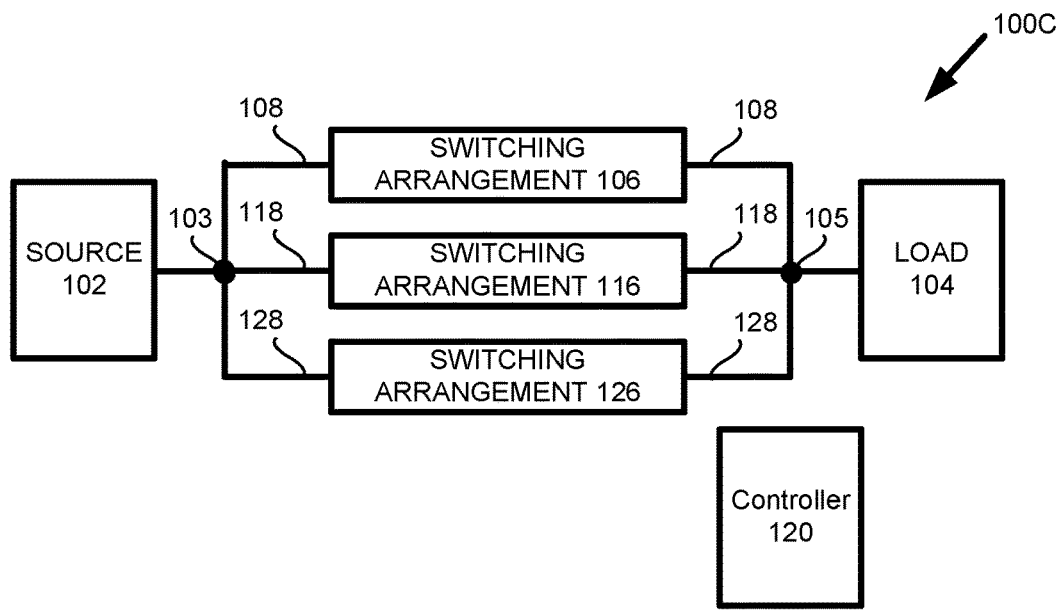
FIG. 1C shows a switching system, in accordance with certain examples of the presently disclosed subject matter.

FIG. 1C shows a switching system 100C according to examples of the present subject matter. Switching system 100C may be similar to other switching systems 100 shown herein, with the addition of an additional switching arrangement 126. As shown in FIG. 1C, switching system 100C includes three switching arrangements 106, 116, and 126, which may be configured to connect or disconnect the power source 102 and the load 104 via a respective electrical path 108, 118, or 128. One or more of the switching arrangements might lack a solid state switch (e.g., a transistor, SCR, SSR, thyristor, etc.) and one or more of the remaining switching arrangements may include a solid state switch.

Figure 1D:
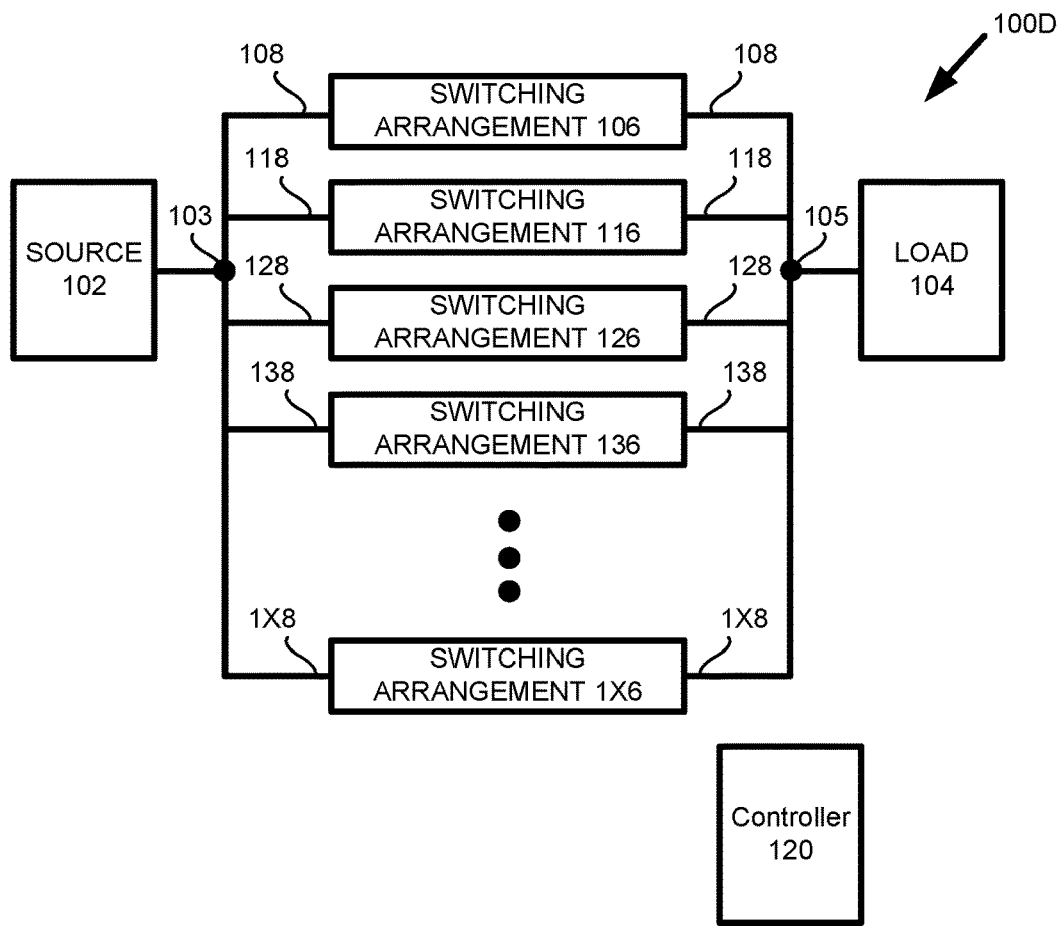
FIG. 1D shows a switching system, in accordance with certain examples of the presently disclosed subject matter.

FIG. 1D shows a switching system 100D according to examples of the present subject matter. Switching system 100D may be similar to other switching systems 100 shown herein, but with the addition of an arbitrary number of switching arrangements (shown here as X number of switching arrangements) and an arbitrary number of electrical paths (shown here as X number of paths). Switching system 100D shows more than three switching arrangements 106, 116, 126, . . . 1X6, configured to connect or disconnect the power source 102 and the load 104 via a respective electrical path 108, 118, 128, . . . 1X8. Switching system 100D may have X switching arrangements arranged in parallel between the power source 102 and the load 104, where X is any appropriate number. One or more of the switching arrangements might not feature a solid state switch, and one or more of the switching arrangements may include a solid state switch.

Having more than two switching arrangements as may be shown in FIG. 1C and FIG. 1D, may provide additional flexibility and optionality to the switching system 100, as may be discussed later on with regards to the example of FIG. 3.

Figure 1E:
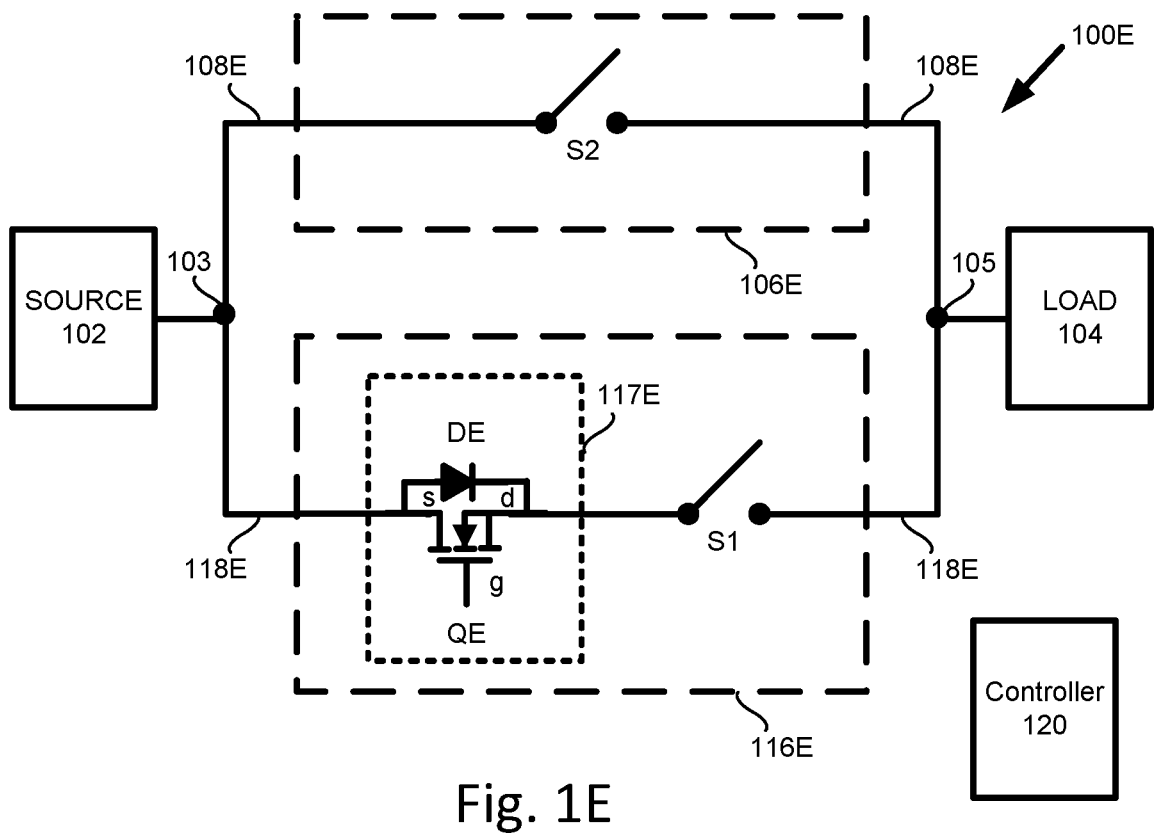
FIG. 1E shows a switching system, in accordance with certain examples of the presently disclosed subject matter.

FIG. 1E shows a switching system 100E according to examples of the present subject matter. Switching system 100E may be similar to other switching systems 100 shown herein. As shown in FIG. 1E, switching system 100E may include switching arrangements 106E, 116E.

Switching arrangement 106E may include a switch S2 connected between power source 102 and load 104. One terminal of the switch S2 may be connected to a terminal 103 of the power source 102, and one terminal of the switch S2 may be connected to a terminal 105 of the load 104. When switch S2 is ON then power source 102 may be connected to load 104 via the electrical path 108E. Switch S2 may be an electromechanical switch. Switching arrangement 106E might not include a switching unit.

Figure 1F:
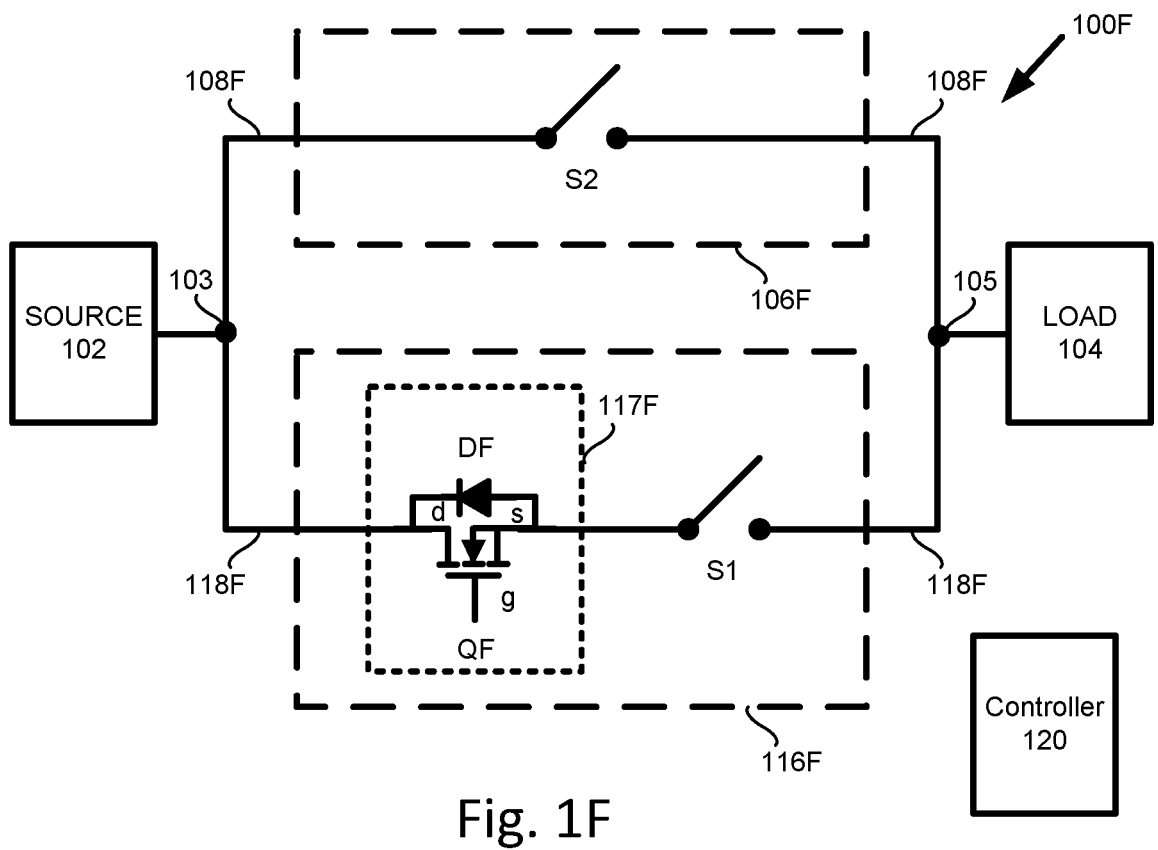
FIG. 1F shows a switching system, in accordance with certain examples of the presently disclosed subject matter.

Switching arrangement 116E includes a switching unit 117E. Switching unit 117E may include one or more switching elements. In the example of FIG. 1F, switching unit 117E is shown as including a transistor QE. Switching arrangement 116E may also include a switch S1. Switch S1 may be an electromechanical switch. Transistor QE and switch S1 may be serially connected between power source 102 and load 104. The transistor QE may be connected in parallel with a diode DE. For example, diode DE may be a body diode that is part of the transistor QE, or may be a separate diode connected in parallel to transistor QE. Diode DE may be arranged with the anode of diode DE connected to a terminal 103 of the power source 102 and the cathode of diode DE connected to one terminal of the switch S1. The source of transistor QE may be connected to a terminal 103 of power source 102. The drain of transistor QE may be connected to one terminal of the switch S1. Another terminal of the switch S1 may be connected to a terminal 105 of the load 104. The gate of transistor QE, and/or switches S1 and/or S2 may be connected to one or more controllers 120. The one or more controllers 120 may be configured to control the transistor QE, and/or switches S1 and/or S2. In some examples the placement of transistor QE and switch S1 on electrical path 118E may be reversed. For example, switch S1 may be arranged between the power source 102 and transistor QE, and transistor QE may be arranged between switch S1 and the load 104.

In some instances, switching arrangement 116E may be configured as a uni-directional switching arrangement. Additionally, transistor QE might be configured to block current in the direction from the load 104 to the power source 102 when transistor QE is OFF, but current may be able to flow through diode DE in the direction of the power source 102 to the load 104 even when transistor QE is OFF (in instances when switch S1 is closed). When transistor QE is ON current may flow through transistor QE in the direction of the load 104 to the power source 102 (when switch S1 is closed).

FIG. 1F shows a switching system 100F according to examples of the present subject matter. Switching system 100F may be similar to other switching systems 100 shown herein. Switching system 100F shows some examples of switching arrangements 106F and 116F.

Switching arrangement 106F may include a switch S2 connected between power source 102 and load 104. One terminal of the switch S2 may be connected to a terminal 103 of the power source 102 and one terminal of the switch S2 may be connected to a terminal 105 of the load 104. When switch S2 is ON then power source 102 is connected to load 104 via the electrical path 108F. Switch S2 may be an electromechanical switch. Switching arrangement 106F does not include a switching unit.

Switching arrangement 116F includes a switching unit 117F. Switching unit 117F may include one or more switching elements. In the example of FIG. 1F, switching unit 117F may include a transistor QF. Switching arrangement 116F may also include a switch S1. Switch S1 may be an electromechanical switch. Transistor QF and switch S1 may be serially connected between power source 102 and load 104. The transistor QF may be connected in parallel with a diode DF. For example, diode DF may be a body diode that is part of the transistor QF and/or may comprise a separate diode connected in parallel to transistor QF. Diode DF may be arranged with the anode of diode DF connected to one terminal of the switch S1 and the cathode of diode DF may be connected to a terminal 103 of the power source 102. The source of transistor QF may be connected to one terminal of the switch S1. The drain of transistor QF may be connected to a terminal 103 of the power source 102. Another terminal of the switch S1 may be connected to a terminal 105 of the load 104. The gate of transistor QF, and/or switches S1 and/or S2 may be connected to one or more controllers 120. The one or more controllers 120 may be configured to control the transistor QE, and/or switches S1 and/or S2. In some examples the placement of transistor QF and switch S1 on electrical path 118F may be reversed. For example, switch S1 may be arranged between the power source 102 and transistor QF, and transistor QF may be arranged between switch S1 and the load 104.

In some instances, switching arrangement 116F might not be configured as a bi-directional switching arrangement. For example, transistor QF might only be able to block current in the direction from the power source 102 to the load 104 when transistor QF is OFF, but current may be able to flow through diode DF in the direction of the load 104 to the power source 102 even when transistor QF is OFF (when switch S1 is closed). When transistor QF is ON, current may flow through transistor QF in the direction of the power source 102 to the load 104 (when switch S1 is closed).

Figure 2A:
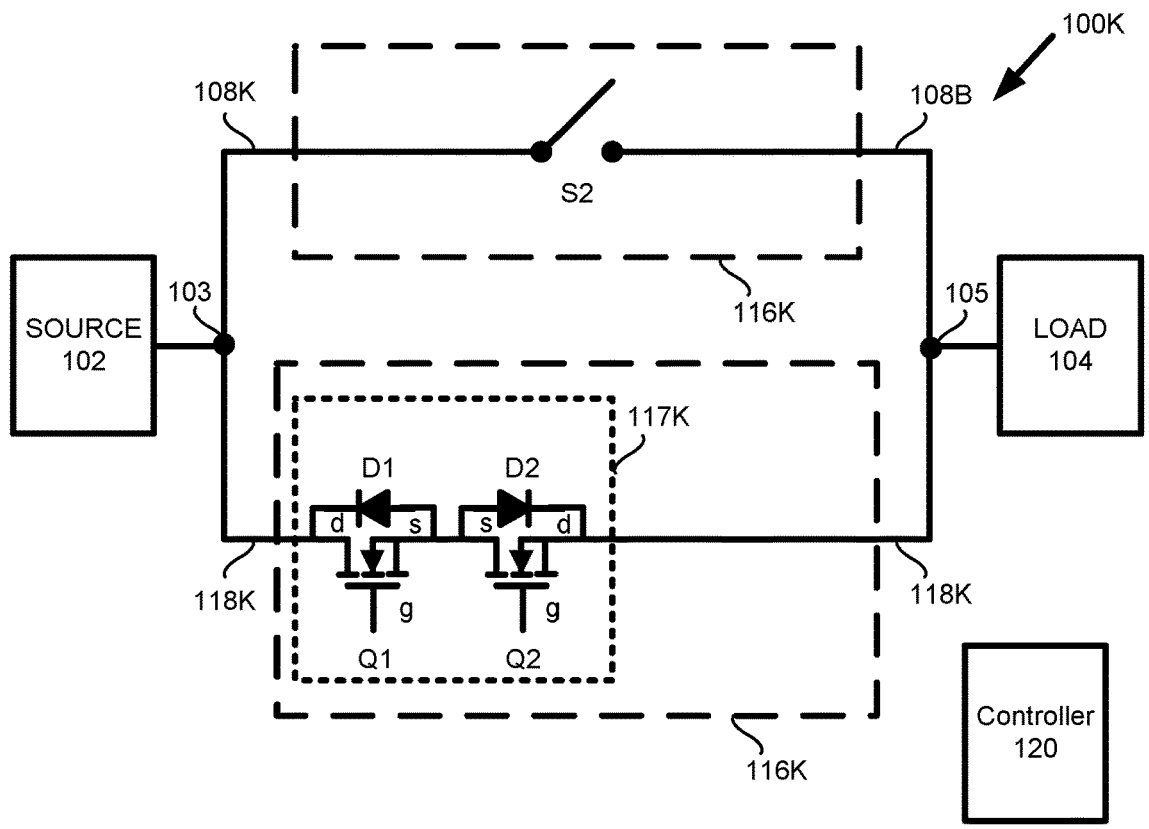
FIG. 2A shows a switching system, in accordance with certain examples of the presently disclosed subject matter.

FIG. 2A shows a switching system 100K according to examples of the present subject matter. Switching system 100K may be similar to other switching systems 100 shown herein. Switching system 100K shows an example for a switching arrangement 116K that includes a switching unit 117K but not an electromechanical switch. As may be shown in FIG. 2A, switching arrangement 117K may include transistors Q1 and Q2. Additionally, transistors Q1 and Q2 may have diodes D1 and D2 connected across them, respectively, in parallel. According to various examples, diodes D1 and D2 may comprise body diodes that are part of transistors Q1 and Q2 and/or they may comprise separate diodes connected in parallel to transistor Q1 and Q2. This arrangement may be used to effectively eliminate the need for electrical mechanical switch S1 (e.g., in FIGS. 1B-1F, above) to prevent current flow between the source 102 and load 104 when the switching arrangement 117K is OFF.

Figure 2B:
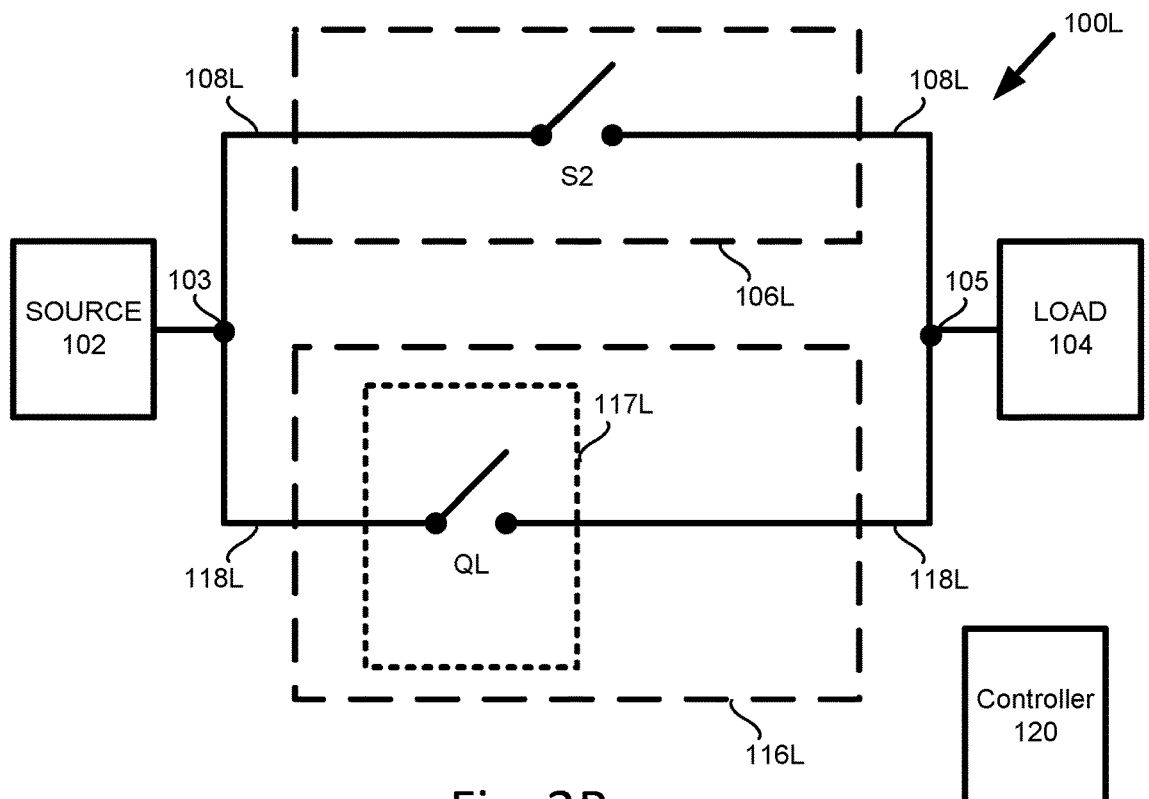
FIG. 2B shows a switching system, in accordance with certain examples of the presently disclosed subject matter.

FIG. 2B shows a switching system 100L according to examples of the present subject matter. Switching system 100L may be similar to other switching systems 100 shown herein. Switching system 100L shows an example for a switching arrangement 116L that includes a switching unit 117L but not an electromechanical switch. The one or more non-mechanical switches of switching unit are shown generalized as a single switch QL.

Figure 3:
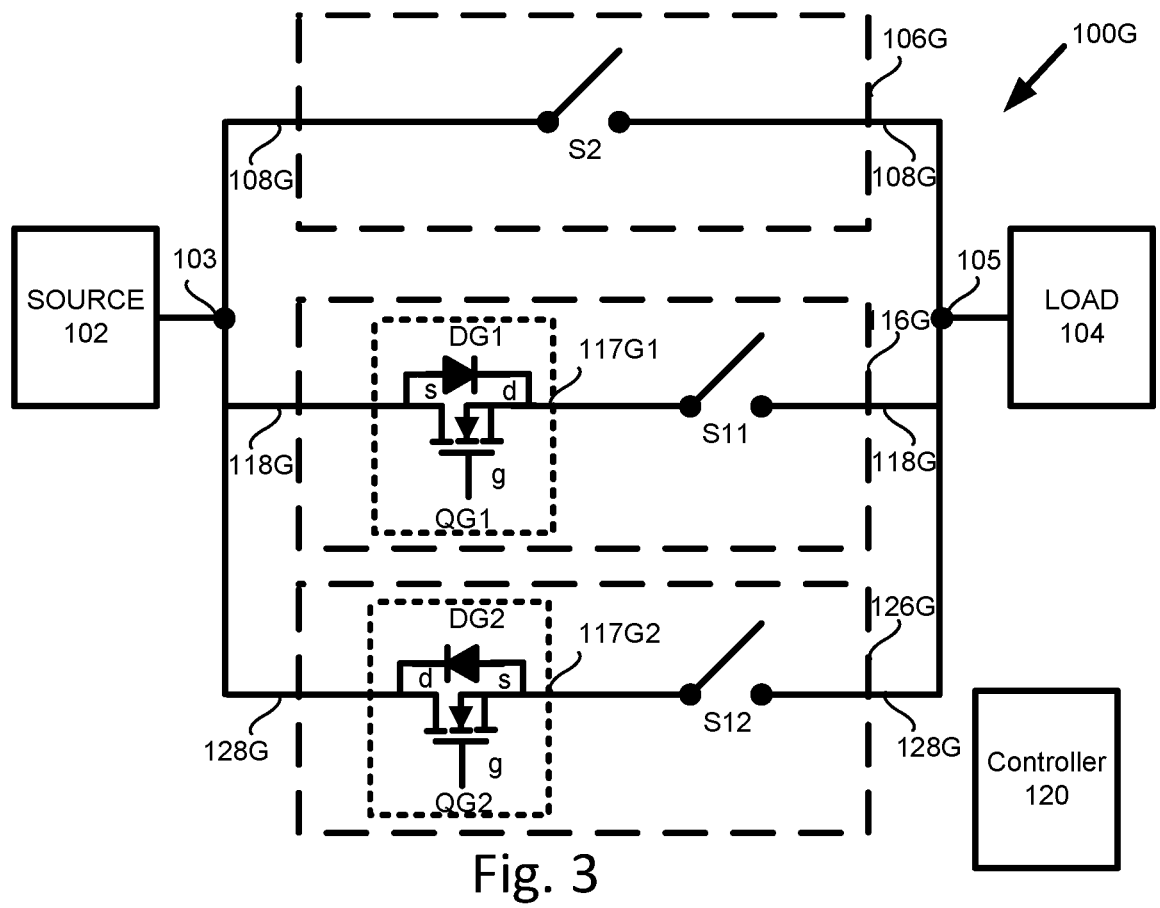
FIG. 3 shows a switching system, in accordance with certain examples of the presently disclosed subject matter.

FIG. 3 shows a switching system 100G according to examples of the present subject matter. Switching system 100G may be similar to other switching systems 100 shown herein. Switching system 100G shows examples for more than two switching arrangements 106G, 116G, 126G configured to connect or disconnect the power source 102 and the load 104 via a respective electrical path 108G, 118G, 128G.

Switching arrangement 106G may include a switch S2 connected between power source 102 and load 104. One terminal of the switch S2 may be connected to a terminal 103 of the power source 102 and one terminal of the switch S2 may be connected to a terminal 105 of the load 104. When switch S2 is ON then power source 102 may be connected to load 104 via the electrical path 108G.

Switching arrangement 116G may include a switching unit 117G1. Switching unit 117G1 may include a transistor QG1. Switching arrangement 116G may include a switch S11. Transistor QG1 and switch S11 may be serially connected between power source 102 and load 104. The transistor QG1 may be connected in parallel with a diode DG1. For example, diode DG1 may be a body diode that is part of the transistor QG1 or may be a separate diode connected in parallel to transistor QG1. Switching arrangement 116G may be arranged in a similar manner as switching arrangement 116E shown in FIG. 1E and described in detail above. In some examples the placement of transistor QG1 and switch S11 on the electrical path 118G may be reversed.

Switching arrangement 126G may include a switching unit 117G2. Switching unit 117G2 may include a transistor QG2. Switching arrangement 126G may include a switch S12. Transistor QG2 and switch S12 may be serially connected between power source 102 and load 104. The transistor QG2 may be connected in parallel with a diode DG2. For example, diode DG2 may be a body diode that is part of the transistor QG2 or may be a separate diode connected in parallel to transistor QG2. Switching arrangement 126G may be arranged in a similar manner as switching arrangement 116F shown in FIG. 1F and described in detail above. In some examples the placement of transistor QG2 and switch S12 on the electrical path 128G may be reversed.

In the example shown in FIG. 3, the switching arrangement 116G and the switching arrangement 126G might not be configured as bi-directional switching arrangements. However, switching system 100G may be configured to provide uni-directional switching in either of two directions, based on system requirements. This may be particularly useful when the power source 102 is a battery or other storage device that can store an electrical charge at a voltage that may be either higher or lower than the load voltage 104. For example, in a system where a source voltage is generally higher than a load voltage, switching arrangement 126G may be utilized to block current from flowing from the source to the load, and in a system where the source voltage is generally lower than the load voltage, switching arrangement 116G may be utilized to block current from flowing from the load to the source. As another example, if in a single system the power source 102 may have a voltage that is sometimes higher and sometimes lower than the load 104 voltage, then both switching arrangement 116G and switching arrangement 126G may be operated, for example: switching arrangement 116G may be operated when Vload>Vsource, or switching arrangement 126G may be used when Vsource>Vload.

Switching system 100G may provide bi-directional switching by controlling switching arrangement 116G to control the flow of current in the direction from the load 104 to the power source 102, and/or by controlling switching arrangement 126G to control the flow of current in the direction from the power source 102 to the load 104.

Accordingly, switching system 100G may be configured to provide bi-directional switching between the power source 102 and the load 104.

It will be appreciated that in some examples providing more than two switching arrangements may provide the switching system with additional functionality than may be possible with fewer switching arrangements.

Figure 4:
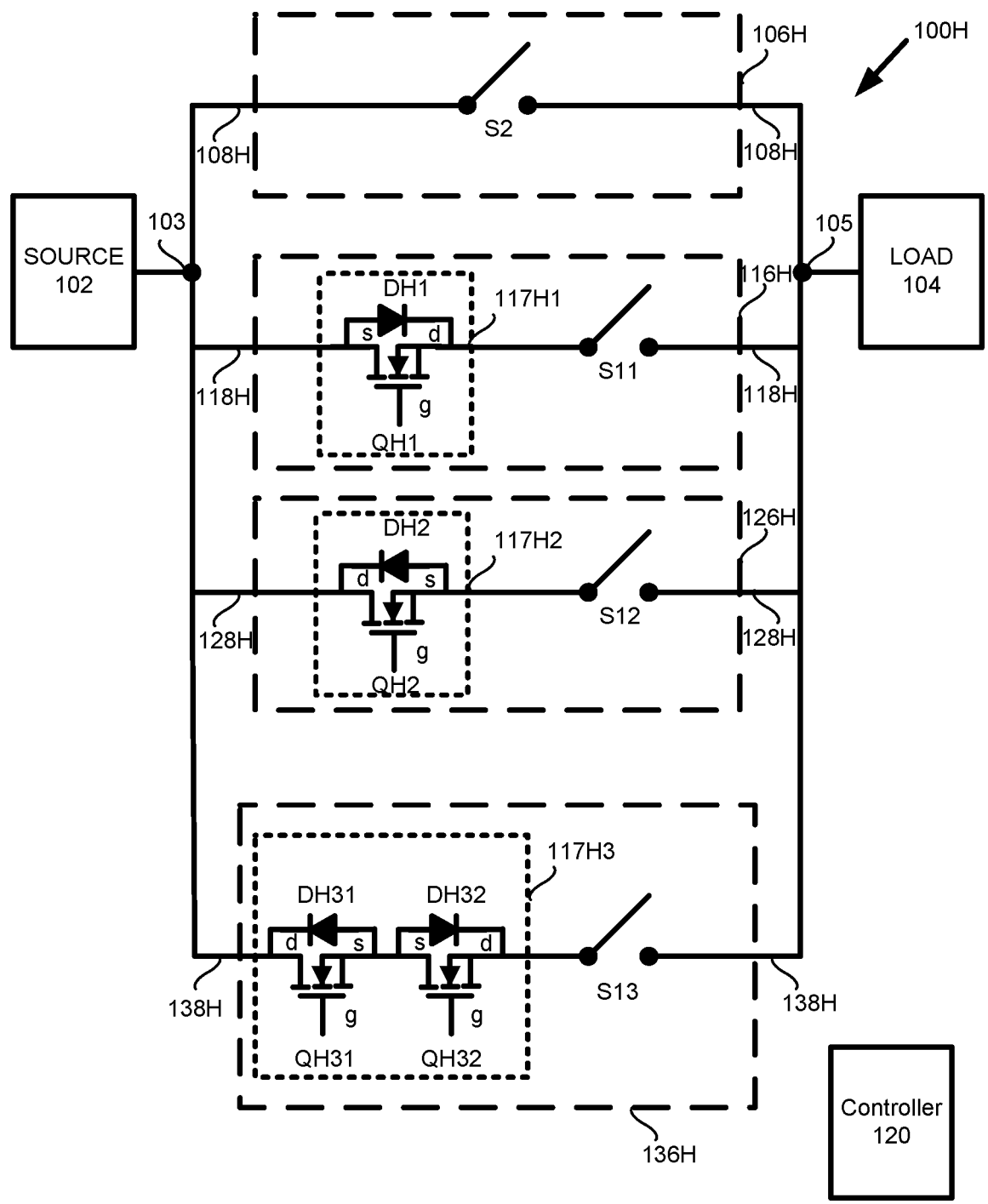
FIG. 4 shows a switching system, in accordance with certain examples of the presently disclosed subject matter.

FIG. 4 shows a switching system 100H according to examples of the present subject matter. Switching system 100H may be similar to other switching systems 100 shown herein. Switching system 100H shows examples for more than two switching arrangements 106H, 116H, 126H, and/or 136H configured to connect or disconnect the power source 102 and the load 104 via a respective electrical path 108H, 118H, 128H, and/or 138H.

Switching arrangements 106H, 116H, and 126H may be similar to the switching arrangements 106G, 116G, and 126G of FIG. 3. Switching arrangement 136H may be similar to the bi-directional switching arrangement 116B of FIG. 1B.

Switching system 100H may provide additional flexibility and optionality by providing both one or more non-bi-directional switching arrangements 116H and 126H, and one or more bi-directional switching arrangements 136H to choose from and operate.

Figure 5:
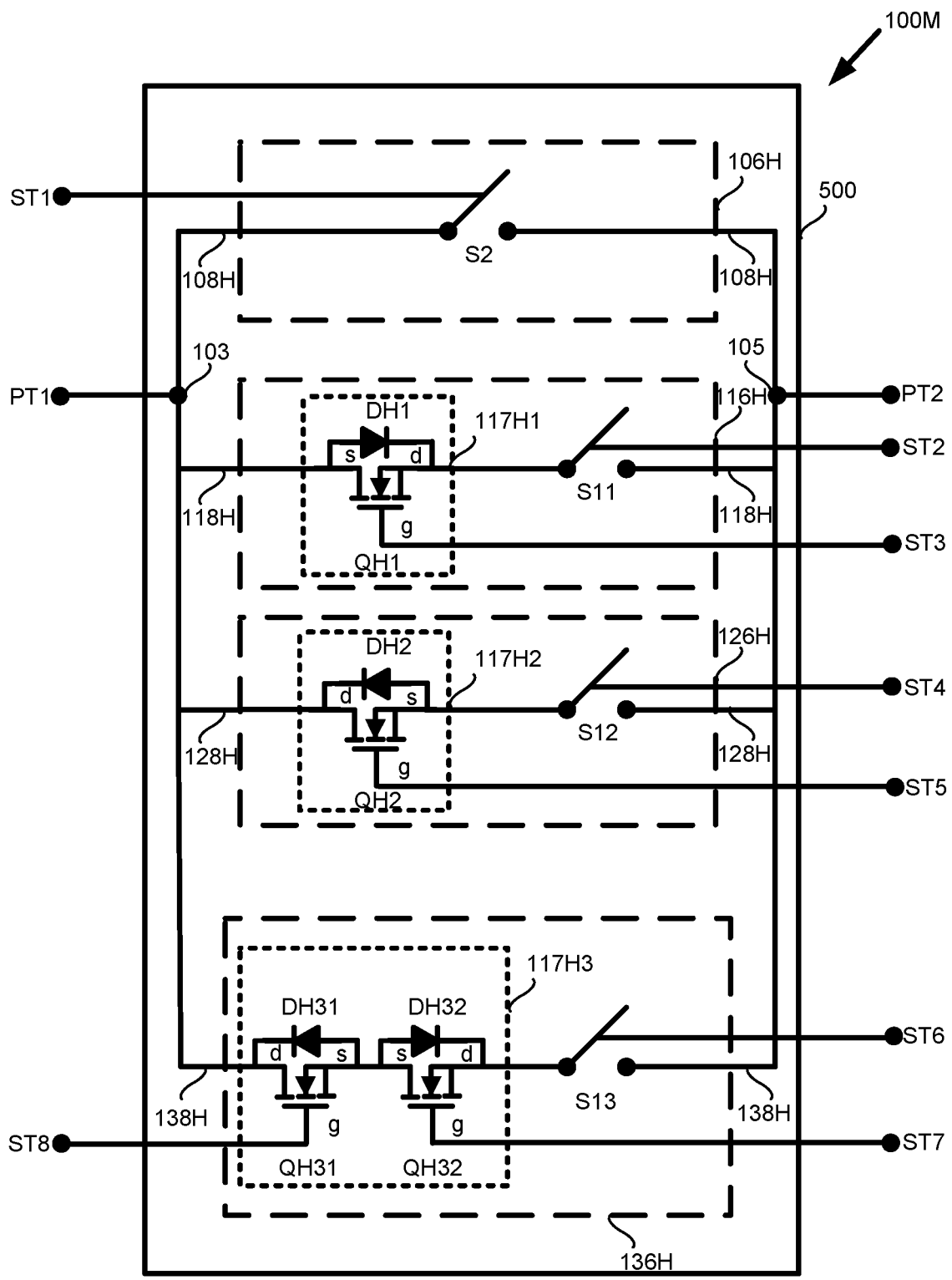
FIG. 5 shows a switching system, in accordance with certain examples of the presently disclosed subject matter.

FIG. 5 shows a switching system 100M according to examples of the present subject matter. Switching system 100M may be similar to other switching systems 100 shown herein. Switching system 100M shows an example of a housing 500 for elements of the switching system 100. Housing 500 may be arranged to contain and hold one or more elements of the switching system 100. For example, housing 500 may include a plurality of switching arrangements, such as the switching arrangements 106H, 116H, 126H, and/or 136H of FIG. 4. One or more controllers 120 may be internal or external to housing 500. Housing 500 may include a plurality of connection terminals PT1, PT2, ST1-ST8 for connecting the housing 500 to one or more other elements of the switching system. For example, the plurality of connection terminals may include one or more power terminals PT1 and PT2 arranged for connecting the housing 500 to a power source 102 or a load 104. The one or power terminals may be connected to respective terminal 103 or 105 that is connected to the plurality of switching arrangements. The plurality of connection terminals may include one or more switch terminals ST1-ST8 arranged for connecting the housing 500 to a switch controller, such as one or more controllers 120. As mentioned above, one or more controllers 120 arranged to control one or more switches of the plurality of switching arrangements may be located internally or externally to the housing 500. Switching system 100M may be manufactured and sold as an individual module connectable to external power terminals (e.g., source and load terminals) and an external controller according to a user's selection. Switching system 100M may be considered to be an effective DC relay configured to connect and disconnect a current path under direct current conditions, while switches S2, S11-S13 may all be AC relays, which may be less expensive and easier to implement than DC relays.

Figure 6:
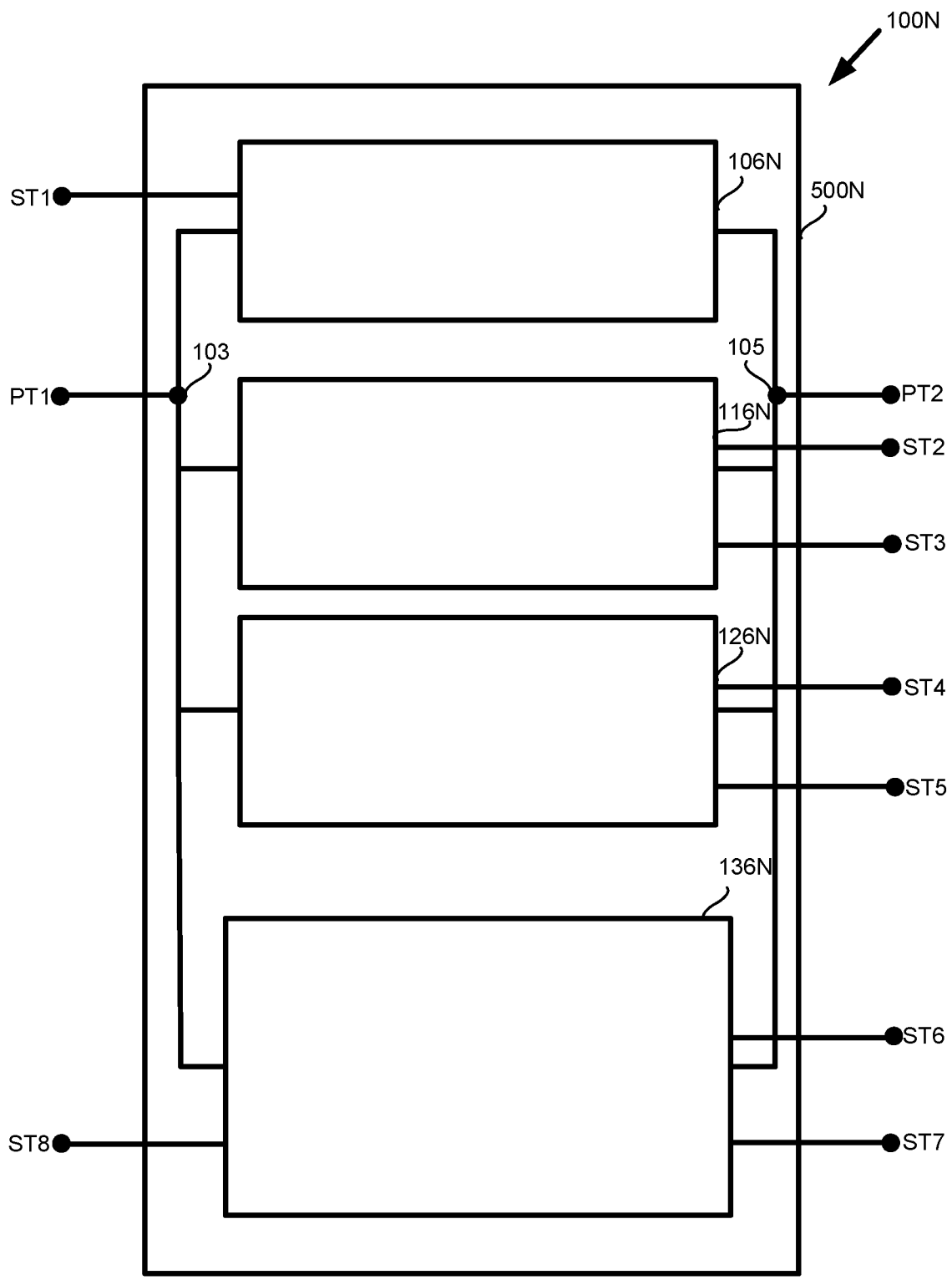
FIG. 6 shows a switching system, in accordance with certain examples of the presently disclosed subject matter.

FIG. 6 shows a switching system 100N according to examples of the present subject matter. Switching system 100N may be similar to other switching systems 100 shown herein. Switching system 100N shows an example of a housing 500N for elements of the switching system 100. Switching system 100N includes a plurality of switching arrangements 106N, 116N, 126N, and/or 136N that each may include one or more switches connected to a respective switch terminal ST. Housing 500N may also include one or more power terminals PT1 and/or PT2 that may be arranged to connect the housing 500N to a respective power source 102 or a respective load 104. Each power terminal PT may be connected to a terminal 103, 105 that may be connected to the plurality of switching arrangements 106N, 116N, 126N, and/or 136N. The operation of the switching system 100N may be dependent upon the connection of the connection terminals PT1, PT2, and/or ST1-ST8, and/or control of the switching arrangements. For example, switching system 100N may have a plurality of different modes of operation depending on how housing 500N is connected to other elements of the switching system 100N or how one or more switches of the plurality of switching arrangements are controlled. For example, only some of the switch terminals ST may be connected to one or more controllers 120 or controlled. Switching system 500N may have bi-directional modes of operation or non-bi-directional modes of operation depending on the connection of the housing 500N or the control of the plurality of switching arrangements.

Figure 7:
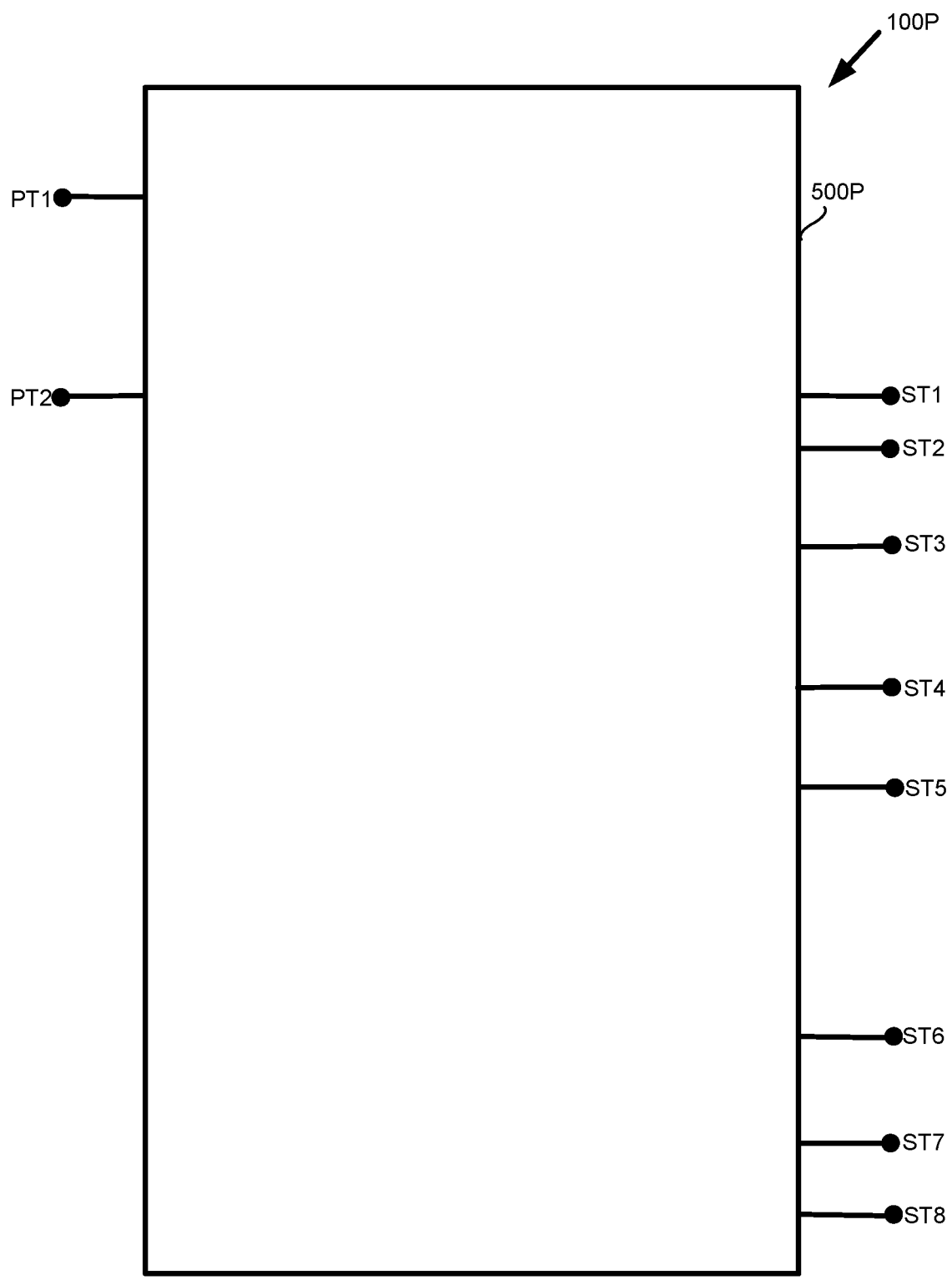
FIG. 7 shows a switching system, in accordance with certain examples of the presently disclosed subject matter.

FIG. 7 shows a switching system 100P according to examples of the present subject matter. Switching system 100P may be similar to other switching systems 100 shown herein. Switching system 100P shows an example of an external view of a housing 500P for elements of the switching system 100. Housing 500P may be similar to or the same as other housings 500 shown herein. Housing 500P may contain and hold a plurality of switching arrangements. Housing 500P may contain and hold one or more controllers 120. Housing 500P may include one or more power terminals PT1, PT2 that are arranged to connect the housing 500P to a respective power source 102 or a respective load 104. Housing 500P may include one or more switch terminals ST1-ST8 that are arranged to connect a respective switch of the plurality of switching arrangements of the housing 500P to a controller 120 for controlling that switch.

Figure 8:
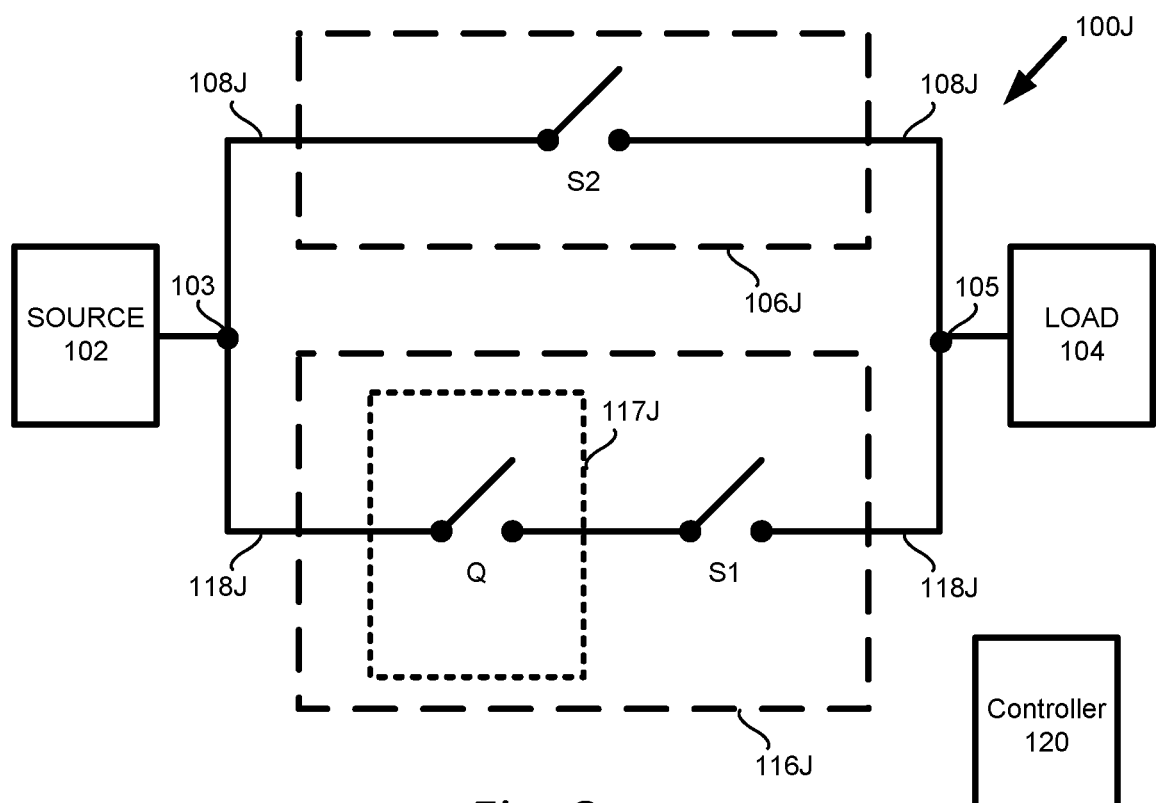
FIG. 8 shows a switching system, in accordance with certain examples of the presently disclosed subject matter.

FIG. 8 shows a switching system 100J according to examples of the present subject matter. Switching system 100J may be similar to other switching systems 100 shown herein. Switching system 100J shows an example of a switching arrangement 116J with a switching unit 117J including a generalized switching element Q. Switching element Q is shown as a switch in FIG. 8, FIG. 11A to FIG. 11F, and FIG. 13A to FIG. 13F, for the sake of simplicity. Switching element Q may be any appropriate switching element, including examples of one or more switching elements illustrated herein. For example, switching element Q may be the plurality of transistors Q1 and Q2 shown in FIG. 1B. As another example, switching element Q may be the transistor QE shown in FIG. 1E, or the transistor QF shown in FIG. 1F. It will be appreciated that in the figures where switching element Q is shown in the ON state with a short circuit connecting the terminals of switching element Q (for example, as may be shown in FIG. 11C), then it may represent a situation where one or more transistors are in the ON state. For example, if switching element Q is a pair of transistors Q1, Q2, then the ON state of switching element Q may represent switch Q1 and/or switch Q2 being in the ON state. As another example, if switching element Q is a single transistor QE or QF, then the ON state of switching element Q may represent switch QE or switch QF being in the ON state.

With reference to FIG. 8, switching arrangement 106J may include a switch S2 connected between power source 102 and load 104. One terminal of the switch S2 may be connected to a terminal 103 of the power source 102 and one terminal of the switch S2 may be connected to a terminal 105 of the load 104. When switch S2 is ON then power source 102 is connected to load 104 via the electrical path 108J. Switching arrangement 116J may include a switching element Q and a switch S1 switchably connected between power source 102 and load 104. The switching element Q may be connected between a terminal 103 of the power source 102 and one terminal of the switch S1. Another terminal of the switch S1 may be connected to a terminal 105 of the load 104. The switching element Q, and/or switches S1 and/or S2 may be connected to one or more controllers 120. The one or more controllers 120 may be configured to control the switching element Q and/or switches S1 and/or S2. In some examples the placement of switching element Q and switch S1 on electrical path 118J may be reversed. For example, switch S1 may be arranged between the power source 102 and switching element Q, and switching element Q may be arranged between switch S1 and the load 104. Switches S1 and S2 may be switches designed for operation under alternating currents (e.g., AC relays), and switching element Q may include one or more solid state switches designed for operating under all currents (i.e., switching element Q may be safely used to connect or disconnect DC currents as well as AC currents).

The switching arrangement 116J may or might not be configured as a bi-directional switching arrangement. For example, switching element Q may be a single transistor, or may comprise back-to-back transistors (e.g., back-to-back MOSFETs, or two IGBTs, each having a parallel diode, and the diodes connected back-to-back).

Figure 9:
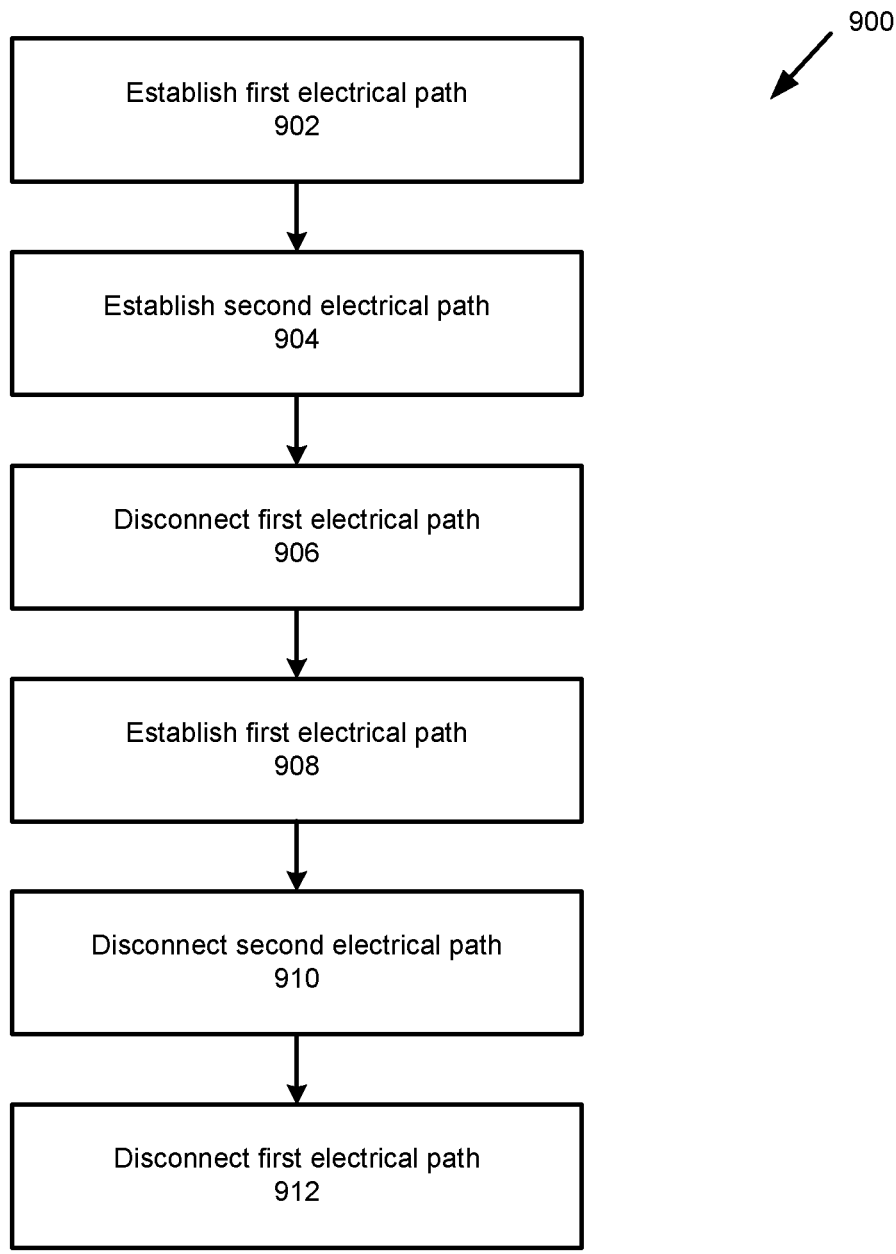
FIG. 9 shows a flow chart of a method, in accordance with certain examples of the presently disclosed subject matter.

FIG. 9 shows a flow chart of a method 900 for operating a switching system, according to one or more examples of the present subject matter.

Steps 902 to 906 may be executed (e.g., by a controller configured to operate the switching system) to establish a connection between a power source and a load via a switching arrangement, such as a switching arrangement 106 described above and shown in the figures. Further, the method 900 may perform steps 908 to 912 to disconnect a connection between a power source and a load via the switching arrangement, wherein the switching arrangement may have been connected to establish an electrical path between the power source and the load at steps 902 to 906.

At 902, the method 900 may establish a first electrical path. For example, the switching system may be configured to establish a first electrical path, such as an electrical path 118 described above and shown in the figures. The first electrical path may be connected between a power source and a load. The first electrical path may be established using a switching arrangement with one or more switching elements. For example, the first electrical path may be established by switching ON transistor Q1, and/or transistor Q2, and switch S1 (shown in FIG. 1B) to establish an electrical path 118B between power source 102 and load 104.

At 904, method 900 may establish a second electrical path. For example, the switching system may be configured to establish a second electrical path such as an electrical path 108 described above and shown in the figures. The second electrical path may also be connected between the power source and the load. The second electrical path may be arranged in parallel to the first electrical path. The second electrical path may be established while the first electrical path remains connected. The second electrical path may be established using a switching arrangement with one or more switching elements. For example, the second electrical path may be established by switching ON switch S2 (as may be shown in FIG. 1B) to establish an electrical path 108B between power source 102 and load 104. There may be one or more benefits to first establishing the first electrical path before establishing the second electrical path, and connecting the second electrical path while the first electrical path is connected. For example, the second electrical path may have a lower ON resistance (since the second electrical path might not include a solid state switch, which generally has a higher ON resistance than an electromechanical relay), which may provide a benefit to establishing the second electrical path to carry steady-state current. It may be less difficult to establish or less dangerous to establish the second electrical path after establishing the first electrical path or while the first electrical path is connected. For example, one or more switching elements of the first electrical path may be non-mechanical switching elements designed to turn ON or OFF while supporting a direct current (DC), while the electromechanical switches of the first and second electrical paths might not be rated to handle DC current, but may provide galvanic isolation in the OFF position.

At step 906, method 900 may disconnect the first electrical path. For example, the switching system may be configured to disconnect the first electrical path. The first electrical path may be disconnected by turning OFF one or more switching elements of a switching arrangement. For example, the first electrical path may be disconnected by switching OFF transistor Q1, transistor Q2, and/or switch S1 (as may be shown in FIG. 1B) to disconnect the electrical path 118B between power source 102 and load 104. The second electrical path may remain connected between power source 102 and load 104. Optionally, the first and second electrical paths may both conduct current in tandem when the switching system is in the ON position.

At a second time, such as after establishing the second electrical path between the power source and the load, it may be desirable to disconnect the second electrical path in order to disconnect the power source from the load. In case a DC current is flowing through the power source and the load, and the electromechanical switch of the second electrical path is designed to only disconnect an AC current by utilizing a zero-current crossing of the current, and not designed to disconnect a DC current, it might be dangerous to disconnect the second electrical path under the DC current. Therefore, it may be beneficial to use the first electrical path to disconnect the second electrical path as detailed below.

At step 908, the first electrical path may be established again. For example, the switching system may be configured to establish the first electrical path again. For example, the first electrical path may be established again by switching ON switch S1 (shown in FIG. 1B) and then transistor Q1, and/or transistor Q2, to establish the electrical path 118B between power source 102 and load 104. The first electrical path may be established again while the second electrical path remains connected between power source 102 and load 104.

At step 910, the second electrical path may be disconnected. For example, the switching system may be configured to disconnect the second electrical path. The second electrical path may be disconnected while the first electrical path remains connected. The second electrical path may be disconnected by turning OFF one or more switching elements of a switching arrangement. For example, the second electrical path may be disconnected by switching OFF switch S2 (as may be shown in FIG. 1B) to disconnect the electrical path 108B between power source 102 and load 104. The first electrical path may remain connected between power source 102 and load 104. There may be one or more benefits to first establishing the first electrical path before disconnecting the second electrical path, and disconnecting the second electrical path while the first electrical path is connected. For example, it may be less difficult to disconnect or less dangerous to disconnect the second electrical path after establishing the first electrical path or while the first electrical path is connected, since current flowing through the first electrical path may be diverted to the second electrical path during the switching. For example, one or more switching elements of the first electrical path may be non-mechanical switching elements, for example, solid state switches such as transistors. As an example, the first electrical path may include a soft switching arrangement with a switching unit, and the second electrical path may include a hard switching arrangement, without a solid state switching unit.

At step 912, the method may disconnect the first electrical path again. For example, the switching system may be configured to disconnect the first electrical path again. For example, the first electrical path may be disconnected again by switching OFF transistor Q1 and/or transistor Q2, and then switch S1 (as may be shown in FIG. 1B), which may result in disconnect of the electrical path 118B between power source 102 and load 104. By switching OFF the solid state switches Q1 and/or Q2 before switching off switch S1, a direct current may be eliminated by the solid state switches that may be designed and rated to disconnect direct currents. By then switching off switch S1, galvanic isolation between the source and load may be achieved.

Figure 10:
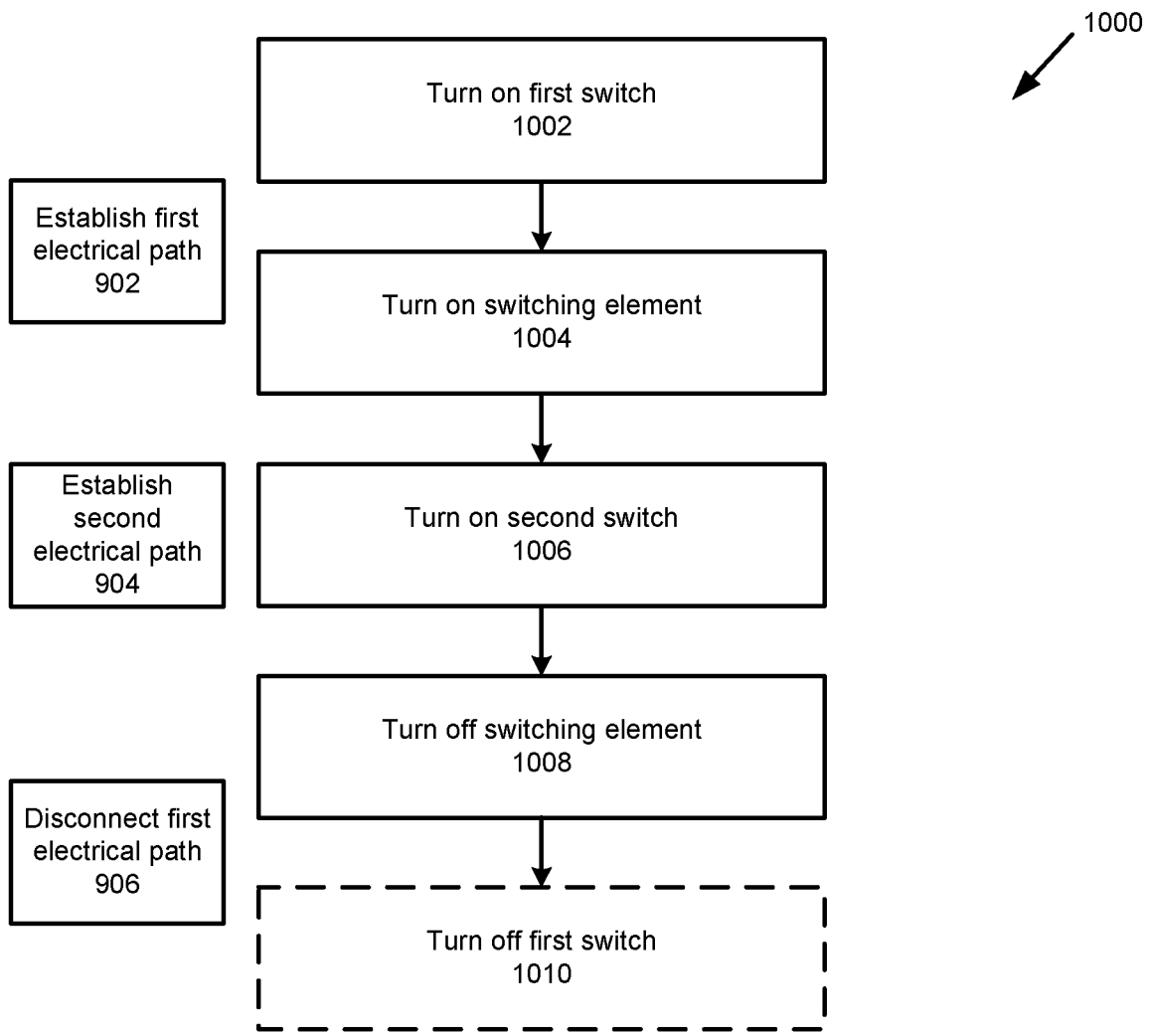
FIG. 10 shows a flow chart of a method, in accordance with certain examples of the presently disclosed subject matter.

FIG. 10 shows a flow chart of a method 1000 to establish a connection between a power source and a load via a switching arrangement, according to one or more examples of the present subject matter. As mentioned above, one or more switches of the switching arrangement may be controlled by one or more controllers 120.

In particular method 1000 covers actions that may occur during steps 902 to 906 of method 900 in FIG. 9.

For ease of understanding, method 1000 will be described in conjunction with FIG. 11A to FIG. 11F. It should be understood, however, that method 1000 is not so limited and that method 1000 may be performed by other elements. The switching system 100J shown in FIG. 11A to FIG. 11F may be similar to switching system 100J shown in FIG. 8 and described in detail above.

Figure 11A:
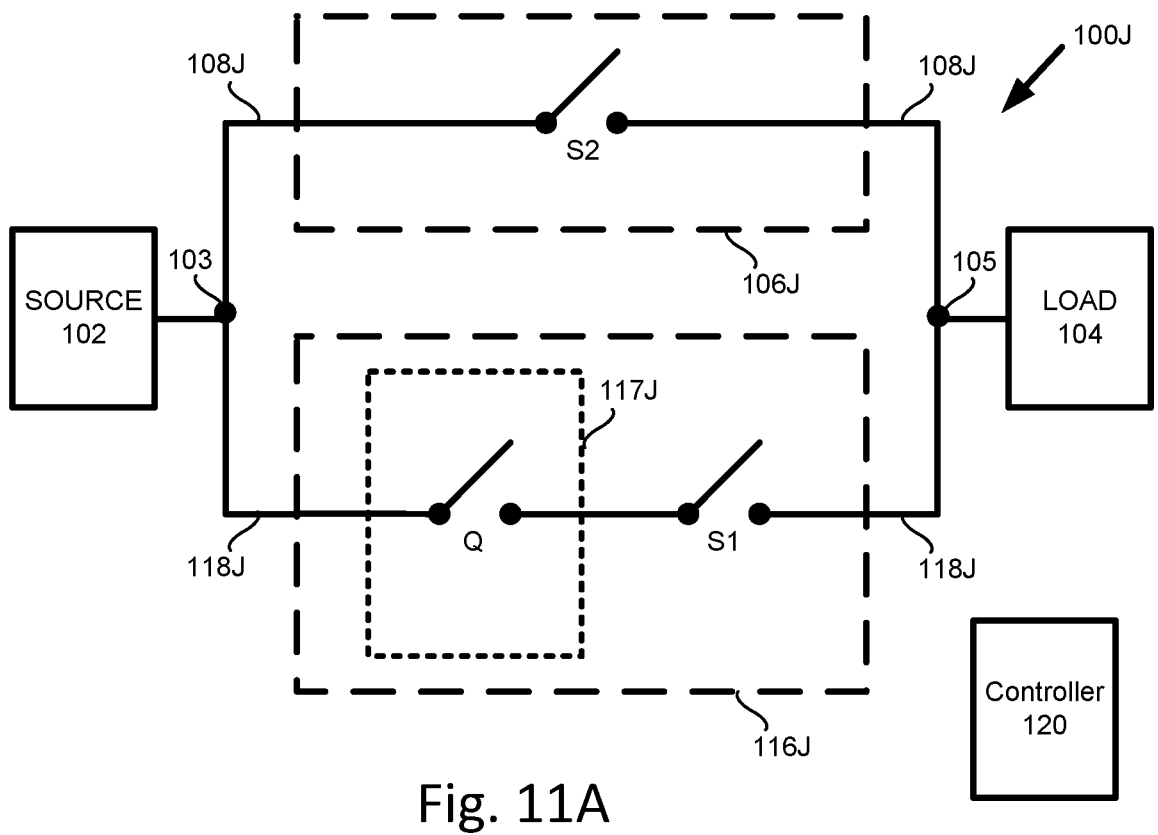
FIGS. 11A to 11F show a switching system, in accordance with certain examples of the presently disclosed subject matter.
Figure 11B:
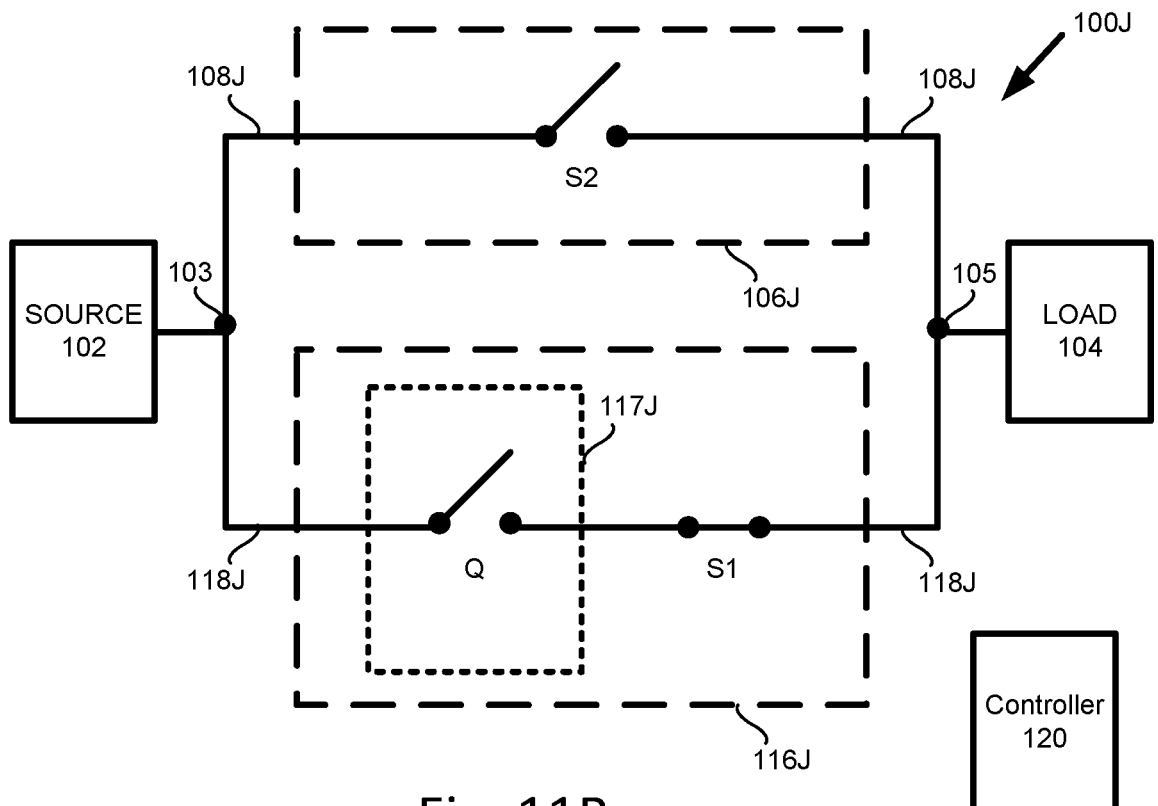

At step 1002, a first switch may be turned ON. For example, FIG. 11A shows switching system 100J in a preliminary OFF state with no closed circuit connections between power source 102 and load 104. FIG. 11B shows the first switch, switch S1, turned ON as at 1002.

Figure 11C:
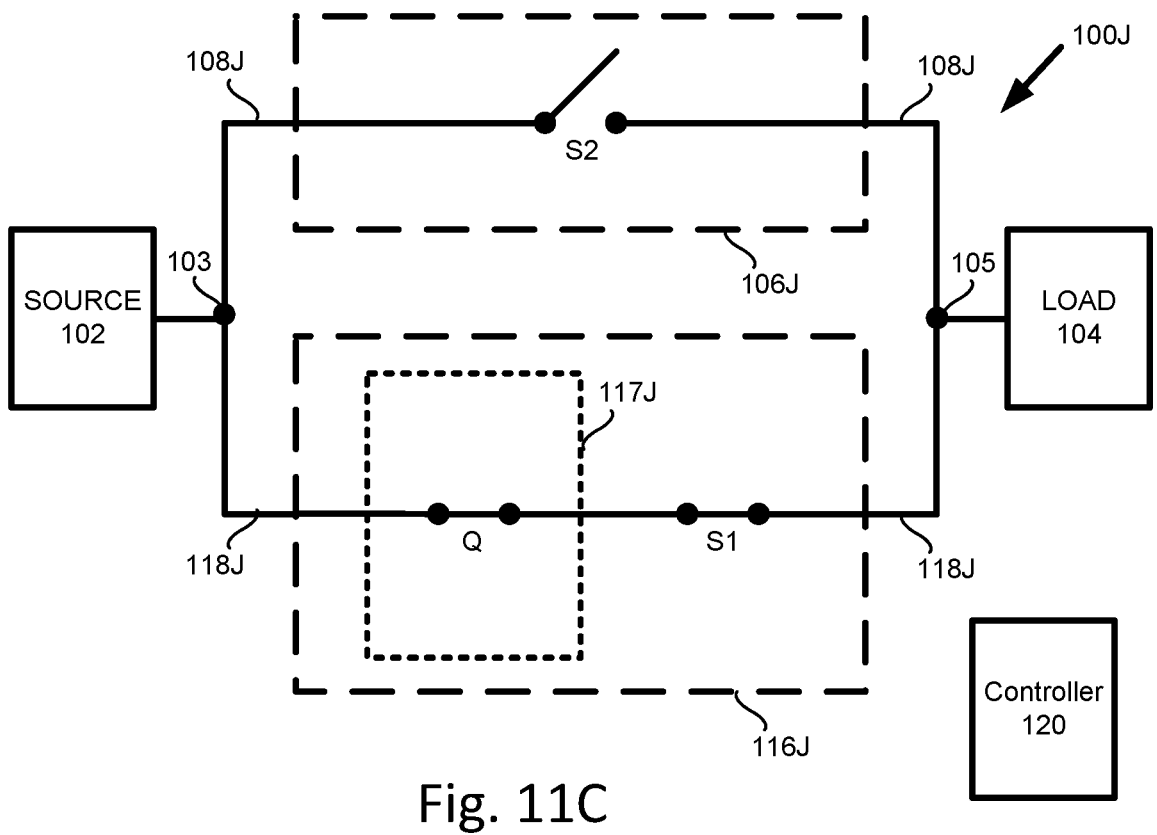

At step 1004, a switching element may be turned ON. The switching element may be connected in series with the first switch. FIG. 11C shows an example of switching element Q turned ON as at 1004. Switching element Q may be in series with switch S1. Closing the first switch S1 and switching element Q may establish a first electrical path 118J between a power source 102 and a load 104. It may be easier or safer to establish the first electrical path 118J by first closing the first switch S1 and then closing the switching element Q, since in that case, the first switch S1 is switched under no-current conditions. Switching element Q may include one or more non-mechanical switching elements, for example, solid state devices such as transistors, thyristors and/or SCRs.

Figure 11D:
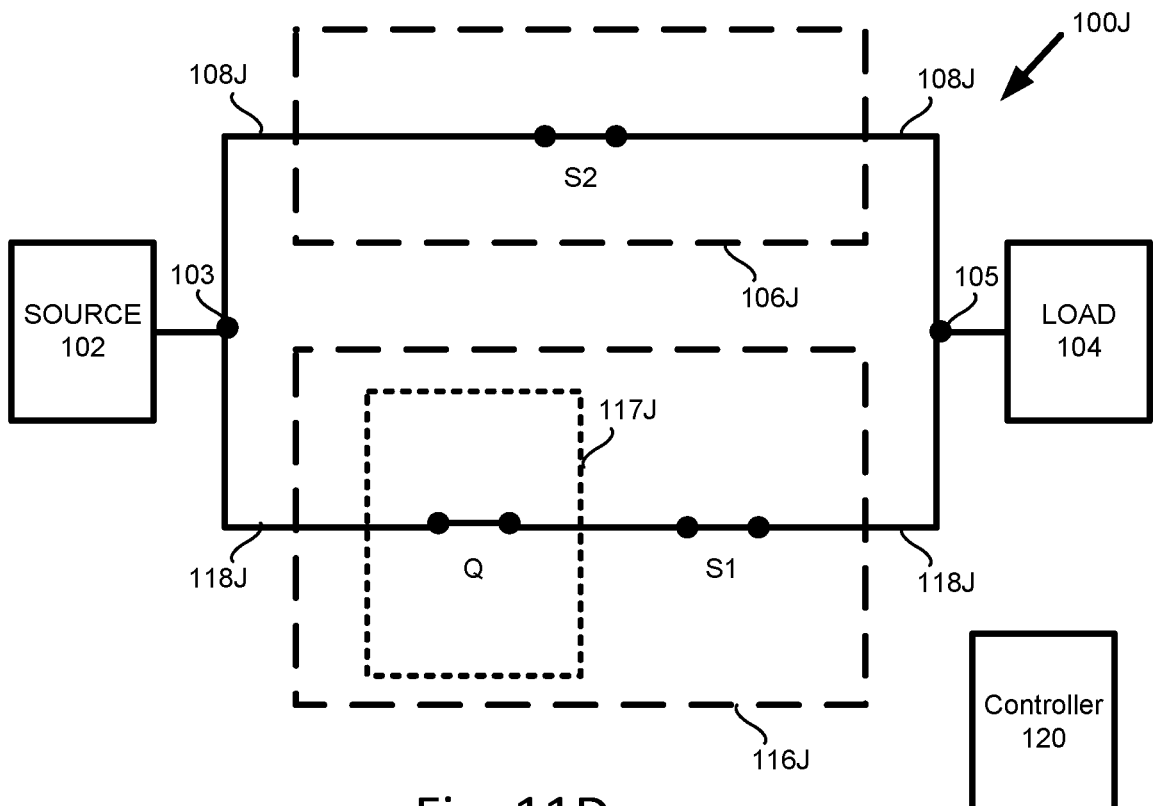

At step 1006, a second switch may be turned ON. The second switch may be connected in parallel to the series connection of the first switch and the switching element. For example, FIG. 11D shows the second switch, switch S2, turned ON as at 1006. Switch S2 may be connected in parallel to the series connection of switch S1 and switching element Q. Closing the second switch S2 may establish a second electrical path 108J between the power source 102 and the load 104. It may be easier or safer to establish the second electrical path by establishing the first electrical path and then establishing the second electrical path, since in that case, switch S2 may be switched under zero-current conditions. Switch S2 may be an electromechanical switch.

Figure 11E:
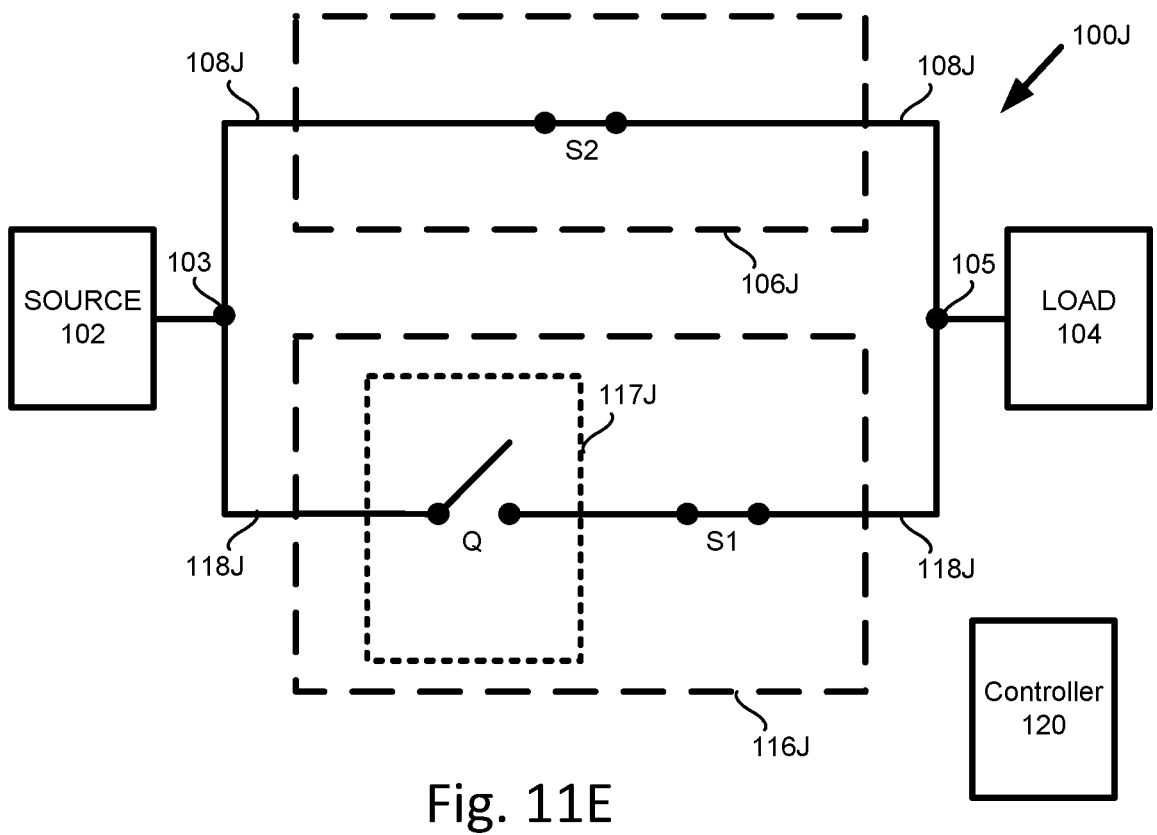

At step 1008, a switching element may be turned OFF. For example, FIG. 11E shows switching element Q turned OFF as at 1008. Opening the switching element Q may disconnect the first electrical path 118J between the power source 102 and the load 104. The second electrical path 108J may remain connected between power source 102 and load 104.

Figure 11F:
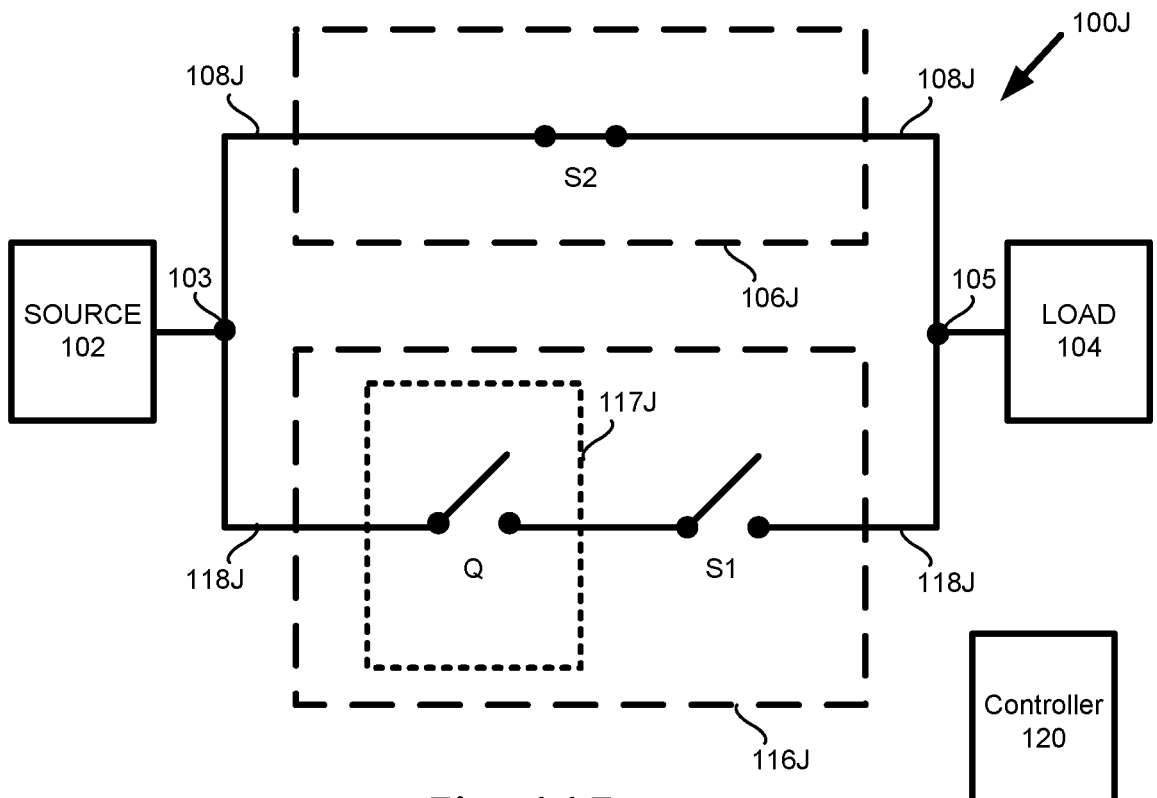

Optionally, at step 1010, the first switch may be turned OFF. For example, FIG. 11F shows the first switch, switch S1, turned OFF as at step 1010. Opening the first switch S1 may be optional since opening the switching element Q at step 1008 may have already disconnected the first electrical path 118J between the power source 102 and the load 104. Opening switching element Q at step 1008 may create an open circuit on the first electrical path 118J between power source 102 and load 104 thereby stopping the flow of current between power source 102 and load 104. It may be easier or safer to disconnect the first switch S1 by first opening the switching element Q and then opening the first switch S1. Switch S1 may be an electromechanical switch.

Figure 12:
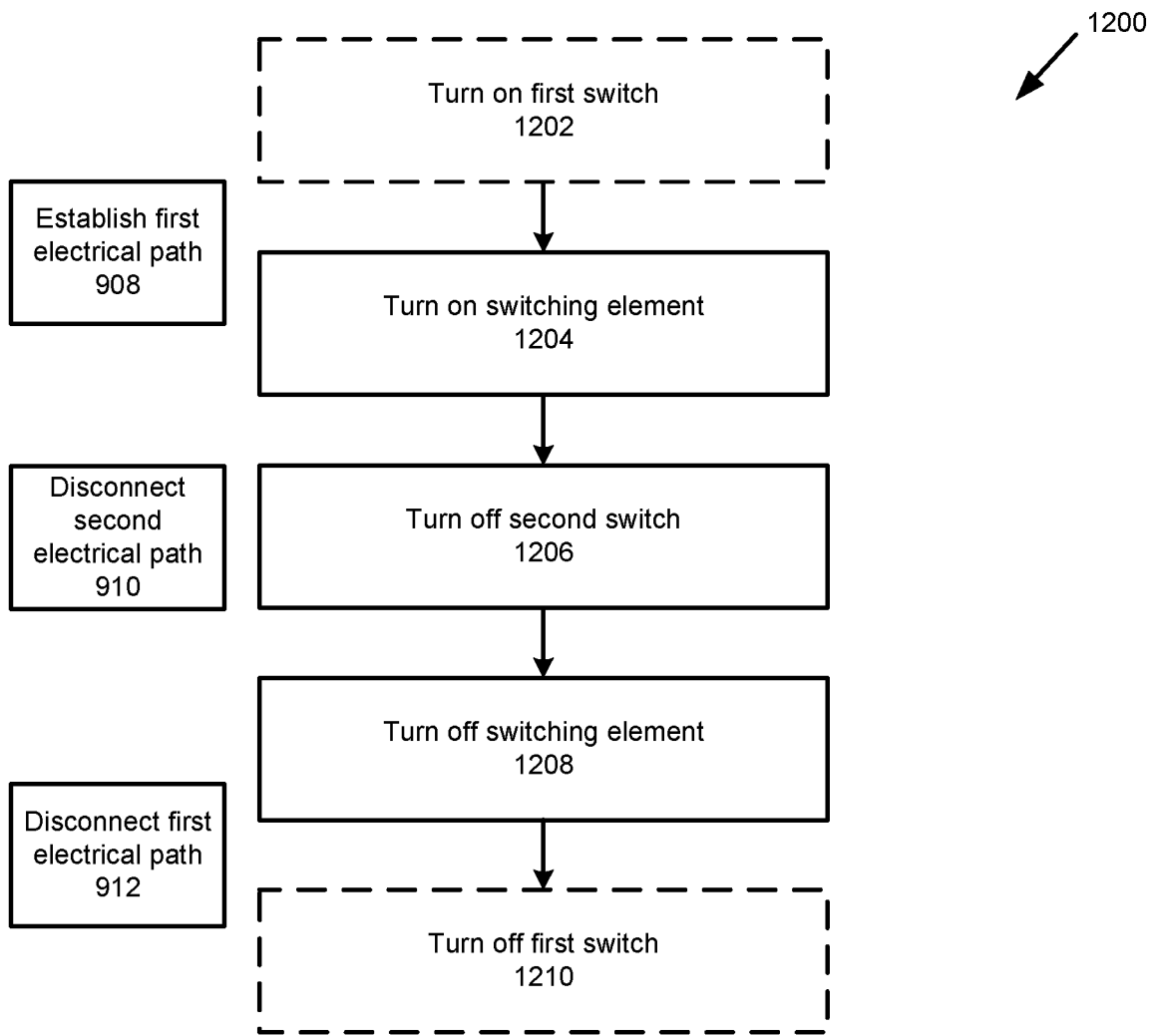
FIG. 12 shows a flow chart of a method, in accordance with certain examples of the presently disclosed subject matter.

FIG. 12 shows a flow chart of a method 1200 to disconnect a connection between a power source and a load via a switching arrangement, according to one or more examples of the present subject matter. As mentioned above, one or more switches of the switching arrangement may be controlled by one or more controllers 120.

As may be shown in FIG. 12, method 1200 may correspond to elements 908 to 912 of method 900 shown in FIG. 9.

For ease of understanding, method 1200 will be described in conjunction with FIG. 13A to FIG. 13F. But it should be understood that method 1200 is not so limited and that method 1200 may be performed by other elements. The switching system 100J shown in FIG. 13A to FIG. 13F may be similar to switching system 100J shown in FIG. 8 and described in detail above.

Figure 13A:
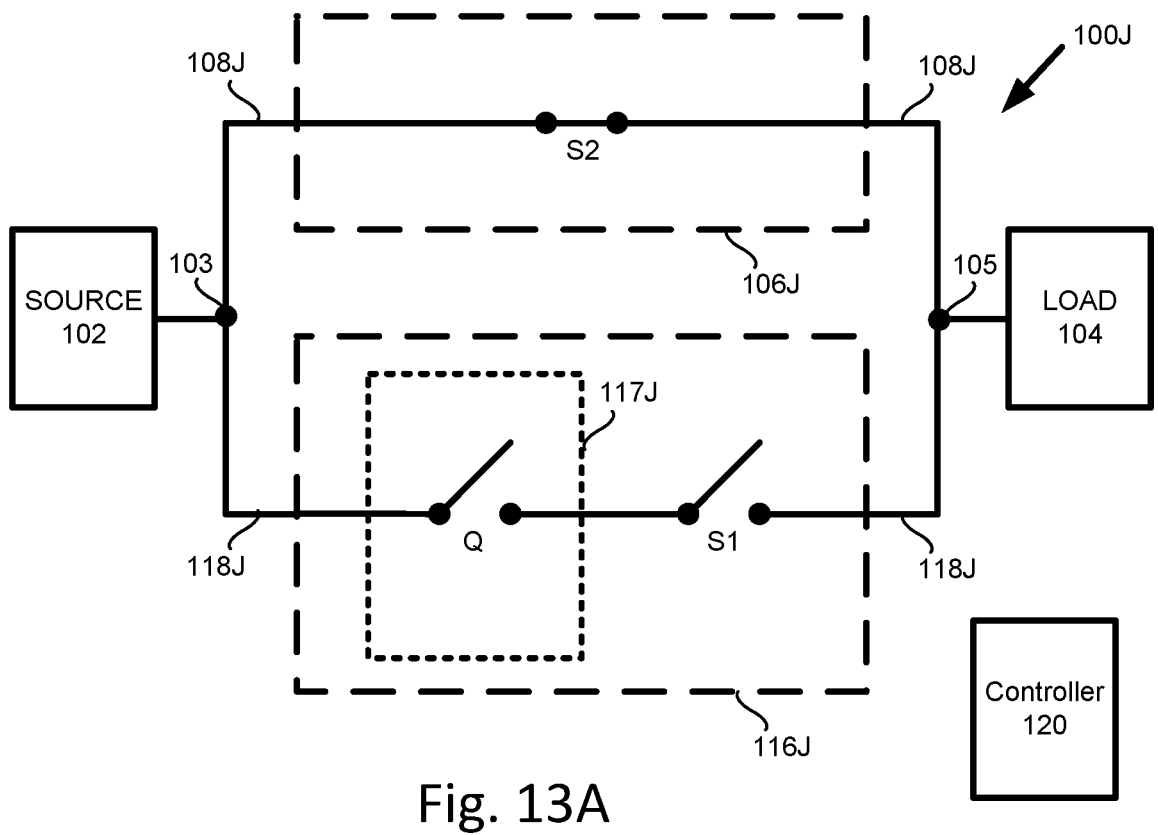
FIGS. 13A to 13F show a switching system, in accordance with certain examples of the presently disclosed subject matter.
Figure 13B:
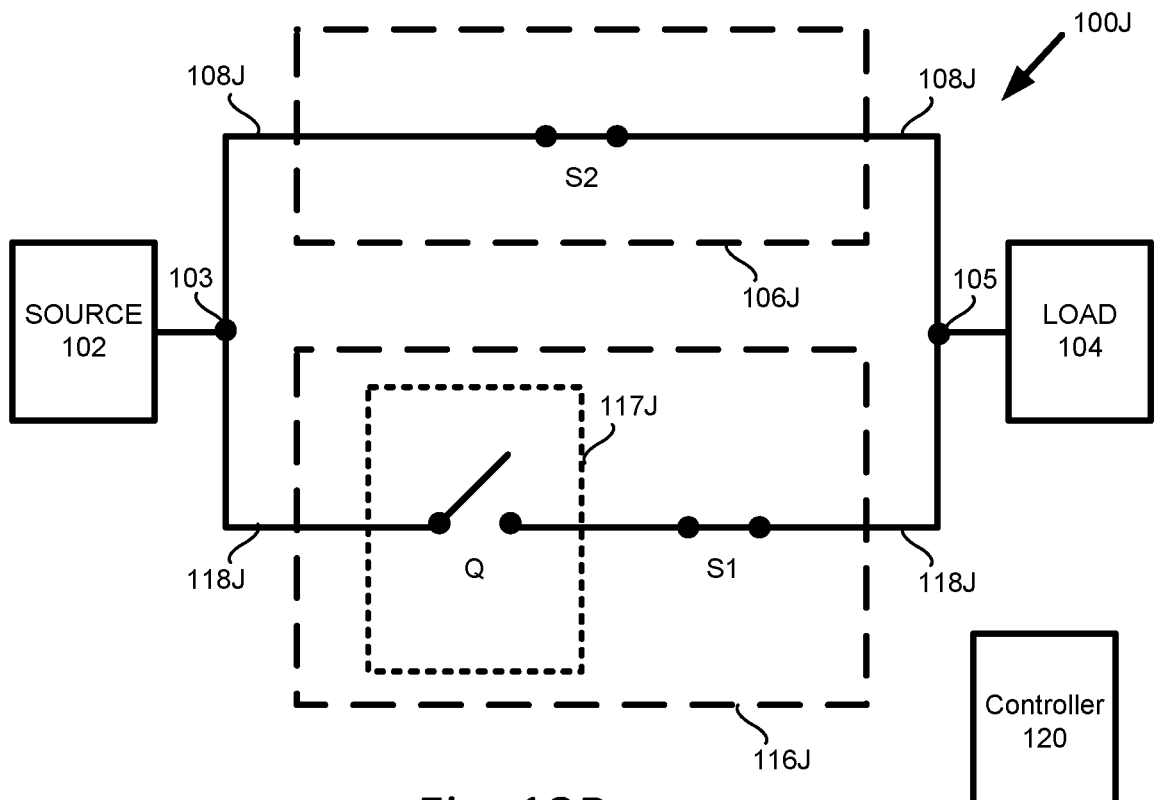

At step 1202, a first switch may be turned ON. For example, FIG. 13A shows switching system 100J in a preliminary ON state with a closed circuit connection between power source 102 and load 104 via switch S2 of the second electrical path 108J. FIG. 13A may be the state of switching system 100J after 1010 of method 1000. Since, as mentioned above, the first electrical path 118J may have been disconnected by opening switching element Q it might not be necessary to open switch S1 at 1010. However, if switch S1 is open, then it may be closed at step 1202. FIG. 13B may shows an example where the first switch, switch S1, is turned ON at step 1202.

Figure 13C:
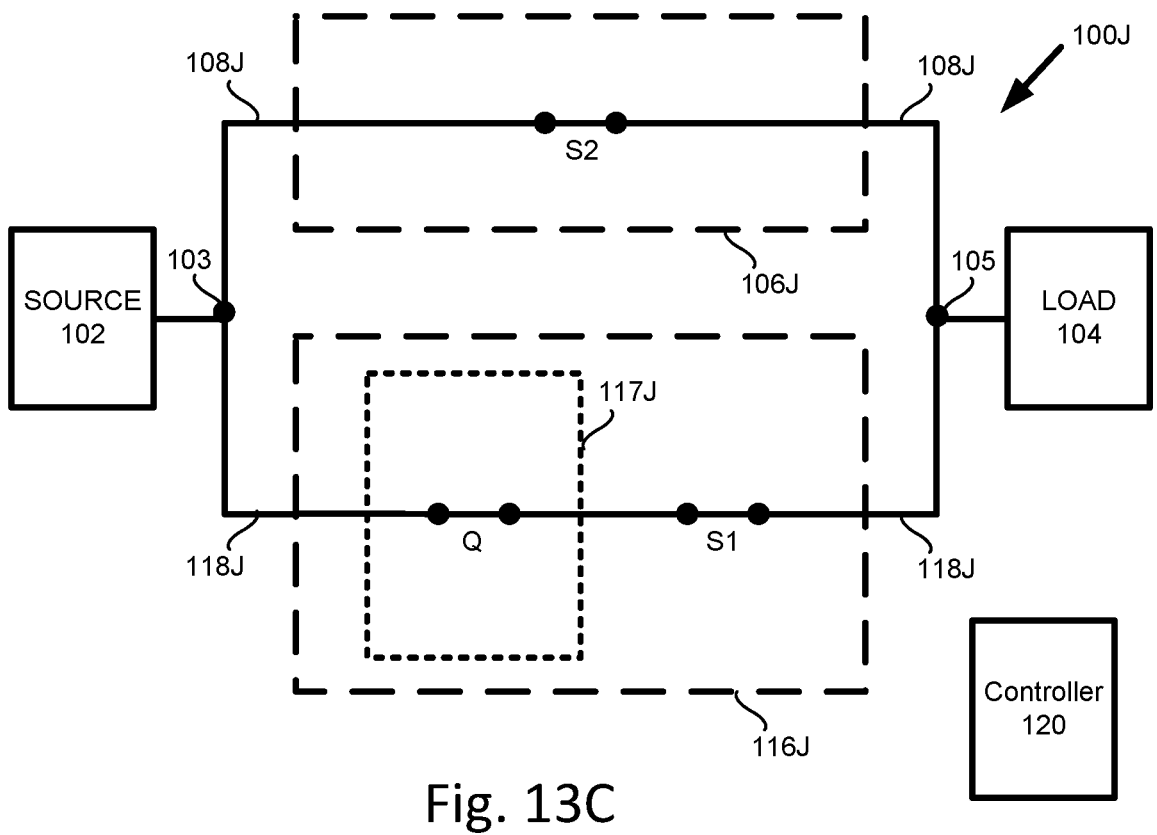

At step 1204, a switching element may be turned ON. The switching element may be connected in series with the first switch. FIG. 13C shows an example where switching element Q turned ON as at 1204. Switching element Q may be in series with switch S1. Closing the first switch S1 and switching element Q may establish the first electrical path 118J between the power source 102 and the load 104. It may be easier or safer to establish the first electrical path 118J by first closing the first switch S1 and then closing the switching element Q. Switching element Q may include one or more non-mechanical switching elements.

Figure 13D:
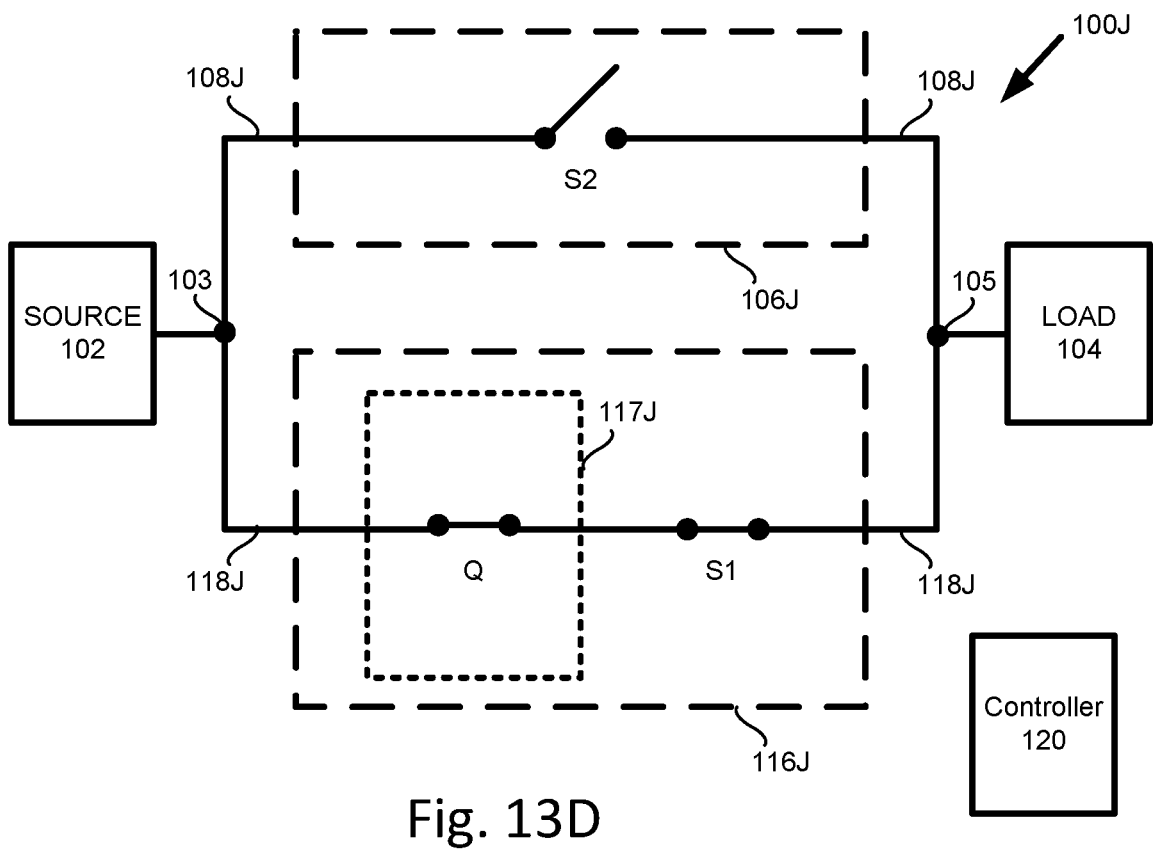

At step 1206, a second switch may be turned OFF. The second switch may be connected in parallel to the first switch and the switching element. For example, FIG. 13D shows the second switch, switch S2, turned OFF as at step 1206. Switch S2 may be may be in parallel to switch S1 and switching element Q. Opening the second switch S2 may disconnect the second electrical path 108J between the power source 102 and the load 104. It may be easier or safer to disconnect the second electrical path by establishing the first electrical path and then disconnecting the second electrical path. Switch S2 may be an electromechanical switch.

Figure 13E:
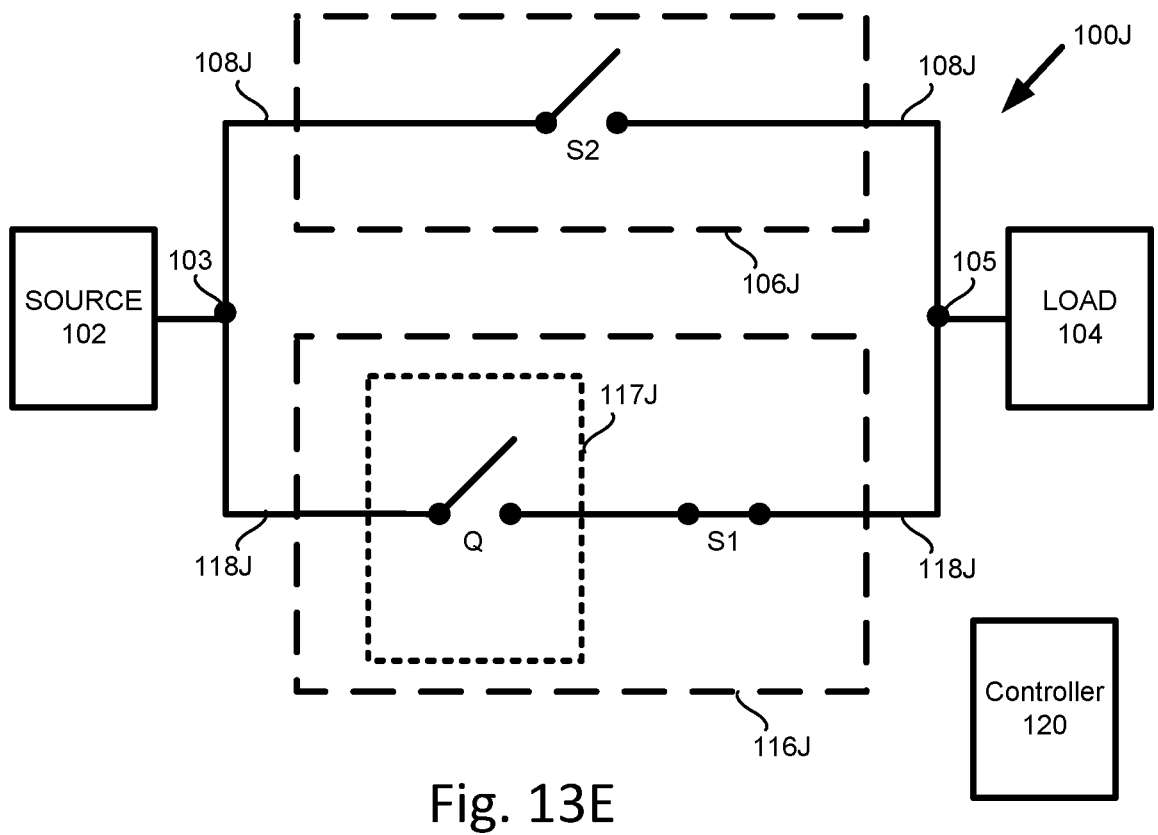

At step 1208, the switching element may be turned OFF. FIG. 13E shows an example where switching element Q may be turned OFF at step 1008. Opening the switching element Q may disconnect the first electrical path 118J between the power source 102 and the load 104. The second electrical path between power source 102 and load 104 may have already been disconnected at step 1206.

Figure 13F:
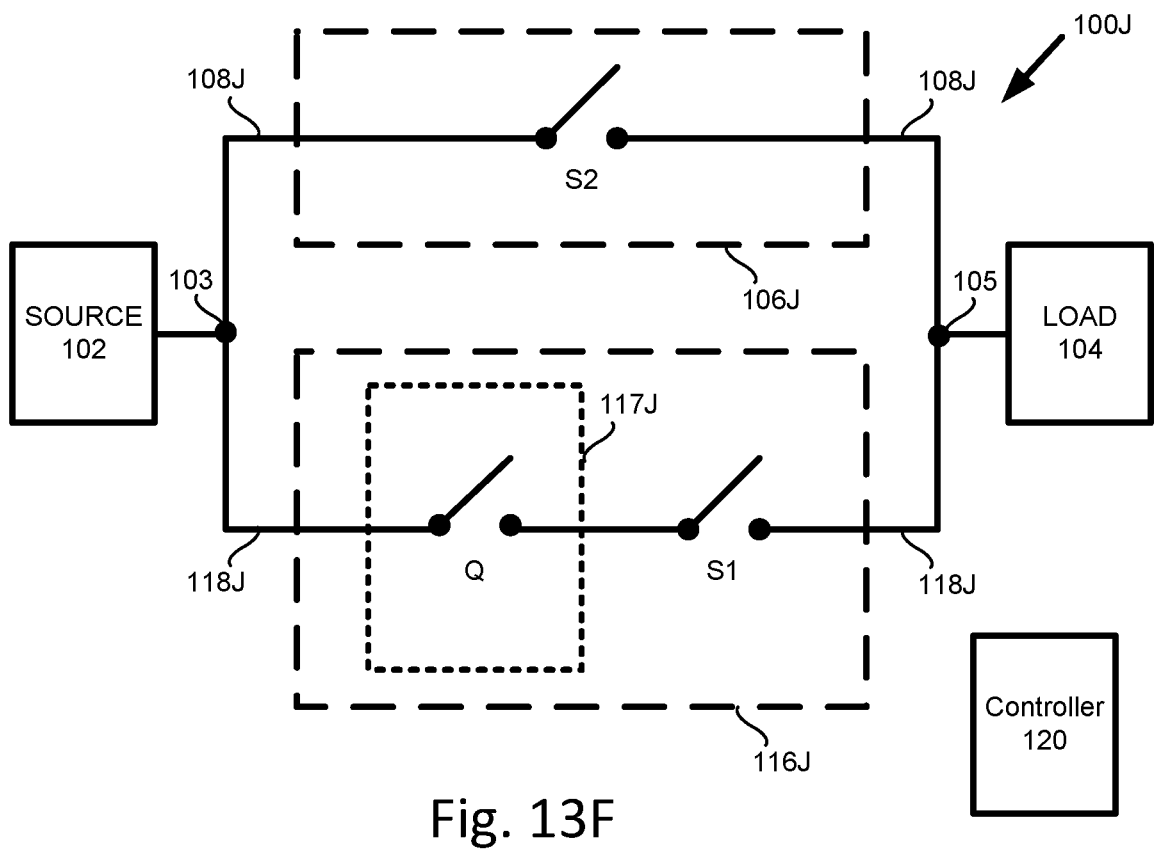

Optionally, at step 1210, the first switch may be turned OFF. FIG. 13F shows an example where the first switch, switch S1, may be turned OFF at 1210. Opening the first switch S1 may be optional since opening the switching element Q at step 1208 may have already disconnected the first electrical path 118J between the power source 102 and the load 104. Opening switching element Q at 1208 may create an open circuit on the first electrical path 118J between power source 102 and load 104 thereby stopping the flow of current between power source 102 and load 104. It may be easier or safer to disconnect the first switch S1 by first opening the switching element Q and then opening the first switch S1. Switch S1 may be an electromechanical switch.

Figure 14:
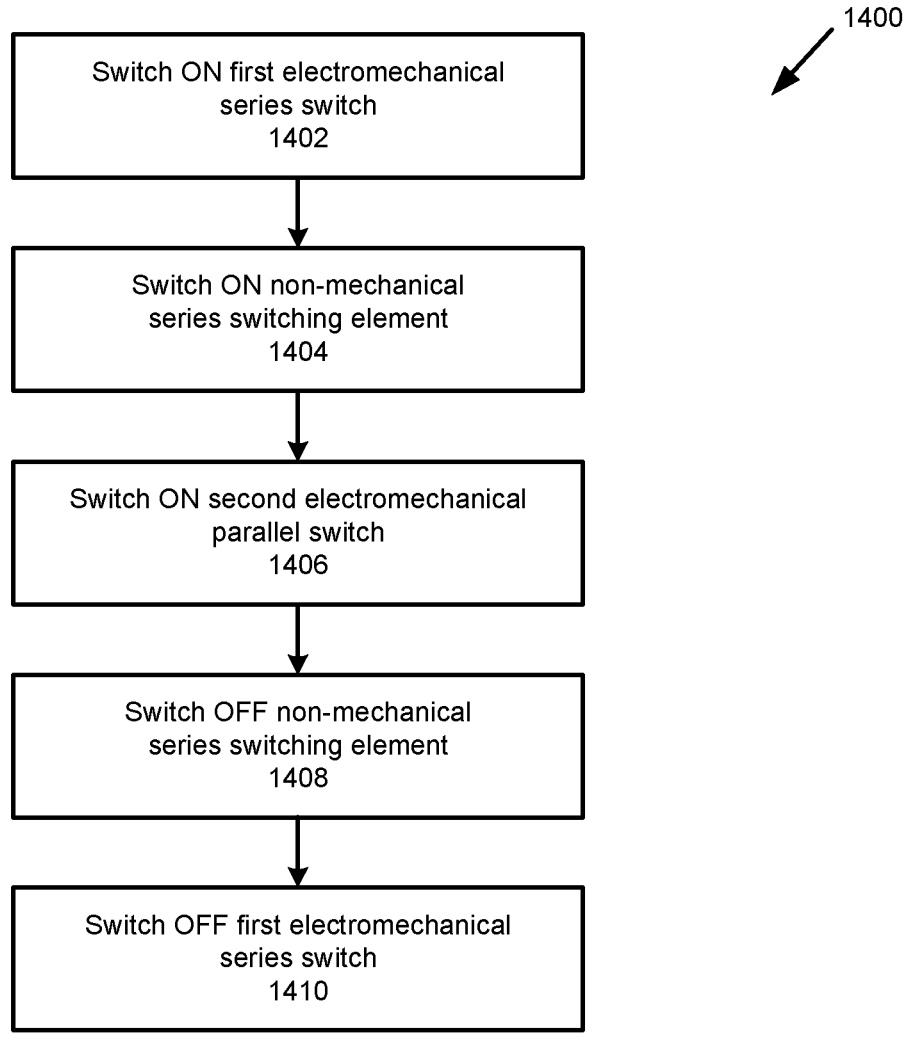
FIG. 14 shows a flow chart of a method, in accordance with certain examples of the presently disclosed subject matter.

FIG. 14 shows a flow chart of a method 1400 to establish a connection between a power source and a load via a switching arrangement, according to one or more examples of the present subject matter. FIG. 14 may be an example of the method shown in FIG. 10.

For ease of understanding, the timing sequence diagrams will be described in conjunction with FIG. 11A to FIG. 11F. It should be understood, however, that method 1400 is not so limited, and method 1400 may be performed by other elements. The switching system 100J shown in FIG. 11A to FIG. 11F may be similar to switching system 100J shown in FIG. 8, and described in detail above.

At step 1402, a first electromechanical switch is turned ON (as may be shown in FIG. 11B). The first electromechanical switch may be arranged in series with a non-mechanical switching element. The non-mechanical switching element may include one or more solid state devices, such as one or more transistors, thyristors, SCRs, and/or SSRs.

At step 1404, a non-mechanical switching element is turned ON (as may be shown in FIG. 11C). The non-mechanical switching element may be arranged in series with the first electromechanical switch. Turning ON the non-mechanical switching element may include turning ON one or more solid state devices.

At step 1406, a second electromechanical switch is turned ON (as may be shown in FIG. 11D). The second electromechanical switch may be arranged in parallel to the series connection of the first electromechanical switch and the non-mechanical switching element.

At step 1408, the non-mechanical switching element is turned OFF (as may be shown in FIG. 11E). Turning OFF the non-mechanical switching element may include turning OFF one or more solid state devices.

Optionally, at step 1410, the first electromechanical switch may be turned OFF (as may be shown in FIG. 11F).

Figure 15:
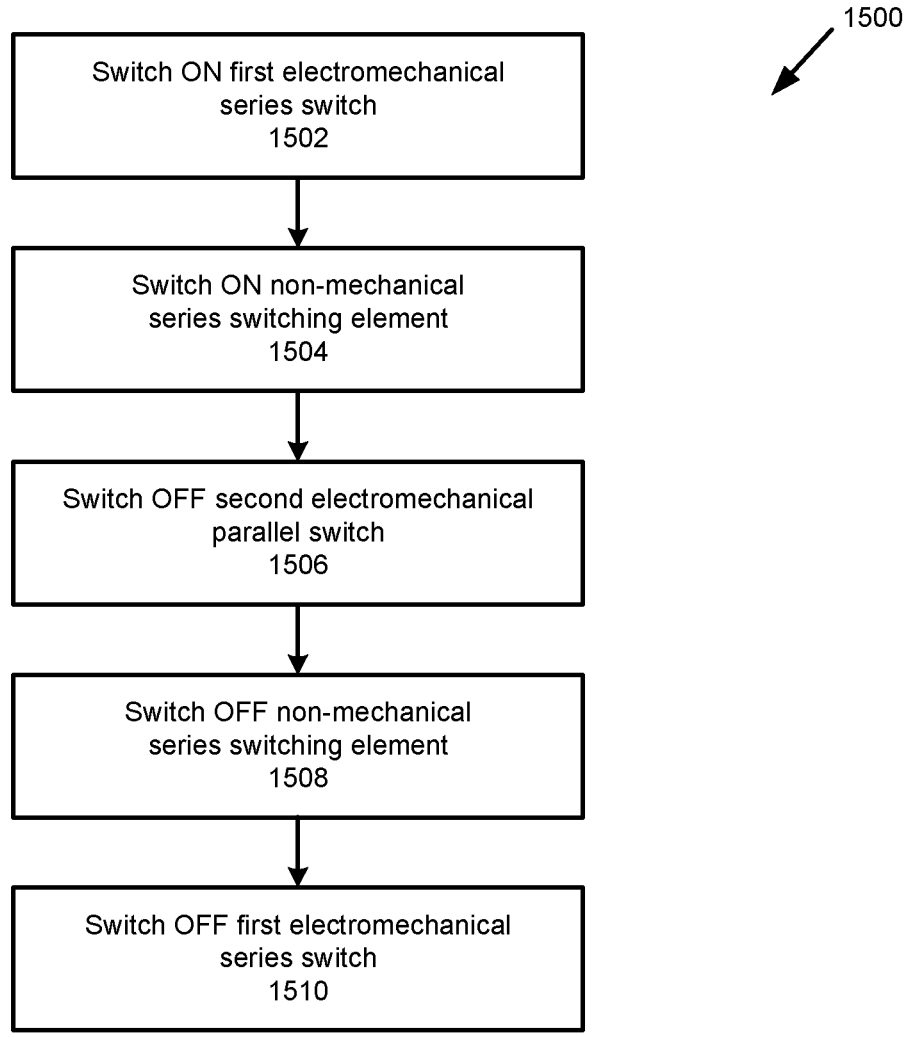
FIG. 15 shows a flow chart of a method, in accordance with certain examples of the presently disclosed subject matter.

FIG. 15 shows a flow chart of a method 1500 to disconnect a connection between a power source and a load via a switching arrangement, according to one or more examples of the present subject matter. FIG. 15 may be an example of the method shown in FIG. 12.

For ease of understanding, the timing sequence diagrams will be described in conjunction with FIG. 13A to FIG. 13F. It should be understood, however, that method 1500 is not so limited, and method 1500 may be performed by other elements. The switching system 100J shown in FIG. 13A to FIG. 13F may be similar to switching system 100J shown in FIG. 8, and described in detail above.

At step 1502, a first electromechanical switch is turned ON (as may be shown in FIG. 13B). The first electromechanical switch may be arranged in series with a non-mechanical switching element. The non-mechanical switching element may include one or more solid state devices, such as one or more transistors, thyristors, SCRs, and/or SSRs.

At step 1504, a non-mechanical switching element is turned ON (as may be shown in FIG. 13C). The non-mechanical switching element may be arranged in series with the first electromechanical switch. Turning ON the non-mechanical switching element may include turning ON one or more solid state devices.

At step 1506, a second electromechanical switch is turned OFF (as may be shown in FIG. 13D). The second electromechanical switch may be arranged in parallel to the series connection of the first electromechanical switch and the non-mechanical switching element.

At step 1508, the non-mechanical switching element is turned OFF (as may be shown in FIG. 11E). Turning OFF the non-mechanical switching element may include turning OFF one or more solid state devices Optionally, at step 1510, the first electromechanical switch may be turned OFF (as may be shown in FIG. 11F).

FIG. 16A to FIG. 16D show timing sequence diagrams according to examples of the present subject matter. These timing sequence diagrams may be used for switching systems 100 shown herein.

For ease of understanding, the timing sequence diagrams will be described in conjunction with FIG. 11A to FIG. 11F, and FIG. 13A to FIG. 13F. It should be understood, however, that the timing sequence diagrams are not so limited, and the timing sequence diagrams may be performed by other elements. The switching system 100J shown in FIG. 11A to FIG. 11F and FIG. 13A to FIG. 13F may be similar to switching system 100J shown in FIG. 8, and described in detail above.

Figure 16A:
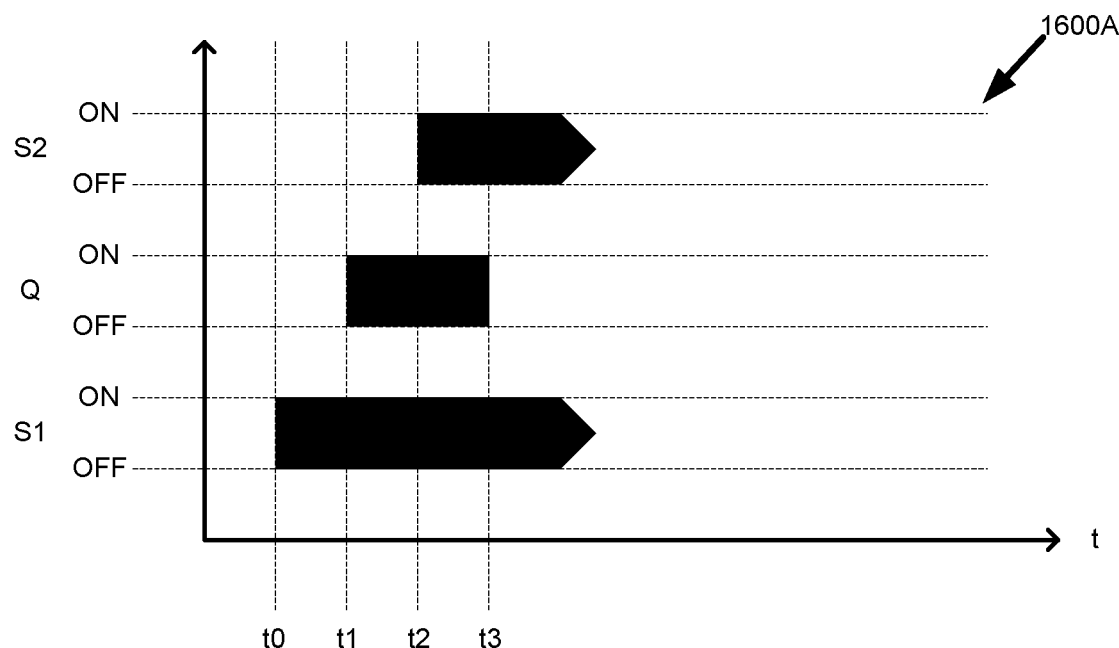
FIG. 16A shows a timing sequence diagram, in accordance with certain examples of the presently disclosed subject matter.

FIG. 16A shows a timing sequence diagram that may be used to establish an electrical connection path and connect a switch S2 between a source and a load. Switch S2 may be an electromechanical switch that is a hard switching arrangement on the electrical connection path between the source and the load. A soft switching arrangement may be connected in parallel to switch S2. The soft switching arrangement may include a switching unit with a switching element Q and an electromechanical switch S1. At a first time period t0 switch S1 may be turned ON (as may be shown in FIG. 11B). At a second time period t1 switching element Q may be turned ON (as may be shown in FIG. 11C). At a third time period t2 switch S2 may be turned ON (as may be shown in FIG. 11D). At a fourth time period t3 switching element Q may be turned OFF (as shown in FIG. 11E). Switch S1 may remain turned ON while switch S2 remains turned ON.

Figure 16B:
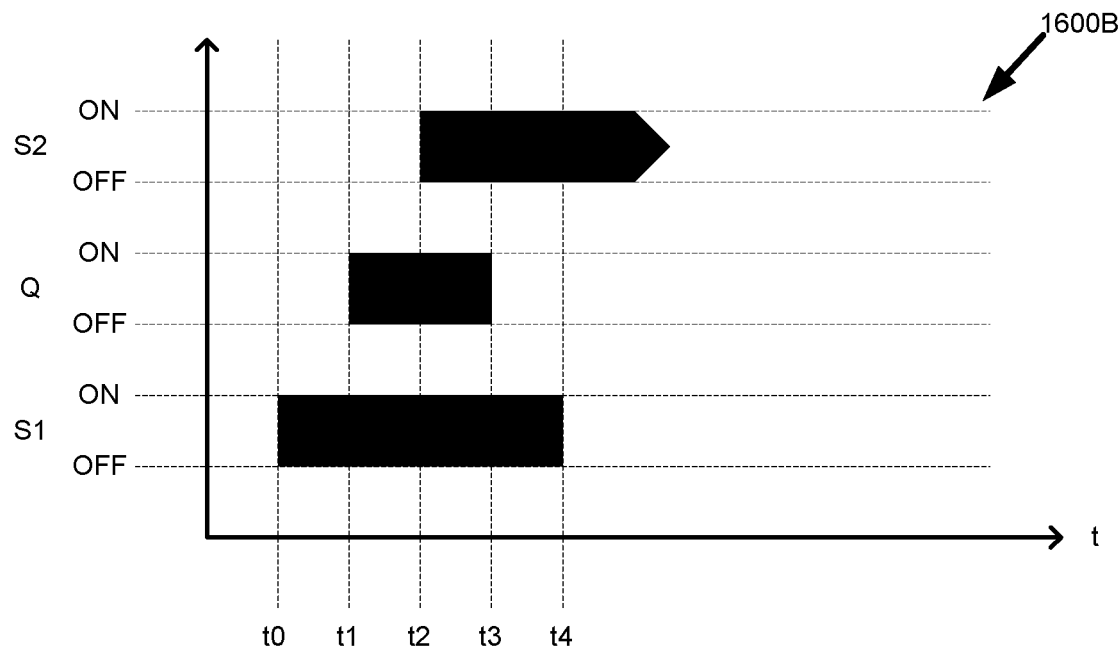
FIG. 16B shows a timing sequence diagram, in accordance with certain examples of the presently disclosed subject matter.

FIG. 16B shows that at a fifth time period t4 switch S1 may be turned OFF while switch S2 remains turned ON (as may be shown in FIG. 11F).

Figure 16C:
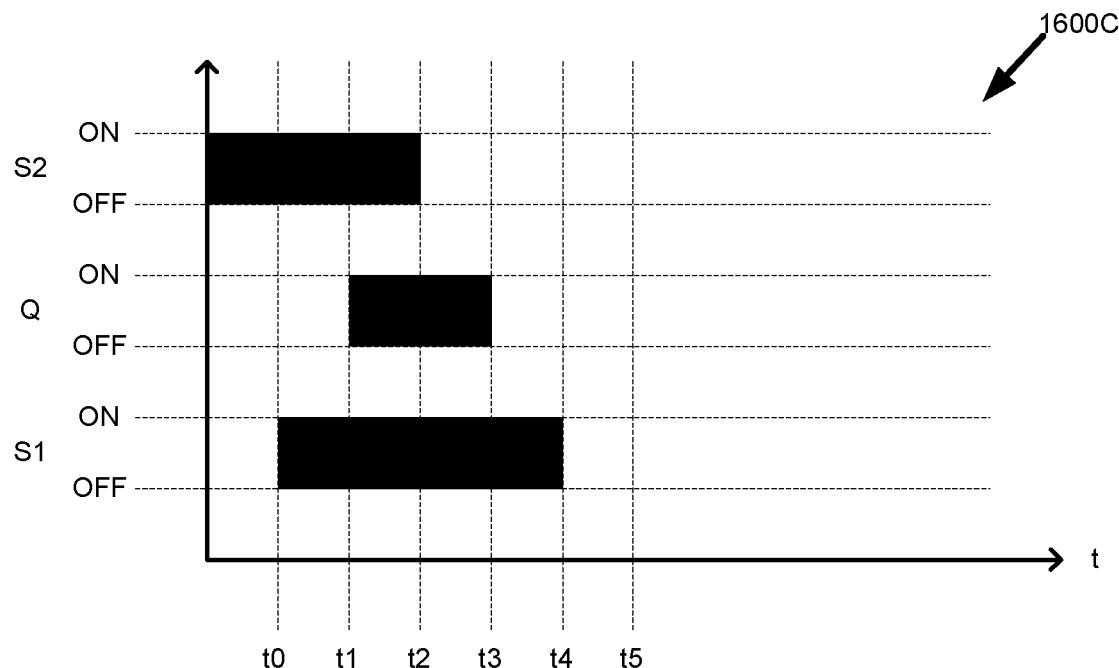
FIG. 16C shows a timing sequence diagram, in accordance with certain examples of the presently disclosed subject matter.

FIG. 16C shows a timing sequence diagram that may be used to disconnect an electrical connection path and disconnect the electromechanical switch S2 of the hard switching arrangement arranged between the source and the load. Before a first time period t0 the switch S2 may be turned ON (as may be shown in FIG. 13A). At the first time period t0 switch S1 may be turned ON (as may be shown in FIG. 13B). At a second time period t1 switching element Q may be turned ON (as may be shown in FIG. 13C). At a third time period t2 switch S2 may be turned OFF (as may be shown in FIG. 13D). At a fourth time period t3 switching element Q may be turned OFF (as may be shown in FIG. 13E). Switch S1 may remain turned ON while switching element Q remains turned OFF. FIG. 16C shows that at a fifth time period t4 switch S1 may be turned OFF (as may be shown in FIG. 13F).

FIG. 16C shows an example where switch S1 was turned OFF while switch S2 remained turned ON (after establishing the electrical connection path as may be shown in FIG. 16B) before the first time period t0.

Figure 16D:
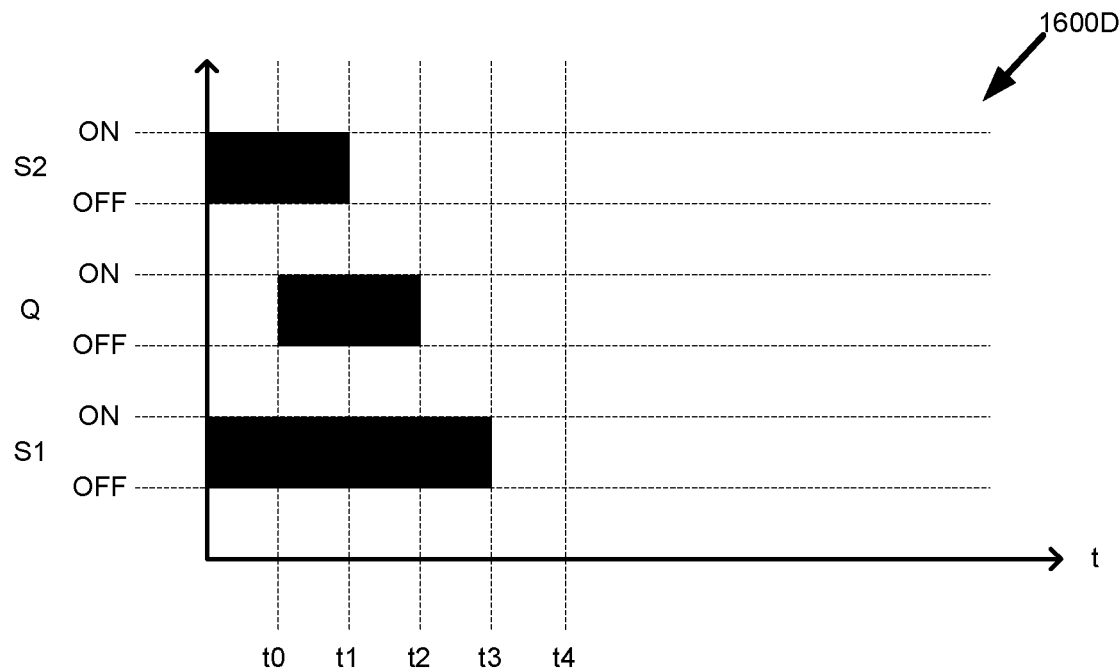
FIG. 16D shows a timing sequence diagram, in accordance with certain examples of the presently disclosed subject matter.

FIG. 16D shows an example where switch S1 remained turned ON while switch S2 remained turned ON (after establishing the electrical connection path as may be shown in FIG. 16A) before the first time period t0. At the first time period t0 switching element Q may be turned ON (as may be shown in FIG. 13C). At a second time period t1 switch S2 may be turned OFF (as may be shown in FIG. 13D). At a third time period t2 switching element Q may be turned OFF (as may be shown in FIG. 13E). Switch S1 may remain turned ON while switching element Q remains turned OFF. FIG. 16D shows that at a fourth time period t3 switch S1 may be turned OFF (as may be shown in FIG. 13F).

Figure 17:
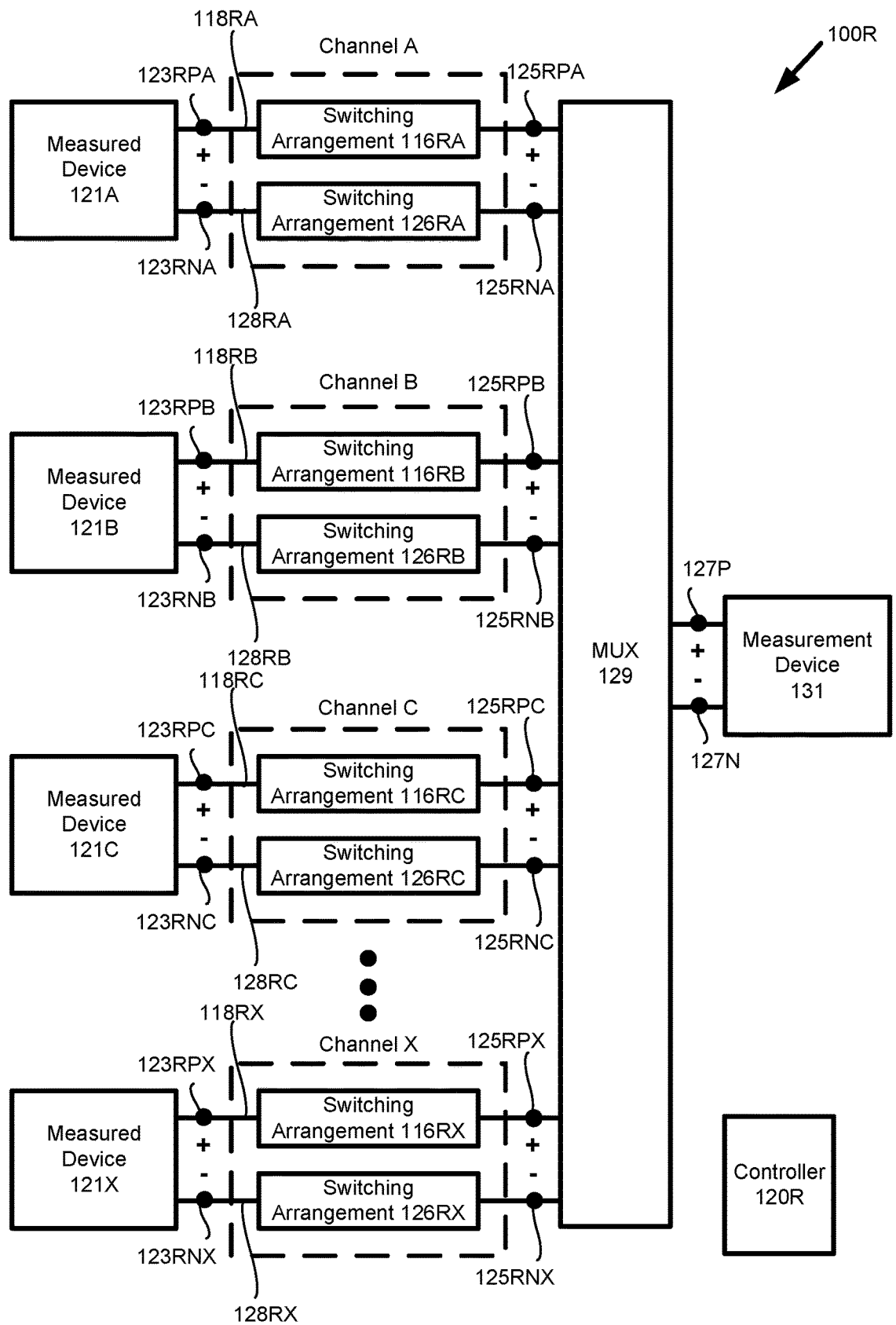
FIG. 17 shows a switching system, in accordance with certain examples of the presently disclosed subject matter.

FIG. 17 shows a switching system 100R according to examples of the present subject matter. Switching system 100R may be similar to other switching systems 100 shown herein.

Switching system 100R may include a multiplexer (MUX) 129. MUX 129 may include a plurality of selectable channels. For example, MUX 129 shows an example of a plurality of channels including channel A, channel B, channel C, ..., channel X, where X is any appropriate number. MUX 129R may be arranged so that a particular channel from among the plurality of channels may be selected at a given time. In the example of FIG. 17 each channel of the MUX 129 may be connected to a different point to be measured. The different points to be measured may be related to a plurality of different devices to be measured, or may be a plurality of points related to a single device to be measured. The point to be measured or the device to be measured may also be referred to as the measured device.

FIG. 17 shows a plurality of measured devices 121A, 121B, 121C, ..., 121X, where X may be any appropriate number. A measured device of the plurality of measured devices 121A, 121B, 121C, ..., 121X may also be referred to generally as a measured device 121. Similarly, other elements of a given channel may be referred to with a reference identifier that includes the letter of that given channel at the end of the reference identifier (e.g., the specific measured device 121B for channel B), whereas when referring to one of those elements in general they may be referred to without the letter of any given channel (e.g, a measured device 121). As explained above, the plurality of measured devices 121A, 121B, 121C, ..., 121X, may be related to a single device to be measured or a plurality of devices to be measured.

MUX 129 may also be connected to a measurement device 131. Measurement device 131 may be arranged to measure one or more electrical parameters related to a selected measured device (for example, voltage).

As an example, the measured devices 121A, 121B, 121C, ..., 121X may be one or more power sources, power storage devices, power converters (e.g., DC to DC converters or DC to AC inverters), etc. As an example, the measurement device 131 may be or include a voltage sensor, a voltage meter, a power meter, etc. When one channel of the plurality of channels is selected, then that selected channel is connected to the measurement device 131 via the MUX 129 and a measurement of the electrical parameter related to the respective measured device 121 may be obtained by the measurement device 131.

For example, for each channel a first switching arrangement 116R may be connected between a first positive terminal and a second positive terminal, and a second switching arrangement 126R may be connected between a first negative terminal and a second negative terminal.

Each channel may include a plurality of electrical pathways 118R, 128R, including a positive electrical pathway 118R and a negative electrical pathway 128, which may be switchably connected between terminals of the respective measured device 121 and the MUX 129. Each of the pathways may include a respective switching arrangement 116R, 126R connected between a terminal 123R of the measured device 121 and a terminal 125R of the MUX 129.

For example, for channel A, a first switching arrangement 116RA may be connected between a positive terminal 123RPA of measured device 121A and a positive terminal 125RPA of MUX 129 on electrical pathway 118RA. A second switching arrangement 126RA may be connected between a negative terminal 123RNA of measured device 121A and a negative terminal 125RNA of MUX 129 on electrical pathway 128RA. For channel B, a first switching arrangement 116RB may be connected between a positive terminal 123RPB of measured device 121B and a positive terminal 125RPB of MUX 129 on electrical pathway 118RB. A second switching arrangement 126RB may be connected between a negative terminal 123RNB of measured device 121B and a negative terminal 125RNB of MUX 129. And so on for the other channels.

As an example, when channel A is selected, switching arrangement 116RA and switching arrangement 126RA may be in an ON state, and the switching arrangements of the other channels (including switching arrangement 116RB and switching arrangement 126RB of channel B) may be in an OFF state. When channel B is selected, switching arrangement 116RB and switching arrangement 126RB may be in an ON state, and the switching arrangements of the other channels (including switching arrangement 116RA and switching arrangement 126RA of channel A) may be in an OFF state.

A positive terminal and a negative terminals of the MUX 129 may be connected respectively to a positive terminal 127P and a negative terminal 127N of the measurement device 131. For example, when channel A is selected, measured device 121A may be connected to measurement device 131 via MUX 129, and measurement device 131 may obtain a voltage related to measured device 121A (e.g., between a pair of terminals, negative and positive, of the measured device). When channel B is selected, measured device 121B may be connected to measurement device 131 via MUX 129 and measurement device 131 may obtain a voltage related to measured device 121B, and so on for the other channels.

As an example each terminal 123R of measured device 121 may be considered an output terminal of the measured device 121 that is connected to an input terminal of the respective switching arrangement 116R or 126R. Each terminal 125R of MUX 129 may be considered an input terminal of the MUX 129 that is connected to an output terminal of the respective switching arrangement 116R or 126R. Each terminal 127P, 127N of measurement device 131 may be considered an input terminal of the measurement device 131 that is connected to an output terminal of the MUX 129.

One or more controllers 120R may be configured to control the switching of one or more switching arrangements 116R, 126R of the switching system 100R. Only one controller 120R is shown in FIG. 17 for the sake of simplicity, but switching system 100R may have a plurality of controllers 120R. For example, each channel may have its own dedicated controller 120R. The one or more controllers 120R may each include a sequencer unit for controlling the sequencing of one or more switches and one or more switching elements of the switching arrangements.

The voltage of the measured device 121 may be relatively high voltage (e.g. about 1000 volts), and it may be beneficial to have each of the switching arrangements rated to handle such high voltages. As such, protection may be needed on each of the electrical pathways 118 and/or 128 (positive and negative) for each of the channels. Additionally, having a multiplexer 129 with multiple selectable channels may lead to issues related to switching between the different channels. Since there are channels that are not selected at a given time, those channels that are not selected may need to be disconnected from the multiplexer so that they do not interfere with the channel that is selected. For example, if channel A is connected then all of the other channels may be disconnected, if channel B is connected then all of the other channels may be disconnected, etc. Using just an electromechanical relay that is rated for relatively high voltages for switching ON and OFF a given channel may have issues. Although the electromechanical relay may provide galvanic isolation, if the electromechanical relay is rated for relatively high voltage it may be relatively physically large and bulky, and relatively costly. Additionally using such an electromechanical relay by itself may lead to voltage spikes when switching between the channels of the multiplexer. Also such an electromechanical relay may have a relatively small and limited amount of cycles of usage before the electromechanical relay needs to be replaced. In addition, using just a non-mechanical electrical switch (e.g., one or more transistors, SSRs, MOSFETs, etc.) that is rated for relatively high voltages for switching ON and OFF a given channel may also have issues. Although the non-mechanical electrical switch that is rated for relatively high voltage may be relatively physically small and relatively inexpensive, it might not provide galvanic isolation. Additionally using such an electromechanical relay by itself may lead to cross-talk between the channels, especially when dealing with high voltages. Therefore, while all of these possibilities are disclosed, the switching arrangements 116R and 126R of the present subject matter may include both an electromechanical switch SR connected in series with a non-mechanical electrical switching unit 117R as will be explained in further detail with reference to FIG. 18 to FIG. 19B.

Figure 18:
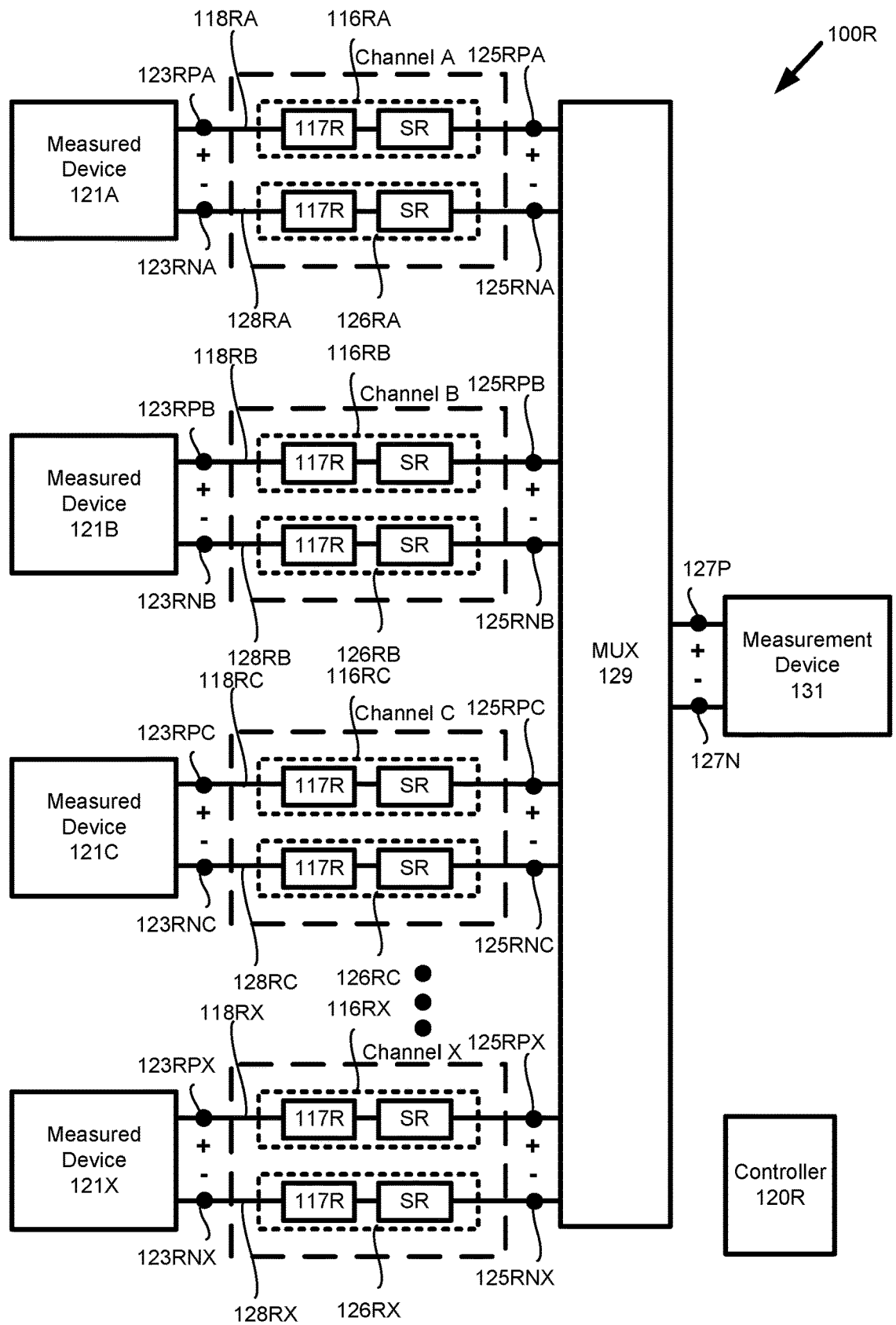
FIG. 18 shows a switching system, in accordance with certain examples of the presently disclosed subject matter.

As shown in FIG. 18, the switching arrangements 116R and 126R of the present subject matter may include an electromechanical switch SR connected in series with a non-mechanical electrical switching unit 117R for each electrical pathway of the channel (positive and negative). The switching arrangements 116R and 126R of the present subject matter may therefore be rated for relatively high voltages, provide galvanic isolation, be relatively physically small and inexpensive, alleviate voltage spikes and cross-talk, and have a relatively long longevity. The switching arrangements of the present subject matter may allow a soft switching (a switching while not under voltage) of the electromechanical switch SR. As an example, the non-mechanical electrical switching unit 117R may be rated for a relatively high voltage. The non-mechanical electrical switching unit 117R may be rated for a higher voltage than the voltage that the electromechanical switch SR is rated for. As an example, when the non-mechanical electrical switching unit 117R is rated for a relatively high voltage, then it may be connected to the measured device 121 (e.g., to a terminal of the measured device 121) where a relatively high rating may be beneficial. The electromechanical switch SR may be rated for a relatively lower voltage since the non-mechanical electrical switching unit 117R connected to the measured device 121 may be rated for a relatively high voltage. In such a case, the electromechanical switch SR may be connected to the MUX 129 (e.g., to a terminal of the MUX 129) and not the measured device 121, so that the non-mechanical electrical switching unit 117R may provide greater protection to the measured device 121. If the electromechanical switch SR is rated for a relatively lower voltage, then it may be relatively physically smaller and relatively more inexpensive. However, the electromechanical switch SR may be arranged to provide galvanic isolation on the electrical pathway when the electromechanical switch SR is in an OFF state (e.g., open circuit).

The controller 120R and/or sequencer unit may be arranged to control the timing sequence of the switching arrangements 116R and/or 126R with signals and delays. A single controller 120R and/or sequencer unit may be arranged to send the same signal to both the switching arrangement 116R on the positive electrical pathway 118R and the switching arrangement 126R on the negative electrical pathway 128R. For example, a single "channel ON" signal may be arranged to first turn ON the electromechanical switch SR and then turn ON the non-mechanical electrical switching unit 117R (e.g., after a delay) of a selected channel. A single "channel OFF" signal may be arranged to first turn OFF the non-mechanical electrical switching unit 117R and then turn OFF the electromechanical switch SR (e.g., after a delay) when the channel is no longer selected. As an example, the delay may be about tens of milliseconds. For example, the delay may be in a range of about 1 ms to about 20 ms, or in a range of about 10 ms to about 15 ms.

Figure 19A:
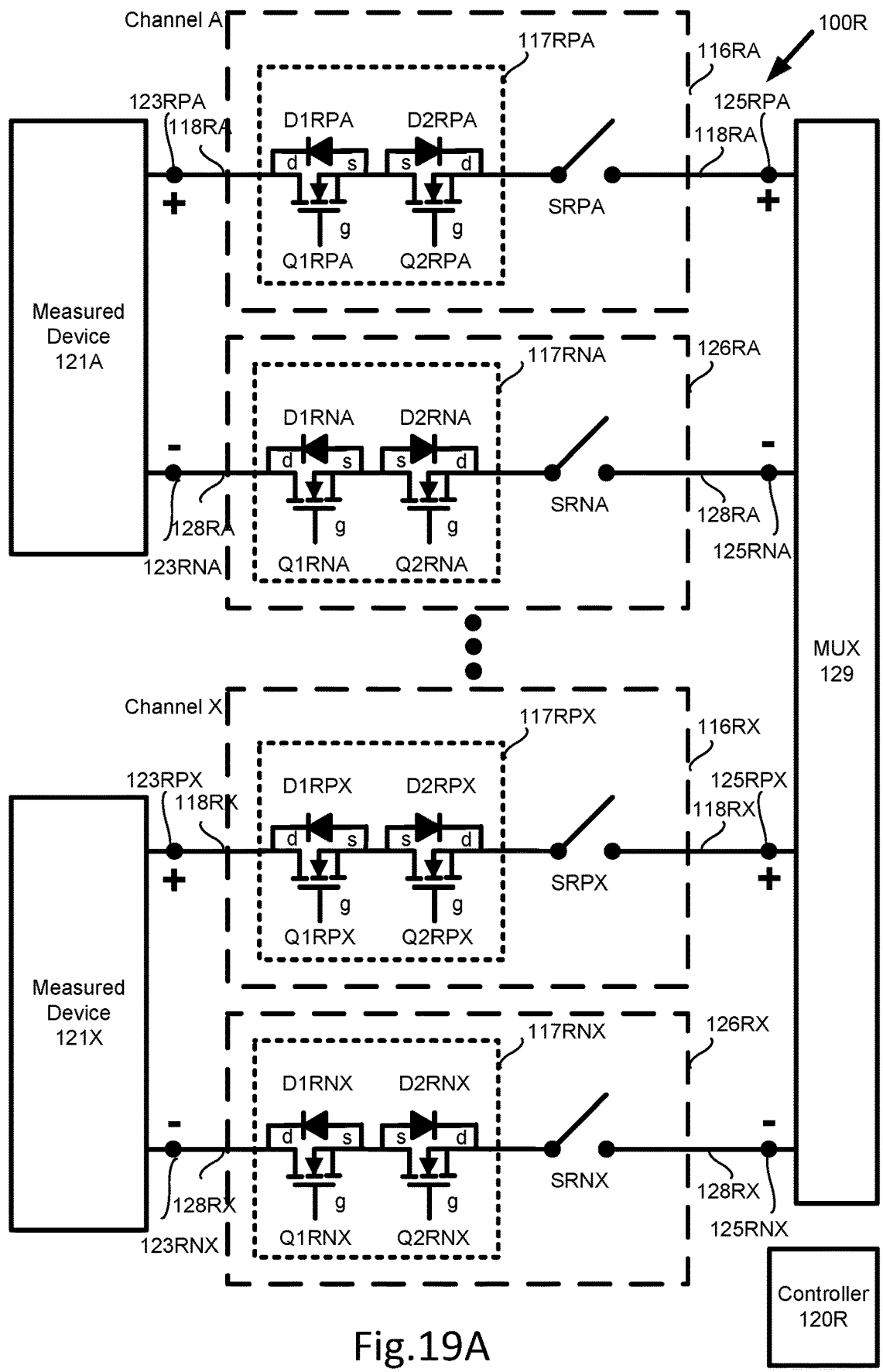
FIG. 19A shows a switching system, in accordance with certain examples of the presently disclosed subject matter.

FIG. 19A shows some examples of switching arrangements 116R and 126R. For ease of understanding only two channels (channel A and channel X) are shown in FIG. 19A, but more are possible. Further, the measurement device 131 and its terminals 127P, 127N may also be included in certain configurations of FIG. 19A.

As shown in FIG. 19A, switching arrangements 116R and 126R may each include a switching unit 117R that may include one or more switching elements. In the example of FIG. 19A, each switching unit 117R may include a plurality of transistors Q1R and Q2R. Each of the switching arrangements 116R and 126R also include a switch SR. Switch SR may be an electromechanical switch. The plurality of transistors Q1R and Q2R and switch SR may be switchably connected between a measured device 121 and MUX 129. The plurality of transistors Q1R and Q2R may be arranged back-to-back (e.g., a source terminal of one transistor Q1R may be connected to a source terminal of the other transistor Q2R, or a drain terminal of one transistor Q1R may be connected to a drain terminal of the other transistor Q2R). A terminal of one transistor Q1R may be connected to a terminal 123R of the respective measured device 121, and a terminal of one transistor Q2R may be connected to a terminal of the switch SR. Another terminal of the switch SR may be connected to a terminal 125R of the MUX 129. The gates of transistors Q1R and/or Q2R, and/or switches SR may be connected to one or more controllers 120R. The one or more controllers 120R may be configured to control the transistors Q1R and/or Q2R, and/or switches S1R and/or S2R.

For example, for channel A, a first transistor Q1RPA may be connected to a positive terminal 123RPA of measured device 121A. Transistor Q1RPA may be connected in series to a second transistor Q2RPA. Transistor Q2RPA may be connected in series to an electromechanical switch SRPA. Switch SRPA may be connected to a positive terminal 125RPA of MUX 129 on electrical pathway 118RA. A third transistor Q1RNA may be connected to a negative terminal 123RNA of measured device 121A. Transistor Q1RNA may be connected in series to a fourth transistor Q2RNA. Transistor Q2RNA may be connected in series to an electromechanical switch SRNA. Switch SRNA may be connected to a negative terminal 125RNA of MUX 129 on electrical pathway 128RA. For channel X, a first transistor Q1RPX may be connected to a positive terminal 123RPX of measured device 121X. Transistor Q1RPX may be connected in series to a second transistor Q2RPX. Transistor Q2RPX may be connected in series to an electromechanical switch SRPX. Switch SRPX may be connected to a positive terminal 125RPX of MUX 129 on electrical pathway 118RX. A third transistor Q1RNX may be connected to a negative terminal 123RNX of measured device 121X. Transistor Q1RNX may be connected in series to a fourth transistor Q2RNX. Transistor Q2RNX may be connected in series to an electromechanical switch SRNX. Switch SRNX may be connected to a negative terminal 125RNX of MUX 129 on electrical pathway 128RX, and so on for the other channels.

As mentioned above, only one controller 120R is shown for simplicity, but switching system 100R may have multiple controllers 120R, and each controller 120R may have a sequencer unit configured to arrange and send signals to multiple elements of the switching system 100R at the same time and in sequence.

Each switching arrangement 116R and/or 126R may be configured as a bi-directional switching arrangement. Similarly, each switching unit 117R may be configured as a bi-directional switching unit. For example, when transistor Q1R is ON, current may flow through transistor Q1R and diode D2R in the direction of the respective measured device 121 to the MUX 129. Diode D2R may be a body diode of transistor Q2R, or may be a separate diode connected in parallel to transistor Q2R. When transistor Q2R is ON, current may flow through transistor Q2R and diode D1R in the direction of the MUX 129 to the respective measured device 121. Diode D1R may be a body diode of transistor Q1R, or may be a separate diode connected in parallel to transistor Q1R. In some cases, both Q1R and Q2R may be ON and current may flow through transistors Q1R and Q2R. This arrangement may be arranged to pass alternating current (AC) through the switching arrangements 116R, 126R.

Figure 19B:
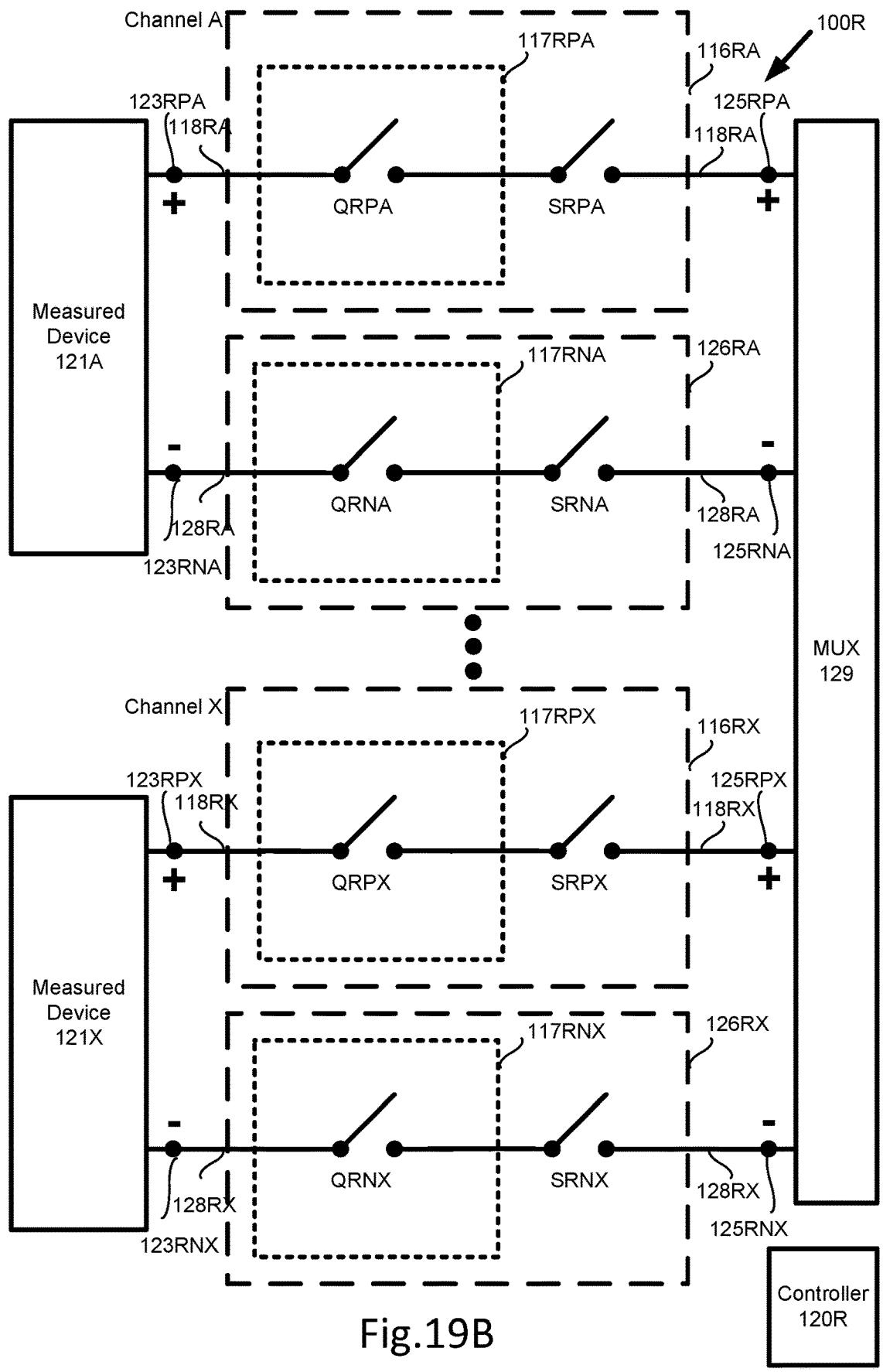
FIG. 19B shows a switching system, in accordance with certain examples of the presently disclosed subject matter.

FIG. 19B shows switching units 117R that may include one or more switching elements, where the switching elements are generalized as a single switching element QR. For example, for channel A switching element QRPA may be connected to a positive terminal 123RPA of measured device 121A and connected in series to electromechanical switch SRPA on electrical pathway 118RA. Switching element QRNA may be connected to a negative terminal 123RNA of measured device 121A and connected in series to electromechanical switch SRNA on electrical pathway 128RA. For channel X, a first transistor QRPX may be connected to a positive terminal 123RPX of measured device 121X and connected in series to electromechanical switch SRPX on electrical pathway 118RX. Switching element QRNX may be connected to a negative terminal 123RNX of measured device 121X and connected in series to electromechanical switch SRNX on electrical pathway 128RX, and so on for the other channels.

Figure 20:
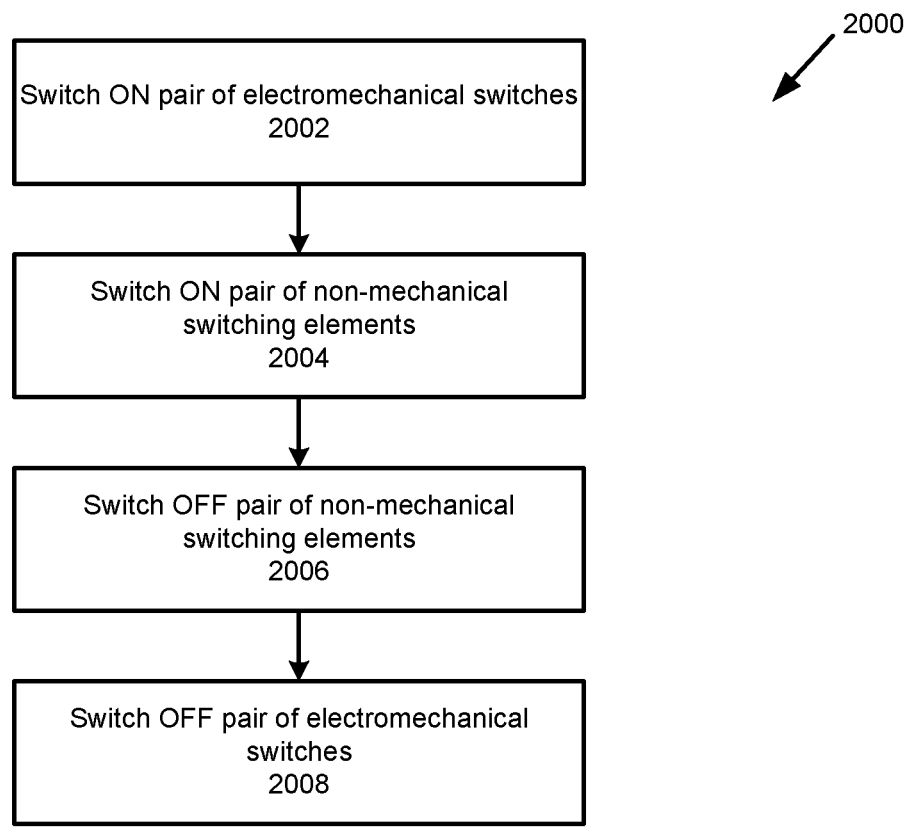
FIG. 20 shows a flow chart of a method, in accordance with certain examples of the presently disclosed subject matter.

FIG. 20 shows a flow chart of a method 2000 to first establish and then disconnect a connection between a measured device or measured point and a measurement device connected to a multiplexer via a plurality of switching arrangements attached to the positive and negative lines of a channel of the multiplexer, according to one or more examples of the present subject matter. As mentioned above, one or more switches of the switching arrangements may be controlled by one or more controllers 120 and the timing may be controlled by a sequencer unit. The method 1800 may be used to connect a particular channel of the MUX between the measured device or measured point and the measurement device.

For ease of understanding, method 2000 will be described in conjunction with FIG. 17 to FIG. 19B. But it should be understood that method 2000 is not so limited and that method 2000 may be performed by other elements. The switching system 100R may be shown in FIG. 17 to FIG. 19B and described in detail above.

At step 2002, a pair of electromechanical switches of one channel may be turned ON. For example, for channel A, electromechanical switch SRPA connected to the positive terminal 125RPA of MUX 129 and electromechanical switch SRNA connected to the negative terminal 125RNA of MUX 129 may be turned ON. The electromechanical switches SR of the other channels may be in an OFF state, and may be arranged to provide galvanic isolation between their respective measured device 121 and MUX 129.

At step 2004, a pair of non-mechanical electrical switching elements of one channel may be turned ON. For example, for channel A, non-mechanical electrical switching element QRPA connected to the positive terminal 123RPA of measured device 121A, and non-mechanical electrical switching element QRNA connected to the negative terminal 123RNA of measured device 121A, may be turned ON. Each of the non-mechanical electrical switching elements QRPA and QRNA may be connected in series with one of the electromechanical switches SRPA or SRNA. Switching element QRPA may be in series with switch SRPA (a terminal of the electromechanical switch SRPA may be connected to a terminal of the non-mechanical electrical switching element QRPA). Switching element QRNA may be in series with switch SRNA (a terminal of the electromechanical switch SRNA may be connected to a terminal of the non-mechanical electrical switching element QRNA). Closing the first switch SRPA and switching element QRPA may establish the electrical path 118RA between the measured device 121A and MUX 129 on the positive line (between a positive terminal of the measured device 121A and a positive terminal of the MUX 129). Establishing the electrical path 118RA may help connect the measured device 121A and the measurement device 131 via MUX 129. Closing the first switch SRNA and switching element QRNA may establish the electrical path 128RA between the measured device 121A and MUX 129 on the negative line (between a negative terminal of the measured device 121A and a negative terminal of the MUX 129). Establishing the electrical path 128RA may help connect the measured device 121A and the measurement device 131 via MUX 129. It may be easier or safer to establish the electrical paths 118RA and 128RA by first closing the switches SRPA and SRNA and then closing the switching elements QRPA and QRPA. Switching elements QRPA and/or QRNA may each include one or more non-mechanical switches. Establishing both of the electrical paths 118RA and 128RA on the positive line and the negative line may enable the measurement device 131 to obtain a measurement of an electrical parameter related to the measured device 121A. For example, establishing both of the electrical paths 118RA and 128RA may enable the measurement device 131 to obtain a measurement of voltage related to the voltage between the positive terminal 123RPA and the negative terminal 123RNA of the measured device 121A. Steps 2002 and 2004 may be done to connect the selected channel of the MUX between the measured device and the measurement device.

At step 2006, the pair of non-mechanical electrical switching elements of one channel may be turned OFF. Opening the pair of switching elements QRPA and QRNA may disconnect the electrical paths 118RA and 128RA between the measured device 121A and the MUX 129 which may turn off that channel, channel A. Opening the switching element QRPA may disconnect the electrical path 118RA between the measured device 121A and the MUX 129, thereby disconnecting the measured device 121A from the measurement device 131 on the positive line. Opening the switching element QRNA may disconnect the electrical path 128RA between the measured device 121RA and the MUX 129, thereby disconnecting the measured device 121A from the measurement device 131 on the negative line.

At step 2008, the pair of electromechanical switches of one channel may be turned OFF. Opening switching elements QRPA and QRNA at step 2006 may create an open circuit on the electrical paths 118RA and 128RA between measured device 121RA and MUX 129 thereby stopping the flow of current between measured device 121RA and MUX 129. It may be easier or safer to disconnect the electromechanical switches SRNA and SNPA by first opening the respective non-mechanical electrical switching element QRPA and QRNA, and then opening the electromechanical switches SRNA and SRPA. For example, for channel A the electromechanical switch SRPA on the positive line and electromechanical switch SRNA on the negative line may be turned OFF. The electromechanical switches SRPA and SRNA of channel A may be arranged to provide galvanic isolation between measured device 121A and MUX 129 when the electromechanical switches SRPA, SRNA are in the OFF state.

The method may be repeated for other subsequently selected channels, e.g., channel B, channel C, and so on.

Figure 21:
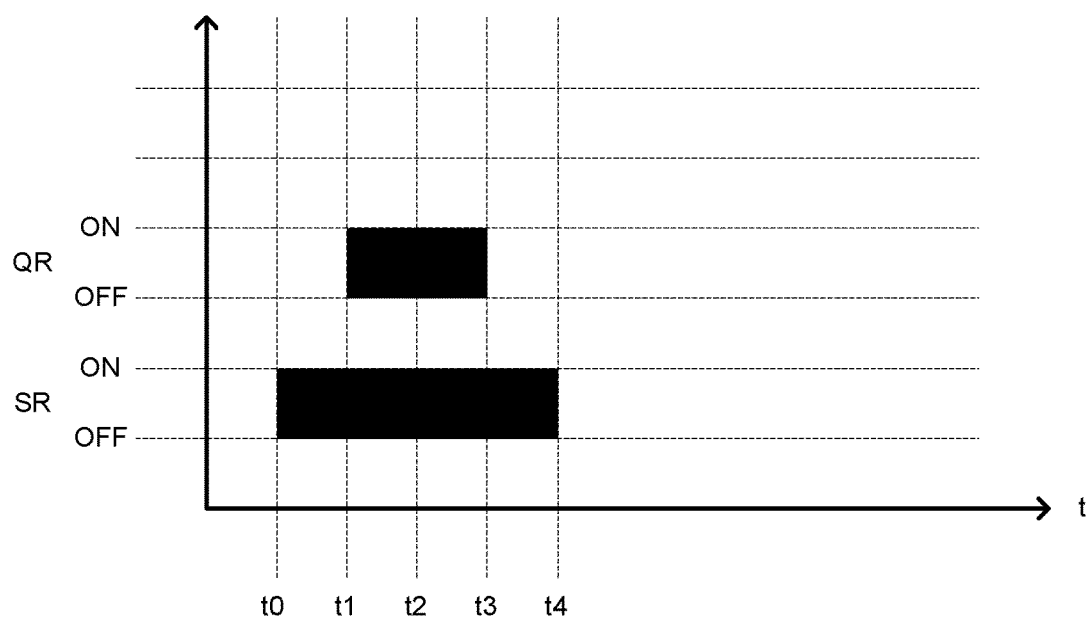
FIG. 21 shows a timing sequence diagram, in accordance with certain examples of the presently disclosed subject matter.
Figure 22:
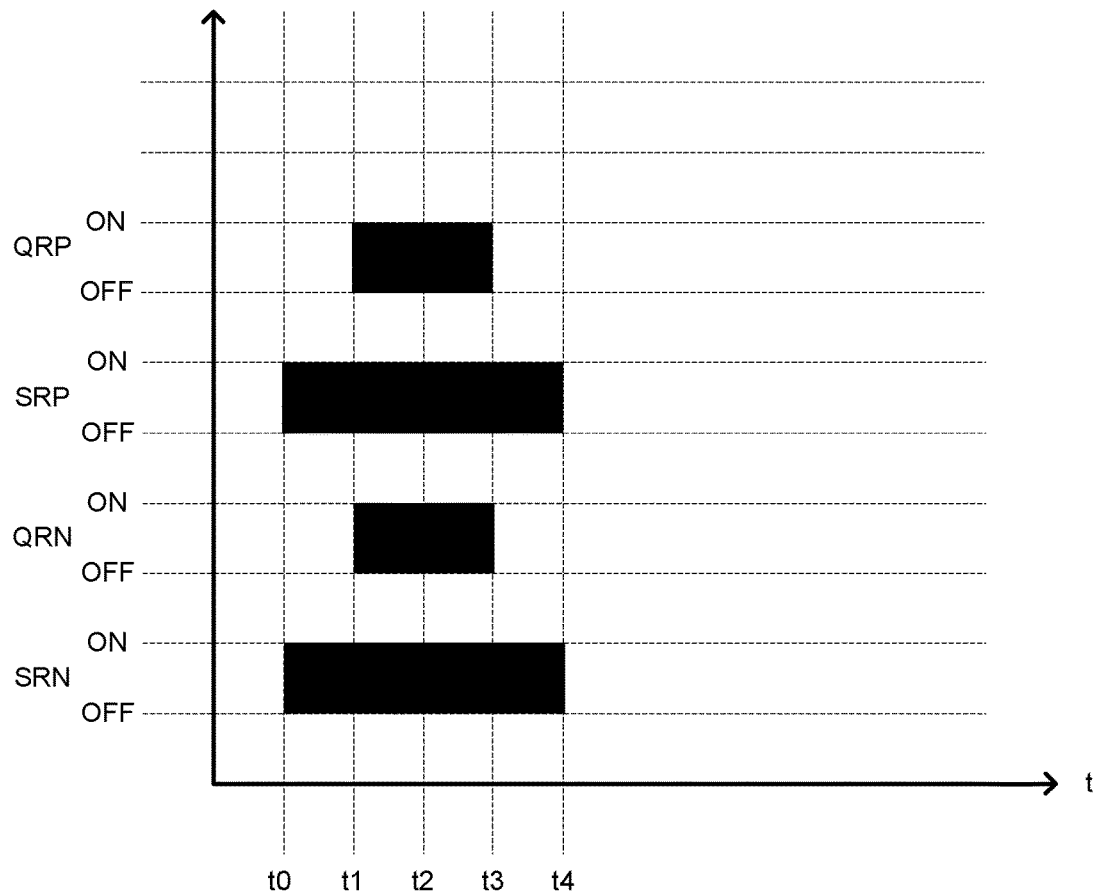
FIG. 22 shows a timing sequence diagram, in accordance with certain examples of the presently disclosed subject matter.

FIG. 21 and FIG. 22 show timing sequence diagrams according to examples of the present subject matter. These timing sequence diagrams may be used for switching systems 100 shown herein.

For ease of understanding, the timing sequence diagrams will be described in conjunction with FIG. 17 to FIG. 19B. It should be understood, however, that the timing sequence diagrams are not so limited, and the timing sequence diagrams may be performed by other elements. The switching system 100R may be shown in FIG. 17 to FIG. 19B and described in detail above.

FIG. 21 shows a timing sequence diagram that may be used to establish an electrical connection path 118R or 128R, connect a switching arrangement 116R or 126R between a measured device 121 and a measurement device 131 (for example, via a MUX 129 with multiple channels so that a parameter related to the measured device 121 on the selected channel may be obtained), and/or disconnect the electrical connection path 118R or 128R (e.g., after the parameter related to the selected channel is obtained). The switching arrangement 116R and/or 126R may be a soft switching arrangement arranged on either a positive line or a negative line. The soft switching arrangement 116R and/or 126R may include a switching unit 117 with a switching element QR and an electromechanical switch SR. At a first time period t0 switch SR may be turned ON. At a second time period t1 switching element QR may be turned ON which may establish the electrical pathway 118R or 128R (for example, between the measured device 121 and the MUX 129 on the positive or negative line between them, helping to open the selected channel of the MUX 129). At a third time period t2, the switching arrangement 116R or 126R remains ON and the selected channel remains open. For example, while the channel remains open the measurement device 131 may take one or more measurements related to the measured device 121 (e.g., measure an electrical parameter related to the measured device 121, such as a voltage of the measured device 121 between the positive terminal and the negative terminal of the measured device 121 on the selected channel). At a fourth time period t3, switching element QR may be turned OFF which may disconnect the electrical pathway 118R or 128R (for example, closing the selected channel of the MUX 129). At a fifth time period t4, switch SR may be turned OFF. Turning OFF switch SR may help provide galvanic isolation and help close the channel of the MUX 129 and allow a different channel to be subsequently selected and connected to the measurement device without interference from the other closed channels of the MUX 129. The switching arrangement 116R and/or 126R with electromechanical switch SR and non-mechanical switching element QR may also be relatively small in physical size, relatively inexpensive, and rated for relatively high voltages.

FIG. 22 shows the timing sequence diagram of FIG. 21 for a plurality of switching arrangements 116R and 126R. For example, a first switching arrangement 116R may be arranged on a positive line 118R and a second switching arrangement 126R may be connected to a negative line 128R. For example, the first switching arrangement 116R may be arranged between a positive terminal of a measured device and a positive terminal of a MUX 129, and the second switching arrangement 126R may be arranged between a negative terminal of the measured device 121 and a negative terminal of the MUX 129. A controller 120R with a sequencer unit may be configured to provide signals to both the first switching arrangement 116R and the second switching arrangement 126R at about the same time. The controller 120R and/or sequencer unit may be configured to provide one or more signals at a delay to one or more switches or switching elements of the switching arrangements 116R and/or 126R. For example, a TURN ON signal may be sent with a delay to non-mechanical switching elements QRP and/or QRN, and a TURN OFF signal may be sent with a delay to electromechanical switches SRP and/or SRN. This delay may help ensure soft-switching of the switching arrangements 116R and/or 126R. At the first time period t0 switch SRP on the positive line (for example, connected to a positive terminal of the MUX 129) and switch SRN on the negative line (for example, connected to a negative terminal of the MUX 129) may be turned ON at about the same time (for example, in response to a common shared TURN ON signal). At a second time period t1, switching element QRP on the positive line, (for example, connected to a positive terminal of the measured device 121) and switching element QRN on the negative line (for example, connected to a negative terminal of the measured device 121), may be turned ON at about the same time (for example, in response to a delayed common shared TURN ON signal). At a third time period t2, the pair of switching arrangements 116R and 126R remain ON and the selected channel remains open. For example, while the channel remains open the measurement device 131 may take one or more measurements related to the measured device 121 (e.g., measure an electrical parameter related to the measured device 121, such as a voltage of the measured device 121 between the positive terminal and the negative terminal of the measured device 121 on the selected channel). At a fourth time period t3, switching element QRP on the positive line and switching element QRN on the negative line may be turned OFF at about the same time (for example, in response to a common shared TURN OFF signal). At a fifth time period t4, switch SRP on the positive line and switch SRN on the negative line may be turned OFF at about the same time (for example, in response to a delayed common shared TURN OFF signal).

As mentioned above, the pair of switching arrangements 116R and 126R on the positive and negative lines, respectively, may help provide galvanic isolation on each of the lines of the channel and help allow a different channel to be opened and connected to the measurement device 131 without interference from the other channels while also being relatively small in physical size, relatively inexpensive, and rated for relatively high voltages.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

Further disclosed are the following examples:

1. An apparatus comprising:
    a first switch connected between two electrical terminals;
    a second switch connected in series to a third switch, the first switch connected in parallel to the series connection of the second switch and the third switch; and
    a controller configured to control the first switch, the second switch and the third switch to connect or disconnect the two electrical terminals,
    wherein the controller is configured to, based on the second switch being ON, turn ON the third switch to connect the two electrical terminals.
2. The apparatus of clause 1, wherein the controller is configured to, based on the third switch being ON, turn ON the first switch.
3. The apparatus of clause 1, wherein the first switch is an electromechanical switch.
4. The apparatus of clause 1 or clause 2, wherein the first switch is a relay switch.
5. The apparatus according to any one of the preceding clauses, wherein the second switch is an electromechanical switch.
6. The apparatus according to any one of the preceding clauses, wherein the second switch is a relay switch.
7. The apparatus of any one of the preceding clauses, wherein the first switch has a lower ON resistance than the third switch.
8. The apparatus of any one of the preceding clauses, wherein the second switch has a lower ON resistance than the third switch.
9. The apparatus of any one of the preceding clauses, wherein the third switch is a non-mechanical switch.
10. The apparatus of any one of the preceding clauses, wherein the third switch includes at least one solid state switch.
11. The apparatus of any one of the preceding clauses, wherein the third switch includes at least one diode.
12. The apparatus of any one of the preceding clauses, wherein the third switch includes at least one metal oxide semiconductor field-effect transistor (MOSFET).
13. The apparatus of any one of the preceding clauses, wherein the third switch is a bi-directional switch.
14. The apparatus of any one of the preceding clauses, wherein the third switch includes a plurality of transistors.
15. The apparatus of any one of the preceding clauses, wherein the third switch includes a plurality of back to back transistors.
16. The apparatus of any one of the preceding clauses, wherein the third switch includes a plurality of back to back MOSFETs.
17. The apparatus of any one of the preceding clauses, wherein at least one terminal of the two electrical terminals is connected to a load, and the load includes an uninterruptible power supply (UPS).
18. The apparatus of any one of the preceding clauses, wherein at least one terminal of the two terminals is connected to a photovoltaic (PV) power generator.
19. The apparatus of any one of the preceding clauses, wherein at least one terminal of the two terminals is connected to an energy storage device.
20. The apparatus of clause 19, wherein the energy storage device includes at least one battery.
21. An apparatus comprising:
    a first switching arrangement configured to establish a first electrical connection path between a source and a load;
    a second switching arrangement configured to establish a second electrical connection path between the source and the load, wherein the second switching arrangement is in parallel to the first electrical connection path, and the second electrical connection path is established based on a condition that the first switching arrangement has established the first electrical connection path between the source and the load; and
    wherein the first switching arrangement is configured to break the first electrical connection path between the source and the load based on a condition that the second switching arrangement has established the second electrical connection path between the source and the load.

22. The apparatus of clause 21, wherein the second switching arrangement includes an electromechanical switch.
23. The apparatus of clause 21 or clause 22, wherein the second switching arrangement includes a relay switch.
24. The apparatus of any one of clause 21 to clause 23, wherein the first switching arrangement includes an electromechanical switch.
25. The apparatus of any one of clause 24, wherein the electromechanical switch of the first switching arrangement is a relay switch.
26. The apparatus of any one of clause 21 to clause 25, wherein the first switching arrangement includes a non-mechanical switch.
27. The apparatus of any one of clause 21 to clause 26, wherein the non-mechanical switch of the first switching arrangement includes at least one transistor.
28. The apparatus of any one of clause 21 to clause 27, wherein the first switching arrangement includes at least one diode.
29. The apparatus of any one of clause 21 to clause 28, wherein the first switching arrangement includes at least one MOSFET.
30. The apparatus of any one of clause 21 to clause 29, wherein the first switching arrangement is a bi-directional switching arrangement.
31. The apparatus of any one of clause 21 to clause 30, wherein the first switching arrangement includes a plurality of transistors.
32. The apparatus of any one of clause 21 to clause 31, wherein the first switching arrangement includes a plurality of back to back transistors.
33. The apparatus of any one of clause 21 to clause 32, wherein the first switching arrangement includes a plurality of back to back MOSFETs.
34. The apparatus of any one of clause 21 to clause 33, wherein the load includes an uninterruptible power supply (UPS).
35. The apparatus of any one of clause 21 to clause 34, wherein the source includes a photovoltaic (PV) power generator.
36. The apparatus of any one of clause 21 to clause 35, wherein the source includes an energy storage device.
37. The apparatus of any one of clause 21 to clause 36, further comprising a controller configured to control at least one of the first switching arrangement or the second switching arrangement.
38. The apparatus of any one of clause 21 to clause 36, further comprising a third switching arrangement configured to establish a third electrical connection path between the source and the load.
39. The apparatus of clause 38, wherein the third switching arrangement includes at least one transistor.
40. The apparatus of clause 38 or clause 39, wherein the third switching arrangement includes at least one diode.
41. A method comprising:
    establishing a first electrical path;
    establishing a second electrical path in parallel to the first electrical path after establishing the first electrical path; and
    disconnecting the first electrical path after establishing the second electrical path.
42. The method of clause 41, wherein the first electrical path is between a source and a load.
43. A method comprising:
    establishing a first electrical path;
    disconnecting a second electrical path in parallel to the first electrical path after establishing the first electrical path; and
    disconnecting the first electrical path after disconnecting the second electrical path.
44. The method of clause 43, wherein the first electrical path is between a source and a load.
45. A method comprising:
    turning ON a first switch;
    turning ON a second switch in series with the first switch, after turning ON the first switch;
    turning ON a third switch in parallel with the first switch and the second switch, after turning ON the second switch;
    turning OFF the second switch; and
    turning OFF the first switch, after turning OFF the second switch.
46. The method of clause 45, wherein the third switch is connected between a source and a load.
47. A method comprising:
    turning ON a first switch;
    turning ON a second switch in series with the first switch, after turning ON the first switch;
    turning OFF a third switch in parallel with the first switch and the second switch, after turning ON the second switch;
    turning OFF the second switch; and
    turning off the first switch, after turning OFF the second switch.
48. The method of clause 47, wherein the third switch is connected between a source and a load.
49. A method comprising:
    turning ON a first switch in series with a second switch;
    turning ON or turning OFF a third switch in parallel with the first switch and the second switch after turning ON the first switch; and
    turning OFF the first switch after turning ON or turning OFF the third switch.
50. The method of clause 49, wherein the third switch is connected between a source and a load.
51. An apparatus comprising,
    a first switching arrangement comprising a first alternating current (AC) relay switch connected in series with a switching unit;
    a second switching arrangement comprising a second AC relay switch,
    wherein the first switching arrangement is connected in parallel to the second switching arrangement; and
    a controller configured to control the first switching arrangement and the second switching arrangement.
52. The apparatus of clause 51, further comprising a first terminal and a second terminal, wherein the first switching arrangement and the second switching arrangement are connected in parallel to each other between the first terminal and the second terminal, and wherein the first terminal is connected to the second terminal when the apparatus is ON and the first terminal is disconnected from the second terminal when the apparatus is OFF.
53. The apparatus of clause 51 or clause 52, further comprising a power line configured to carry a DC power, wherein the first terminal and the second terminal are coupled to the power line.
54. The apparatus of any one of clause 51 to clause 53, wherein the switching unit comprises at least one transistor.

55. The apparatus of any one of clause 51 to clause 54, wherein the switching unit comprises a bi-directional switch comprising at least two transistors.
56. The apparatus of clause 55, wherein the at least two transistors are at least two MOSFETs.
57. The apparatus of any one of clause 51 to clause 56, wherein the controller is configured to transition the apparatus from OFF to ON by
  i. turning ON the first AC relay switch at a first time,
  ii. turning ON the switching unit at a second time,
  iii. turning ON the second AC relay switch at a third time.
58. The apparatus of clause 57, wherein the controller is further configured to turn OFF the switching unit at a fourth time.
59. The apparatus of any one of clause 51 to clause 58, wherein the controller is configured to transition the apparatus from ON to OFF by:
  i. turning ON the switching unit at a first time,
  ii. turning OFF the second AC relay switch at a second time,
  iii. turning OFF the switching unit at a third time,
  iv. turning OFF the first AC relay switch at a fourth time.
60. The apparatus of clause 52, further comprising a source connected to the first terminal and a load connected to the second terminal.
61. A method comprising:
  disconnecting, using a controller, a first terminal from a second terminal, wherein a first AC relay switch is connected in series to a switching unit between the first terminal and the second terminal, and a second AC relay switch is connected in parallel to the first AC relay switch and the switching unit, the disconnecting comprising:
  turning ON the switching unit at a first time,
  turning OFF the second AC relay switch at a second time,
  turning OFF the switching unit at a third time.
62. The method of clause 61, further comprising a first device and a second device, wherein the first device and the second device operate in at least one of a first mode of operation to receive power or a second mode of operation to send power, and wherein the first terminal is coupled to the first device and the second terminal is coupled to the second device, and the first device or the second device is at least one of: a photovoltaic (PV) cell, a string of PV cells, a PV panel, a string of PV panels, multiple strings of PV panels, a power converter, a DC-DC converter, a buck converter, a boost converter, a buck-boost converter, a bi-directional power converter, an inverter, a transformer, a junction box, a grid, a power line, a solar power generation system, a wind power generation system, a hydroelectric power generation system, a power generation system, a renewable power generation system, a battery, a UPS, an outlet, or an electric vehicle.
63. The method of clause 61, wherein disconnecting the first terminal from the second terminal further comprises preventing inrush current.
64. The method of clause 61, wherein disconnecting the first terminal from the second terminal further comprises galvanically isolating the first terminal from the second terminal.
65. A method comprising:
  connecting, using a controller, a first terminal to a second terminal, wherein a first AC relay switch is connected in series to a switching unit between the first terminal and the second terminal, and a second AC relay switch is connected in parallel to the first AC relay switch and the switching unit, the connecting comprising:
  turning ON the switching unit at a first time,
  turning ON the second AC relay switch at a second time,
  turning OFF the switching unit at a third time.
66. The method of clause 65, further comprising a first device and a second device, wherein the first device and the second device operate in at least one of a first mode of operation to receive power or a second mode of operation to send power, and wherein the first terminal is coupled to the first device and the second terminal is coupled to the second device, and the first device or the second device is at least one of: a photovoltaic (PV) cell, a string of PV cells, a PV panel, a string of PV panels, multiple strings of PV panels, a power converter, a DC-DC converter, a buck converter, a boost converter, a buck-boost converter, a bi-directional power converter, an inverter, a transformer, a junction box, a grid, a power line, a solar power generation system, a wind power generation system, a hydroelectric power generation system, a power generation system, a renewable power generation system, a battery, a UPS, an outlet, or an electric vehicle.
67. An apparatus comprising:
  a first switching arrangement comprising:
    a first solid state switch; and
    a first electromechanical switch, wherein the first solid state switch and the first electromechanical switch are connected in series;
  a second switching arrangement comprising:
    a second solid state switch; and
    a second electromechanical switch wherein the second solid state switch and the second electromechanical switch are connected in series; and
  a plurality of terminals including a first positive terminal, a second positive terminal, a first negative terminal, and a second negative terminal;
  wherein the first switching arrangement is connected between the first positive terminal and the second positive terminal; and
  wherein the second switching arrangement is connected between the first negative terminal and the second negative terminal.
68. The apparatus of clause 67, further comprising a controller configured to:
  control the first electromechanical switch to turn ON before the first solid state switch is turned ON, and
  control the second electromechanical switch to turn ON before the second solid state switch is turned ON.
69. The apparatus of any one of clause 67 to clause 68, wherein the controller is further configured to:
  control the first solid state switch to turn ON and connect a first current pathway between the first positive terminal and the second positive terminal, and
  control the second solid state switch to turn ON and connect a second current pathway between the first negative terminal and the second negative terminal.
70. The apparatus of clause 67, further comprising a controller configured to:
  control the first solid state switch to turn OFF before the first electromechanical switch is turned OFF, and control the second solid state switch to turn OFF before the second electromechanical switch is turned OFF.
71. The apparatus of clause 70, wherein the controller is further configured to:
control the first solid state switch to turn OFF and disconnect a first current pathway between the first positive terminal and the second positive terminal, and
control the second solid state switch to turn OFF and disconnect a second current pathway between the first negative terminal and the second negative terminal.
72. The apparatus according to any one of clause 67 to clause 71,
wherein the first electromechanical switch is configured to provide galvanic isolation between the first positive terminal and the second positive terminal when the first electromechanical switch is turned OFF, and
wherein the second electromechanical switch is configured to provide galvanic isolation between the first negative terminal and the second negative terminal when the second electromechanical switch is turned OFF.
73. The apparatus according to any one of clause 67 to clause 72, further comprising at least one sensor configured to measure an electrical parameter related to the first positive terminal and the first negative terminal when the first switching arrangement and the second switching arrangement are turned ON.
74. The apparatus according to any one of clause 67 to clause 73, wherein the first solid state switch and the second solid state switch include at least one of:
a transistor,
a metal-oxide semiconductor field effect transistor (MOSFET), or
a solid state relay (SSR).
75. The apparatus according to any one of clause 67 to clause 74,
wherein the first positive terminal is an input terminal for the first switching arrangement and the second positive terminal is an output terminal for the first switching arrangement, and
wherein the first negative terminal is an input terminal for the second switching arrangement and the second negative terminal is an output terminal for the second switching arrangement.
76. The apparatus according to any one of clause 67 to clause 75, wherein the apparatus is configured to connect between a measured device and a multiplexer when the first switching arrangement and the second switching arrangement are turned ON.
77. The apparatus of clause 76, wherein the multiplexer is connected to a measurement device.
78. The apparatus of clause 77, wherein the measurement device includes at least one voltage sensor.
79. The apparatus of any one of clause 76 to clause 78, wherein the multiplexer has a plurality of selectable channels, and the apparatus is connected to one of the selectable channels of the multiplexer.
80. The apparatus according to any one of clause 76 to clause 79,
wherein the first positive terminal is connected to a positive output terminal of the measured device and the second positive terminal is connected to a positive input terminal of the multiplexer, and wherein the first negative terminal is connected to a negative output terminal of the measured device and the second negative terminal is connected to a negative input terminal of the multiplexer.
81. The apparatus according to clause 76,
wherein the positive output terminal of the multiplexer is connected to a positive input terminal of the measurement device, and
wherein a negative output terminal of the multiplexer is connected to a negative input terminal of the measurement device.
82. The apparatus according to any of clause 67 to clause 81, wherein the first solid state switch is connected to the first positive terminal and the second solid state switch is connected to the first negative terminal.
83. The apparatus according to any one of clause 67 to clause 82, wherein the first electromechanical switch is connected to the second positive terminal and the second electromechanical switch is connected to the second negative terminal.
84. The apparatus according to any one of clause 67 to clause 83, wherein the first switching arrangement and the second switching arrangement are configured to turn ON simultaneously to connect a pair of positive and negative output terminals of the measured device to a pair of positive and negative input terminals of the measurement device, such that the measurement device obtains a measurement of voltage between the pair of positive and negative output terminals of the measured device.
85. The apparatus according to clause 77, wherein the first switching arrangement and the second switching arrangement are configured to turn OFF simultaneously to disconnect the pair of positive and negative output terminals of the measured device to a pair of positive and negative input terminals of the measurement device, such that the measurement device obtains a measurement of voltage related to a different measured device.
86. The apparatus according to any one of clause 67 to clause 85, wherein the first switching arrangement and the second switching arrangement are configured to be controlled by a single control signal.
87. The apparatus according to clause 86, wherein the single control signal is arranged by a sequencer unit.
88. The apparatus according to clause 86, wherein the single control signal is configured to turn ON the first solid state switch and the second solid state switch simultaneously after a delay of turning ON the first electromechanical switch and the second electromechanical switch simultaneously.
89. The apparatus according to clause 86, wherein the single control signal is configured to turn OFF the first electromechanical switch and the second electromechanical switch simultaneously after a delay of turning OFF the first solid state switch and second solid state switch simultaneously.
90. The apparatus according to clause 79, wherein each channel of the plurality of selectable channels is connected to an apparatus with a pair of switching arrangements connected to a positive line and a negative line of the channel respectively.
91. The apparatus according to clause 90, wherein the plurality of channels are each connected to a respective measured device and the multiplexer.

92. The apparatus according to clause 90, wherein the plurality of channels are each connected to a respective measured point of the measured device.

93. The apparatus according to clause 90, wherein the multiplexer is configured to select a channel from the plurality of channels and connect the measurement device via the selected channel to obtain an electrical parameter related to the selected channel.

94. The apparatus according to any one of clause 67 to clause 93, wherein the first solid state switch and the second solid state switch each include a plurality of transistors that are connected in series.

95. The apparatus according to any one of clause 67 to clause 94, wherein the first solid state switch is rated for a higher voltage than the first electromechanical switch, and the second solid state switch is rated for a higher voltage than the second electromechanical switch.

96. The apparatus according to any one of clause 67 to clause 95, wherein the first solid state switch is physically smaller than the first electromechanical switch, and the second solid state switch is physically smaller than the second electromechanical switch.

The invention claimed is:

1. An apparatus comprising:
a first switch connected between two electrical terminals;
a second switch connected in series to a third switch, wherein the series connection of the second switch and the third switch is connected in parallel to the first switch;
a fourth switch connected in series to a fifth switch, wherein the series connection of the fourth switch and the fifth switch is connected in parallel to the first switch; and
a controller configured to control the first switch, the second switch, the third switch, the fourth switch, and the fifth switch to connect and disconnect the two electrical terminals, wherein the controller is configured to:
based on a first voltage being greater than a second voltage, turn ON the second switch, and based on the second switch being ON, turn ON the third switch to connect the two electrical terminals; and
based on the second voltage being greater than the first voltage, turn ON the fourth switch, and based on the fourth switch being ON, turn ON the fifth switch to connect the two electrical terminals.

2. The apparatus of claim 1, wherein the controller is configured to, based on the third switch being ON or the fifth switch being ON, turn ON the first switch.

3. The apparatus of claim 1, wherein the first switch is an electromechanical switch.

4. The apparatus of claim 1, wherein the second switch and the fourth switch are electromechanical switches.

5. The apparatus of claim 1, wherein the first switch has a lower ON resistance than the third switch and the fifth switch.

6. The apparatus of claim 1, wherein the second switch and the fourth switch have lower ON resistances than the third switch and the fifth switch.

7. The apparatus of claim 1, wherein the third switch and the fifth switch are non-mechanical switches.

8. The apparatus of claim 1, wherein each of the first switch, the second switch, and the fourth switch is a relay switch, and each of the third switch and the fifth switch comprises at least a solid state switch.

9. The apparatus of claim 1, wherein the third switch comprises a first diode and the fifth switch comprises a second diode.

10. The apparatus of claim 1, wherein each of the third switch and the fifth switch comprises a transistor.

11. The apparatus of claim 9, wherein the first diode is configured to block current in a first direction, and the second diode is configured to block current in a second direction.

12. The apparatus of claim 1, further comprising a sixth switch connected in series to a seventh switch, wherein the series connection of the sixth switch and the seventh switch is connected in parallel to the first switch.

13. The apparatus of claim 1, wherein at least one terminal of the two electrical terminals is connected to a load, and the load comprises an uninterruptible power supply (UPS).

14. The apparatus of claim 1, wherein at least one terminal of the two electrical terminals is connected to a photovoltaic (PV) power generator.

15. The apparatus of claim 1, wherein at least one terminal of the two electrical terminals is connected to an energy storage device.

16. The apparatus of claim 1, wherein the first voltage is a voltage at a first terminal of the two electrical terminals, and the second voltage is a voltage at a second terminal of the two electrical terminals.

17. A method comprising:
controlling, by a controller, a first switch, a second switch, a third switch, a fourth switch, and a fifth switch to connect or disconnect two electrical terminals, wherein the first switch is connected between the two electrical terminals, the second switch is connected in series to the third switch, the series connection of the second switch and the third switch is connected in parallel to the first switch, the fourth switch is connected in series to the fifth switch, and the series connection of the fourth switch and the fifth switch is connected in parallel to the first switch; and
performing one of:
turning ON the second switch based on a first voltage being greater than a second voltage, and connecting the two electrical terminals by turning ON the third switch based on the second switch being ON, or
turning ON the fourth switch based on the second voltage being greater than the first voltage, and connecting the two electrical terminals by turning ON the fifth switch based on the fourth switch being ON.

18. The method of claim 17, further comprising turning ON the first switch based on the third switch being ON or the fifth switch being ON.

19. The method of claim 17, wherein the controlling comprises electromechanically causing the first switch, the second switch, or the fourth switch to turn ON or OFF.

20. The method of claim 17, wherein the controlling comprises non-mechanically causing the third switch or the fifth switch to turn ON or OFF.

* * * * *